US010152752B2

(12) United States Patent
Johannes

(10) Patent No.: US 10,152,752 B2
(45) Date of Patent: Dec. 11, 2018

(54) METHODS AND SYSTEMS FOR COMPUTING TRADING STRATEGIES FOR USE IN PORTFOLIO MANAGEMENT AND COMPUTING ASSOCIATED PROBABILITY DISTRIBUTIONS FOR USE IN OPTION PRICING

(71) Applicant: Ronald L. Johannes, Washington, DC (US)

(72) Inventor: Ronald L. Johannes, Washington, DC (US)

( * ) Notice: Subject to any disclaimer, the term of this patent is extended or adjusted under 35 U.S.C. 154(b) by 0 days.

(21) Appl. No.: 15/369,486

(22) Filed: Dec. 5, 2016

(65) Prior Publication Data
US 2017/0213284 A1   Jul. 27, 2017

Related U.S. Application Data

(63) Continuation of application No. 13/849,389, filed on Mar. 22, 2013, which is a continuation of application No. 13/009,725, filed on Jan. 19, 2011, now Pat. No. 8,417,615.

(60) Provisional application No. 61/296,384, filed on Jan. 19, 2010.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC .................................. G06Q 40/04; G06Q 40/06
See application file for complete search history.

(56) References Cited

U.S. PATENT DOCUMENTS

| 6,772,136 | B2 | 8/2004 | Kant et al. | |
| 7,555,454 | B2 | 6/2009 | Cooper et al. | |
| 7,590,582 | B2 * | 9/2009 | Dunne | G06Q 40/00 705/35 |
| 7,599,871 | B1 * | 10/2009 | Borland | G06Q 40/06 705/36 R |
| 7,613,646 | B2 | 11/2009 | Luenberger | |
| 7,630,931 | B1 * | 12/2009 | Rachev | G06Q 40/00 705/35 |
| 7,653,581 | B2 | 1/2010 | Poetzsch | |
| 7,974,911 | B2 * | 7/2011 | Sofianos | G06Q 40/00 705/35 |

(Continued)

FOREIGN PATENT DOCUMENTS

WO   WO-2008028172 A2 *  3/2008  ............ G06Q 20/10
WO   WO 2010/016873       2/2010

OTHER PUBLICATIONS

Haugh, M: Martingale Pricing Theory, 2005, Financial Engineering: Discrete-Time Asset Pricing, IEOR E4706, pp. 1-20 (Year: 2005).*

(Continued)

*Primary Examiner* — Bijendra K Shrestha
(74) *Attorney, Agent, or Firm* — Klarquist Sparkman, LLP

(57) ABSTRACT

Exemplary methods and systems for creating uncorrelated trading strategies and deriving associated implied probability distributions of the price of an underlying financial instrument at future times are disclosed, applicable to stock market prices, interest rates, currency exchange rates, commodity prices and credit spreads.

20 Claims, 14 Drawing Sheets

(56) References Cited

U.S. PATENT DOCUMENTS

| | | | | |
|---|---|---|---|---|
| 7,983,982 | B2* | 7/2011 | Cushing | G06Q 40/04 705/37 |
| 2003/0093352 | A1* | 5/2003 | Muralidhar | G06Q 40/06 705/36 R |
| 2003/0101123 | A1 | 5/2003 | Alvarado et al. | |
| 2004/0111358 | A1 | 6/2004 | Lange et al. | |
| 2006/0031149 | A1* | 2/2006 | Lyons | G06Q 40/00 705/35 |
| 2006/0129473 | A1* | 6/2006 | Hansen | G06Q 40/00 705/37 |
| 2007/0124227 | A1* | 5/2007 | Dembo | G06Q 40/00 705/36 R |
| 2008/0021801 | A1 | 1/2008 | Song et al. | |
| 2008/0097884 | A1* | 4/2008 | Ferris | G06Q 40/06 705/36 R |
| 2008/0270322 | A1* | 10/2008 | Cooper | G06Q 40/06 705/36 R |
| 2010/0268664 | A1* | 10/2010 | Borkovec | G06Q 10/04 705/36 R |
| 2011/0258107 | A1* | 10/2011 | Madhavan | G06Q 10/04 705/37 |

OTHER PUBLICATIONS

Almgren et al.: Optimum Execution of Portfolio Transactions, Dec. 2000, pp. 1-42. (Year: 2000).*

Faris, W: Martingale Ideas in Elementary Probability, Spring 1996, University of Arizona, pp. 1-46. (Year: 1996).*

Jimbo, H. C.: Distribution Characterization in a Practical Moment Problem, 2004, Acta Math. Univ. Comenianae, vol. LXXIII. pp. 107-114. (Year: 2004).*

Onalan, O.: Martngale Measures for NIG Levy Process with Applications to mathematical Finance, 2009, International Journal of Finance and Economics, ISSN 1450-2887, Issue 34, pp. 56-68. (Year: 2009).*

Liu et al.: Risk and Return in Fixed Income Arbrtrage Nickel in Fronr of a Steamroller, Apr. 2004, pp. 1-31. (Year: 2004).*

Farmer et al.: The price dynamics of common trading strategies, Oct. 30, 2000, pp. 1-29. (Year: 2000).*

Hirabayashi et al.: Optimization of the Trading Rule in ForeignExchange using Genetic Algorithm, Jul. 2009, ACM, pp. 1529-1536. (Year: 2009).*

Akhiezer, *The Classical Moment Problem*, New York: Hafner Publishing Co., pp. 3-5, 14, 54-56, 63, 98, 114, 115-131, 174-177 (1965).

Almgren et al., "Optimal Execution of Portfolio Transactions," 42 pp. (Dec. 2000).

Alpay et al., "Classical Nevanlinna-Pick Interpolation with Real Interpolation Points," in *Operator Theory and Interpolation*, pp. 1-50 (2000).

Bakshi et al., "Empirical Performance of Alternative Option Pricing Models," *Journal of Finance*, vol. 52, Iss. 5, pp. 2003-2049 (Dec. 1997).

Bates, "Empirical option pricing: a retrospection," *Journal of Econometrics*, vol. 116, pp. 387-404 (Sep. 2003).

Breeden et al., "Prices of State-Contingent Claims Implicit in Option Prices," *Journal of Business*, vol. 51, Iss. 4, pp. 621-651 (Oct. 1978).

Broadie et al., "Option Pricing: Valuation Models and Applications," *Management Science*, vol. 50, Iss. 9, pp. 1145-1177 (Sep. 2004).

Brunk, "Univariate density estimation by orthogonal series," *Biometrika*, vol. 65, No. 3, pp. 521-528 (1978).

Chernov et al., "A study towards a unified approach to the joint estimation of objective and risk neutral measures for the purpose of options valuation," *Journal of Financial Economics*, vol. 56, No. 3, pp. 407-458 (Jun. 2000).

Dacorogna et al., *An Introduction to High Frequency Finance*, London: Academic Press, Chapter 3, "Time Series of Interest," pp. 31-81, and Chapter 4, "Adaptive Data Cleaning," pp. 82-120 (2001).

Dubins et al., "On Extremal Martingale Distributions," *Proc. Fifth Berkeley Symp. on Math. Statist. and Prob.*, vol. 2, Pt. 1, pp. 295-299 (1967).

Fan et al., *Nonlinear Time Series*, New York: Springer-Verlag, pp. 252-257 (2005).

Faris, "Martingale Ideas in Elementary Probability," Lecture Course, Higher Mathematics College, Independent University of Moscow, 46 pp. (Spring 1996).

Hasanhodzic et al., "Can Hedge-Fund Returns Be Replicated?: The Linear Case," *Journal of Investment Management*, vol. 5, No. 2, pp. 5-45 (2007).

Haugh, "Martingale Pricing Theory," IEOR E4706: Financial Engineering: Discrete-Time Asset Pricing (2005).

Hull, *Options, Futures, and Other Derivatives*, $7^{th}$ Edition, Chapter 1, "Introduction," pp. 1-19, Chapter 2, "Mechanics of Futures Markets," pp. 21-41, and Chapter 5, "Determination of Forward and Future Prices," pp. 99-127 (May 2008).

International Search Report dated Mar. 21, 2011, from International Patent Application No. PCT/US11/21738, 2 pp.

Jackwerth, "Option-Implied Risk-Neutral Distributions and Implied Binomial Trees: A Literature Review," *Journal of Derivatives*, vol. 7, Iss. 2, pp. 66-82 (Winter 1999).

Jimbo, "Distribution Characterization in a Practical Moment Problem," *Acta Math. Univ. Comenianac*, vol. LXXIII, pp. 107-114 (2004).

Kat et al., "Who Needs Hedge Funds? A Copula-Based Approach to Hedge Fund Return Replication," Alternative Investment Research Centre Working Paper 27, Cass Business School, City University, London, 52 pp. (Nov. 2005).

Liu et al., "Risk and Return in Fixed Income Arbitrage: Nickels in Front of a Steamroller?," 31 pp. (Apr. 2004).

Önalan, "Martingale Measures for NIG Lévy Processes with Applications to Mathematical Finance," *Int'l Research Journal of Finance and Economics*, Issue 34, pp. 56-68 (2009).

Rosenberg et al., "Empirical pricing kernels," *Journal of Financial Economics*, vol. 64, pp. 341-372 (Jun. 2002).

Ross, "Options and Efficiency," *Quarterly Journal of Economics*, vol. 90, Iss. 1, pp. 75-89 (1976).

Stone, *Linear Transformations in Hilbert Space*, Colloquium Publications vol. 15. Providence: American Mathematical Society, pp. 530-614 (Dec. 1932).

Wilkinson, *The Algebraic Eigenvalue Problem*, New York: Oxford University Press, Chapter 5, "Hermitian Matrices," pp. 298-331, and Ch. 6, "Reduction of a General Matrix to Condenzed Form," pp. 382-387 (Apr. 1988).

Written Opinion dated Mar. 21, 2011, from International Patent Application No. PCT/US11/21738, 10 pp.

* cited by examiner

METHODS AND SYSTEMS FOR COMPUTING TRADING STRATEGIES FOR USE IN PORTFOLIO MANAGEMENT AND COMPUTING ASSOCIATED PROBABILITY DISTRIBUTIONS FOR USE IN OPTION PRICING

CROSS REFERENCE TO RELATED APPLICATIONS

This application is a continuation of U.S. patent application Ser. No. 13/849,389, filed on Mar. 22, 2013, and entitled "METHODS AND SYSTEMS FOR COMPUTING TRADING STRATEGIES FOR USE IN PORTFOLIO MANAGEMENT AND COMPUTING ASSOCIATED PROBABILITY DISTRIBUTIONS FOR USE IN OPTION PRICING," which is a continuation of U.S. patent application Ser. No. 13/009,725, filed on Jan. 19, 2011, and entitled "METHODS AND SYSTEMS FOR COMPUTING TRADING STRATEGIES FOR USE IN PORTFOLIO MANAGEMENT AND COMPUTING ASSOCIATED PROBABILITY DISTRIBUTIONS FOR USE IN OPTION PRICING," now U.S. Pat. No. 8,417,615, which claims the benefit of U.S. Provisional Application No. 61/296,384, filed on Jan. 19, 2010, and entitled "METHOD AND SYSTEM FOR CREATING TRADING STRATEGIES FOR USE IN PORTFOLIO MANAGEMENT AND DERIVING ASSOCIATED PROBABILITY DISTRIBUTIONS FOR USE IN OPTION PRICING," all of which are hereby incorporated by reference herein.

TECHNICAL FIELD

The disclosed technology is related to financial instruments. Particular embodiments, for example, include methods and systems for creating uncorrelated trading strategies in a financial instrument and/or for computing a probability distribution of the future price of the financial instrument.

BACKGROUND

Financial market traders and investors at commercial and investment banks, hedge funds, other managed funds, pension funds, corporate treasuries, insurance companies and elsewhere (including individual investors) have an interest in the use of options written on an underlying financial instrument for investment trading and hedging purposes. For example, a company might wish to hedge against future price movements in oil or a currency exchange rate, and an investment bank proprietary trader might wish to take a view (an investment position) on the future price movements of a stock. Accordingly, the accurate valuation of options is important to a wide range of financial market participants. Further, option prices convey information about expected future prices (e.g., future interest rates) that are of interest to other market observers, such as economic forecasters and central banks.

SUMMARY

Disclosed below are representative embodiments of methods, apparatus, and systems for computing uncorrelated trading strategies in a financial instrument and/or for deriving a probability distribution of the future price of the financial instrument.

Certain embodiments of the disclosed technology provide a complete framework for incomplete markets. For example, some embodiments of the disclosed technology produce complete option pricing in incomplete markets, in that they explicitly model the nature of any incomplete market, so as to determine the range of all possible prices for an option on an underlying financial instrument (e.g., on a single asset, a single asset class, or a fixed-weight portfolio).

Some embodiments of the disclosed technology use historical price data, not assumed forms for functions. For example, certain embodiments of the disclosed technology do not assume specific functional forms (such as stochastic volatility or jumps) for asset price processes, probability distributions, or risk premia. Rather, embodiments of the disclosed technology derive risk factors and associated risk premia from the historical prices for the underlying instrument through an expectations generator for those prices (a generator of the present value pricing operator).

Particular embodiments of the disclosed technology comprise an expectations generator that generates expectations based on historical price data. For example, some embodiments of the disclosed technology use an expectations generator derived from a probability distribution of short-run future prices of the underlying instrument. The short-run distribution can be based purely on the historical price data for the underlying instrument, and, in one particular embodiment, is determined by the technique of orthogonal series (independent components), namely initial estimates of risk factors.

Certain embodiments of the disclosed technology use risk factors derived as functions of the underlying instrument price, which are therefore usable as trading strategies in that instrument. For example, embodiments of the disclosed technology generate risk factors (final estimates) that are explicit functions of the underlying instrument price, and hence so also are the associated hedging coefficients. Consequently, the risk factors can be used as trading strategies in the underlying instrument, together with the hedging coefficients, so as to earn the risk premia (the expected excess returns) in a trading portfolio (or pay it in an options hedging portfolio).

Some embodiments of the disclosed technology combine risk factors and risk premia (the expected excess returns) to generate a future martingale probability distribution. For example, based purely on the historical price data for the underlying instrument, the risk factors and risk premia can be combined in embodiments of the disclosed technology to generate a risk neutral (or "martingale") probability distribution of the underlying instrument price at a future time, corresponding to an option expiration date. This distribution can serve as an intermediate step to option pricing through the values of its moments.

Particular embodiments of the disclosed technology determine all future martingale distributions by a single function of a special mathematical form. For example, consistent with the basis of historical price data, embodiments of the disclosed technology determine all possible martingale distributions at the future time through a single parameter function. In particular embodiments, the parameter function belongs to a certain mathematical class of functions called the "compactified Nevanlinna class" and has two extremal values that determine upper and lower bounds to the price of any option on the underlying instrument.

Certain embodiments of the disclosed technology use the single function to price new basket options. For example, the price of a basket (fixed-weight portfolio) option can be determined by embodiments of the disclosed technology even when no options on that particular basket have been previously traded by assigning a value to the single parameter function derived from prices of options on the basket components.

Some embodiments of the disclosed technology determine martingale distributions by a single scalar parameter. On the basis of both the historical underlying instrument prices and the contemporaneous option prices, embodiments of the disclosed technology determine all possible martingale distributions at the future time through a single scalar parameter (a real number, possibly infinite). The scalar parameter has two extremal values that determine conditional upper and lower bounds to the price of any option on the underlying instrument, conditional on the contemporaneous option prices.

Particular embodiments of the disclosed technology determine the optimal distribution (at each future time) for pricing any option by optimizing the scalar parameter to option prices. For example, embodiments of the disclosed technology determine an optimal martingale distribution (one that implies option prices that best or nearly best approximate the contemporaneous option prices) by optimizing a single scalar parameter.

Certain embodiments of the disclosed technology use algebraic algorithms, not difficult-to-solve differential or stochastic equations. For example, embodiments of the disclosed technology employ only algebraic algorithms and do not, therefore, bear the computational burden incurred in solving partial differential equations, partial integro-differential equations, or their counterparts in stochastic differential equations.

Some embodiments of the disclosed technology are configured to display graphically (e.g., on a display device) the trading strategies (e.g., the values of the positions in the financial instrument as a function of its price) and the associated hedging coefficients and excess returns and, at each selected future time, the optimal probability distribution, and the extremal and conditional extremal probability distributions.

In certain embodiments, uncorrelated trading strategies are created and associated martingale probability distributions are computed by defining a parameterized probability distribution model and then calculating orthogonal polynomials in accordance with the historical price data for the underlying instrument, calculating a transformation matrix in accordance with the underlying instrument data, and determining the values of the distribution parameters. The values of the distribution parameters can be determined in accordance with, in initial estimate, the transformation matrix, and the contemporaneous price data for the plurality of options and, in subsequent iterations, the transformation matrix, the options data, and an auxiliary transformation matrix itself determined in accordance with the options data in conjunction with the underlying instrument data. All computations can be carried out by means of algebraic algorithms and, therefore, there is no need to solve any partial differential equations or partial integro-differential equations. Furthermore, the trading strategies (optionally together with hedging coefficients and excess returns) and/or the martingale probability distributions (optionally together with upper and lower bounds) can further be graphically displayed.

One of the disclosed embodiments is a computer-implemented method that comprises receiving historical price data, the historical price data indicating one or more historical prices for a financial instrument; receiving maturity data, the maturity data indicating one or more expiration dates, each of the one or more expiration dates being an expiration date for one or more options on the financial instrument; selecting an expiration date from the one or more expiration dates; computing a set of two extremal martingale probability distributions based at least in part on the historical price data and the selected expiration date, each of the two extremal martingale probability distributions indicating probabilities of possible prices for the financial instrument at the selected expiration date, wherein each of the two extremal martingale probability distributions is determined by a fractional linear transformation of a distribution parameter function; and storing the set of two extremal martingale probability distributions. In certain implementations, the act of computing the set of two extremal martingale probability distributions comprises setting the value of the distribution parameter function to each of two pre-determined fixed scalar values. In some implementations, the computing the set of two extremal martingale probability distributions comprises computing a representative martingale probability distribution using the historical price data and the selected expiration date, the representative martingale probability distribution indicating probabilities of possible prices for the financial instrument at the selected expiration date; computing one or more mathematical moments of the representative martingale probability distribution; computing the fractional linear transformation of the distribution parameter function, the fractional linear transformation being based at least in part on the one or more mathematical moments; assigning values to the distribution parameter function; and computing the set of two extremal martingale probability distributions based at least in part on the fractional linear transformation and the values assigned to the distribution parameter function. The mathematical moments of the representative martingale probability distribution can be computed by an Esscher transform of an empirical probability distribution. Further, the set of two extremal martingale probability distributions can be based on the one or more mathematical moments of the representative martingale probability distribution, and not on any other use of the historical price data. In certain implementations, the act of computing the set of two extremal martingale probability distributions is performed using only algebraic manipulations. In some implementations, the computing the set of two extremal martingale probability distributions is performed without using either stochastic computations or differential equation computations. In some implementations, the method further comprises receiving a forward price or discount factor for the financial instrument at the selected expiration date, and the computing the set of two extremal martingale probability distributions is further based at least in part on the forward price or the discount factor. In certain implementations, the set of two extremal martingale probability distributions comprises a first martingale probability distribution indicating lower bounds of possible prices for an option on the financial instrument at the selected expiration date, the lower bounds being independent of current option prices for the financial instrument; and a second martingale probability distribution indicating upper bounds of possible prices for an option on the financial instrument at the selected expiration date, the upper bounds being independent of current option prices for the financial instrument.

Another one of the disclosed embodiments is a computer-implemented method that comprises receiving historical price data, the historical price data indicating one or more historical prices for a financial instrument; receiving maturity data, the maturity data indicating one or more expiration dates, each of the one or more expiration dates being an expiration date for one or more options on the financial instrument; selecting an expiration date from the one or more expiration dates; receiving option prices, the option prices indicating a respective market price for each of one or more available options on the financial instrument, each of the option prices being contemporaneous or substantially contemporaneous with one another, and each of the available options having an expiration date coinciding with the selected expiration date; computing a set of two conditional extremal martingale probability distributions based at least in part on the historical price data, the selected expiration date, and the option prices, each of the two conditional extremal martingale probability distributions indicating conditional probabilities of possible prices for the financial instrument at the selected expiration date, the conditional probabilities being conditional on the option prices, wherein each of the two conditional extremal martingale probability distributions is determined by a fractional linear transformation of a distribution parameter function; and storing the set of two conditional extremal martingale probability distributions. In certain implementations, the act of computing the set of two conditional extremal martingale probability distributions comprises computing initial estimates of approximating martingale probability distributions based on test scalar values of the distribution parameter function; and setting the value of an interpolation parameter function to each of two pre-determined fixed scalar values. In some implementations, the act of computing the set of two conditional extremal martingale probability distributions comprises computing a representative martingale probability distribution using the historical price data, the representative martingale probability distribution indicating probabilities of possible prices for the financial instrument at the selected expiration date; computing one or more mathematical moments of the representative martingale probability distribution; computing the fractional linear transformation of the distribution parameter function, the fractional linear transformation being based at least in part on the one or more mathematical moments; assigning values to the distribution parameter function; assigning values to an interpolation parameter function; and computing the set of two conditional extremal martingale probability distributions based at least in part on the fractional linear transformation, the values assigned to the distribution parameter function, and the values assigned to the interpolation parameter function. The one or more mathematical moments of the representative martingale probability distribution can be computed by an Esscher transform of an empirical probability distribution. Further, the set of two conditional extremal martingale probability distributions can be based on the one or more mathematical moments of the representative martingale probability distribution, and not on any other use of the historical price data. In some implementations, the computing the set of two conditional extremal martingale probability distributions is performed using only algebraic manipulations. In certain implementations, the computing the set of two conditional extremal martingale probability distributions is performed without using either stochastic computations or differential equation computations. In some implementations, the method further comprises receiving financial instrument price data indicating one or more market prices for the financial instrument, each of the one or more market prices being pairwise contemporaneous or substantially contemporaneous with corresponding ones of the option prices, and the act of computing the set of two conditional extremal martingale probability distributions is further based at least in part on the financial instrument price data. In certain implementations, the method further comprises receiving a forward price or discount factor for the financial instrument at the selected expiration date, and the act of computing the set of two conditional extremal martingale probability distributions is further based at least in part on the forward price or the discount factor. In some implementations, the set of two conditional extremal martingale probability distributions comprises a first martingale probability distribution indicating lower bounds of possible prices for an option on the financial instrument at the selected expiration date, the lower bounds being dependent on the option prices for the financial instrument; and a second martingale probability distribution indicating upper bounds of possible prices for an option on the financial instrument at the selected expiration date, the upper bounds being dependent on the option prices for the financial instrument.

Another one of the disclosed embodiments is a computer-implemented method that comprises receiving historical price data, the historical price data indicating one or more historical prices for a financial instrument; receiving maturity data, the maturity data indicating one or more expiration dates, each of the one or more expiration dates being the expiration date for one or more options on the financial instrument; selecting an expiration date from the one or more expiration dates; receiving option prices, the option prices indicating a market price for each of one or more available options on the financial instrument, each of the option prices being contemporaneous or substantially contemporaneous with one another, and each of the available options having an expiration date coinciding with the selected expiration date; computing an approximating martingale probability distribution based at least in part on the historical price data, the selected expiration date, and the option prices, the approximating martingale probability distribution indicating probabilities of possible prices for the financial instrument at the selected expiration date, the approximating martingale probability distribution being indicative of option prices that approximate the option prices, wherein the approximating martingale probability distribution is determined by a fractional linear transformation of a distribution parameter function; and storing the approximating martingale probability distribution. In some implementations, the method further comprises computing estimated option prices from the approximating martingale probability distribution. In certain implementations, the act of computing the approximating martingale probability distribution comprises computing initial estimates of the approximating martingale probability distribution based on test scalar values of the distribution parameter function; and computing the approximating martingale probability distribution based on test scalar values of an interpolation parameter function. In some implementations, the act of computing the approximating martingale probability distribution comprises computing a representative martingale probability distribution using the historical price data, the representative martingale probability distribution indicating probabilities of possible prices for the financial instrument at the selected expiration date; computing one or more mathematical moments of the representative martingale probability distribution; computing the fractional linear transformation of the distribution parameter function, the fractional linear transformation being based at least in part on the one or more mathematical moments; assigning values to the distribution parameter function; assigning values to the interpolation parameter function; and computing the approximating martingale probability distribution based at least in part on the fractional linear transformation, the values assigned to the distribution parameter function, and the values assigned to the interpolation parameter function. The one or more mathematical moments of the representative martingale probability distribution can be computed using an Esscher transform of an empirical probability distribution. Further, the approximating martingale probability distribution can be based on the one or more mathematical moments of the representative martingale probability distribution, and not on any other use of the historical price data. In certain implementations, the act of computing the approximating martingale probability distribution is performed using only algebraic manipulations. In some implementations, the act of computing the approximating martingale probability distribution is performed without using either stochastic computations or differential equation computations. In certain implementations, the method further comprises receiving financial instrument price data indicating one or more market prices for the financial instrument, each of the one or more market prices being pairwise contemporaneous or substantially contemporaneous with corresponding ones of the option prices, and the computing the approximating martingale probability distribution is further based at least in part on the financial instrument price data. In some implementations, the method further comprises receiving a forward price or discount factor for the financial instrument at the selected expiration date, and the computing the approximating martingale probability distribution is further based at least in part on the forward price or the discount factor.

Another one of the disclosed embodiments is a computer-implemented method that comprises receiving historical price data, the historical price data indicating one or more historical prices for a financial instrument; receiving a time horizon, the time horizon being not less than a shortest period between successive prices in the historical price data; computing one or more trading strategies based at least in part on the historical price data and the time horizon, each of the one or more trading strategies comprising a function that relates a value of the respective trading strategy to a price of the financial instrument, wherein each of the one or more trading strategies is determined by a second order finite difference. In some implementations, the method further comprises, for each of the one or more trading strategies, computing an excess return, one or more hedging coefficients, or both an excess return and one or more hedging coefficients. In certain implementations, the act of computing the one or more trading strategies comprises computing a time horizon probability distribution indicating probabilities of possible prices for the financial instrument at the time horizon; computing one or more mathematical moments of the time horizon probability distribution; and computing one or more coefficients of the second order finite difference, the one or more coefficients being based at least in part on the mathematical moments of the time horizon probability distribution. The one or more mathematical moments can be computed using an orthogonal series method. In some implementations, the time horizon is a first time horizon, and the act of computing the one or more trading strategies comprises receiving a second time horizon (the second time horizon being different than the first time horizon); receiving a forward price or discount factor for the financial instrument at the received second time horizon; computing a representative martingale probability distribution using the forward price or the discount factor, the representative martingale probability distribution indicating probabilities of possible prices for the financial instrument at the second time horizon; computing one or more mathematical moments of the representative martingale probability distribution; and computing one or more coefficients of the second order finite difference, the one or more coefficients being based at least in part on the mathematical moments of the representative martingale probability distribution. The one or more mathematical moments of the representative martingale probability distribution can be computed using an Esscher transform of an empirical probability distribution. Further, the one or more trading strategies can be computed as orthogonal functions. In certain implementations, the method further comprises computing hedging coefficients or excess returns associated with one or more of the trading strategies as explicit functions of a price of the financial instrument. In some implementations, the trading strategies are computed without using option price data. In certain implementations, the computing the one or more trading strategies is based on one or more mathematical moments of the time horizon probability distribution, and not on any other use of the historical price data. In some implementations, the computing the one or more trading strategies is based on one or more mathematical moments of representative martingale probability distribution, and not on any other use of the historical price data. In certain implementations, the computing the one or more trading strategies is performed using only algebraic manipulations. In some implementations, the computing the one or more trading strategies is performed without using stochastic computations or differential equation computations. In certain implementations, the time horizon probability distribution is based at least in part on the historical price data.

Another one of the disclosed embodiments is a computer-implemented method that comprises receiving historical price data, the historical price data indicating one or more historical prices for a financial instrument; receiving maturity data, the maturity data indicating a maturity date for one or more options on the financial instrument; receiving contemporaneous price data, the contemporaneous price data indicating a contemporaneous or substantially contemporaneous market price for each of one or more available options on the financial instrument, each of the one or more available options having a maturity date coinciding with the received maturity date; computing a set of two or more extremal martingale probability distributions, a set of two or more conditional extremal martingale probability distributions, and one or more approximating martingale probability distributions based at least in part on the historical price data, the maturity data, and the contemporaneous price data, wherein each of the two extremal martingale probability distributions, each of the two conditional extremal martingale probability distributions, and each of the one or more approximating martingale probability distributions is determined by a fractional linear transformation of a distribution parameter function; and causing the set of two or more extremal martingale probability distributions, the set of two or more conditional extremal martingale probability distributions, and the one or more approximating martingale probability distributions to be displayed on a display device. In certain implementations, the method further comprises receiving a time horizon, the time horizon being not less than a shortest period between successive prices in the historical price data; computing one or more trading strategies based at least in part on the historical price data and the time horizon, each of the one or more trading strategies comprising a function that relates a value of the respective trading strategy to a price of the financial instrument; and causing the one or more trading strategies to be displayed on the display device. The method can further comprise, for at least one of the one or more trading strategies, computing an excess return, one or more hedging coefficients, or both an excess return and one or more hedging coefficients; and causing the excess return, the one or more hedging coefficients, or both the excess return and the one or more hedging coefficients to be displayed on the display device. In some implementations, an identification of the financial instrument and the maturity date are received from a user via a user interface. In certain implementations, the method further comprises receiving a forward price or discount factor for the financial instrument at the selected expiration date, and the computing the set of two or more extremal martingale probability distributions, the set of two or more conditional extremal martingale probability distributions, and the one or more approximating martingale probability distributions is further based at least in part on the forward price or the discount factor.

Any of the disclosed embodiments can be implemented in a computer system comprising a processor, non-transitory data storage medium, and other elements.

Non-transitory computer-readable media (e.g., one or more non-transitory computer-readable media) storing computer-executable instructions which when executed by a computer cause the computer to perform any of the disclosed methods or method acts, alone or in various combinations and subcombinations with one another, are also disclosed herein and considered to be within the scope of this disclosure. Further, non-transitory computer-readable media (e.g., one or more non-transitory computer-readable media) storing any of intermediate or final results generated at least in part by performing any of the disclosed methods or method acts, alone or in various combinations and subcombinations with one another, are also disclosed herein and considered to be within the scope of this disclosure. Also disclosed herein and considered to be within the scope of this disclosure is a computer comprising a processor and memory, the computer being configured to perform any of the disclosed methods or method acts, alone or in various combinations and subcombinations with one another. Also disclosed herein and considered to be within the scope of this disclosure is a display device displaying one or more intermediate or final results generated at least in part by performing any of the disclosed methods or method acts, alone or in various combinations and subcombinations with one another.

The foregoing and other objects, features, and advantages of the disclosed technology will become more apparent from the following detailed description, which proceeds with reference to the accompanying figures.

DETAILED DESCRIPTION

I. General Considerations

Figure 1A:
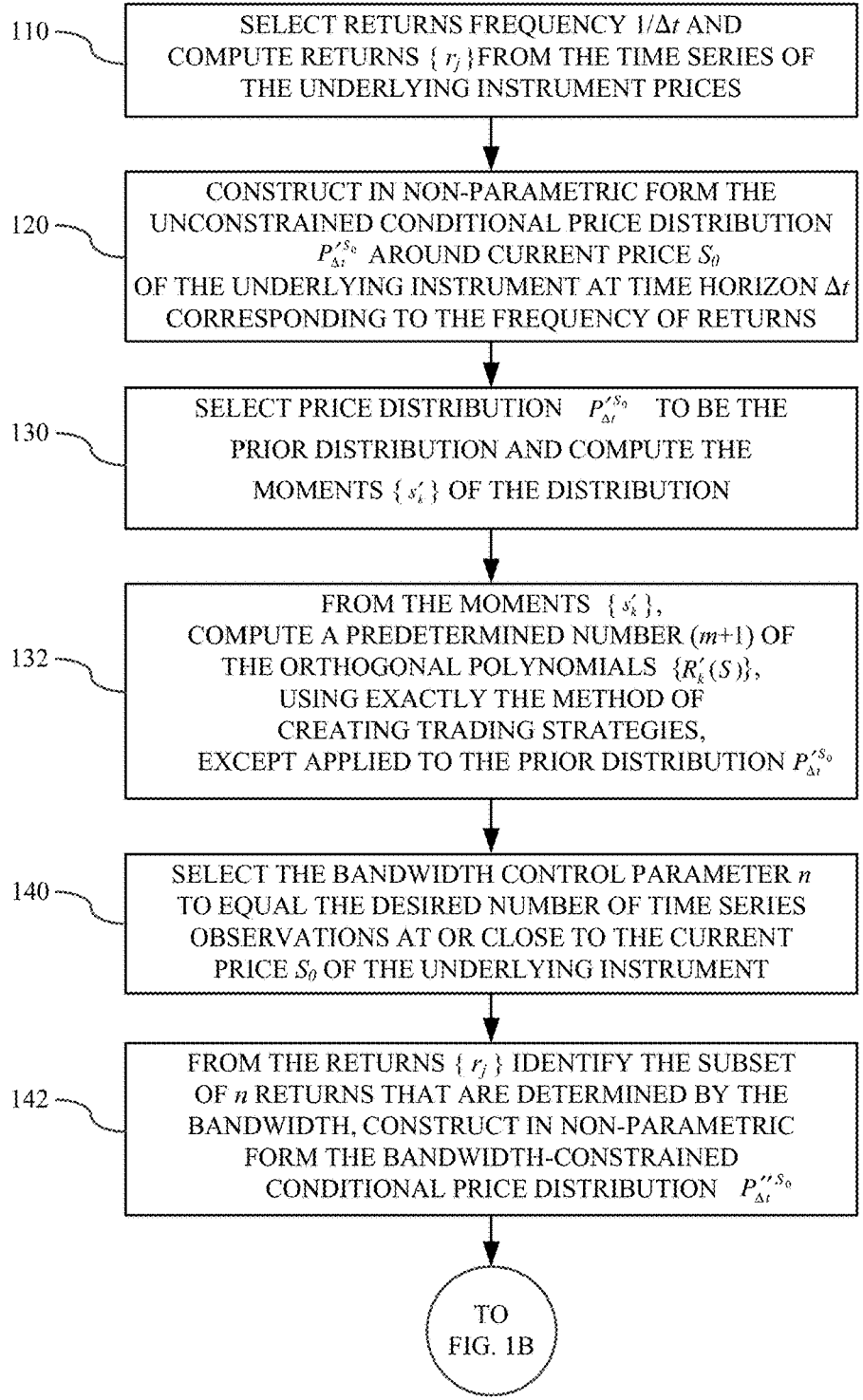
FIGS. 1A-1B show a flowchart of an exemplary technique for determining a conditional returns distribution by orthogonal series in accordance with an embodiment of the disclosed technology.

Disclosed below are representative embodiments of methods, apparatus, and systems for computing trading strategies in a financial instrument and/or for computing a probability distribution of the future price of the financial instrument. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art.

II. Introduction to the Disclosed Technology

In general, an option is a derivative whose contractual payoff is defined in terms of the price of an underlying financial instrument, which may be a futures price or an index value, as well as the price of an individual asset or basket of assets drawn from the equity, interest rate, currency, commodity, credit, or other financial markets. An option on a specified underlying financial instrument is contractually characterized by, inter alia, its maturity (or expiration) date T, its strike (or exercise) price K, and its type, such as European or American. A European call option gives the holder the right to buy the underlying financial instrument (in a pre-specified quantity) at the strike price on the maturity date. A European put option similarly gives the right to sell. For brevity, the present disclosure will refer simply to calls and puts when the type of an option is European. It is to be understood, however, that the technology is not limited by such usage and can be applied to any type of option. Options of various types, the markets in which they are traded, the underlying financial instruments and the pricing principles are described in J. C. Hull, *Options, Futures, and Other Derivatives* (2008). The disclosed technology can be adapted for use for any such type, market, or financial instrument.

One basic approach to pricing options is the Black-Scholes-Merton framework. In this approach, it is assumed that the market satisfies no arbitrage. In other words, the market precludes the possibility of a sure gain without risk of loss from trading strategies that employ finite (bounded) capital. It is postulated that the price process, written $S_t$ where t denotes time, of the underlying financial instrument follows a geometric Brownian motion, entailing a lognormal distribution at any future time. This means that log $S_t$, the logarithm of $S_t$, at a future time follows a normal (or Gaussian) distribution with a constant volatility (the square root of variance), denoted σ. On this basis, along with other assumptions, the Black-Scholes formula for a stock option states that the price at time t of a call with strike K and maturity T denoted $C_t$ (K,T), or simply C (K,T) or C (K) or C, is a certain function of the underlying price $S_t$, the time to expiry (T−t), the strike price K, certain other parameters (the cash market interest rate and the dividend rate), and the volatility σ. Whatever the model, the values of the first and second derivatives of option price C with respect to underlying instrument price $S_t$ are important in order to hedge or replicate options, and are referred to as the delta and gamma coefficients, respectively.

Under the assumption of no arbitrage, a set of prices {C (K,T)} (where { } denotes a set) of various strike prices {K} and fixed maturity T are related to a probability distribution over the underlying price at maturity date T. See, e.g., S. A. Ross, "Options and Efficiency" in *Quarterly Journal of Economics*, vol. 90(1), pages 75-89 (1976) and D. T. Breeden and R. H. Litzenberger, "Prices of State-Contingent Claims Implicit in Option Prices" in *Journal of Business*, vol. 51(4), pages 621-651 (1978). The Breeden-Litzenberger prescription states the relation:

$$\frac{\partial^2 C(K, T)}{\partial K^2} = Q(dK),$$

that the second partial derivative of the call price with respect to the strike price equals the measure (probability distribution) Q, pertaining to $S_T$, evaluated at the infinitesimal increment dK. More generally, taking a triplet of equally spaced strike prices spanning a finite increment, the relation holds for the second difference in call prices and the measure of the corresponding second difference in strike prices.

The measure Q (with fixed maturity T understood) is called the martingale measure, also referred to as the risk neutral distribution, because it pertains not to an actual observable distribution, but rather to an adjusted distribution, with the adjustment corresponding to fair market (martingale) valuation or to risk aversion of a hypothetical "representative investor". Methods to value options typically depend either implicitly or explicitly on evaluating Q (as a distribution over the price of the underlying financial instrument). According to modern finance theory, if there are no arbitrage opportunities in a financial market, corresponding to any given buy-and-hold price distribution P, representing expectations of the price that will be observed at date T, there are one or more martingale measures Q, the set being denoted {Q}. The corresponding measures {Q} are equivalent to P, meaning they share with P the same null sets (the values of price for which the probability measure is zero).

Another theorem of asset pricing asserts that the completeness of the financial market is equivalent to the uniqueness of Q and, by implication, if the market is incomplete then there exists {Q}, a set of more than one measure. By complete market is meant that the marketed financial instruments can be traded in strategies that employ finite (bounded) capital so as to replicate any bounded function defined on the probability space characteristic of the market. Intuitively, a complete market is one where all risks can be hedged by trading the existing financial instruments (it is possible to form a perfect hedge). In a complete market, an option price C is uniquely determined by Q. In an incomplete market, a perfect hedge is no longer possible. Price C is no longer uniquely determined, but rather falls within a range with upper and lower bounds determined by the set {Q}.

Through the Black-Scholes formula, a given value of volatility determines a price C (taking other parameters to be fixed). Conversely, a given price C (K) determines a volatility σ(K), called the implied volatility (with fixed T understood). Hence, the Black-Scholes formula can be viewed as a transformation of price into implied volatility, in the same way that the yield-to-maturity (or internal rate-of-return) formula transforms a bond price into a yield. When implied volatility σ(K) is plotted against K (as abscissa), in general it is not constant (in other words, it is not a horizontal straight line), contrary to what would be the case if the Black-Scholes formula were an exact description of market behavior. The typically convex shape of the plot is referred to as the implied volatility "smile" or "smirk". Further, σ(K) is not constant through time t.

A detailed empirical examination of implied volatility indicates that the form of Q is skewed by a fat left tail and has excess kurtosis (an indicator of the fourth moment relative to variance) in comparison with a lognormal distribution. Implied volatility exhibits volatility clustering through time (e.g., high levels of volatility tend to occur together), since price increments are autocorrelated, especially in the short run, through squared log returns. Further, implied volatility forms a well-defined volatility surface when plotted against K and T, but the surface changes periodically in random fashion.

To model such behavior for the purpose of option pricing, a number of different approaches can be used. In one approach, a specific martingale price process other than geometric Brownian motion is postulated (or possibly inferred through adjustment to a postulated observable price process). Then the process is used to simulate values of the implied volatility at maturities {T}, and the associated volatility surface is fitted to market values by optimizing the parameters of the model process. In a second approach, a specific functional form other than lognormal is postulated for Q (again with maturity T understood). Then Q is used to price options (of the corresponding maturity T) and the resultant prices are fitted to market values by optimizing the parameters of the model distribution. In the first approach, there is an implied Q, and only one Q, generated by the martingale process and satisfying the Breeden-Litzenberger prescription.

One example of the first approach is implied binomial and trinomial tree models, which replace geometric Brownian motion by a more general diffusion process. A second example is the Merton jump-diffusion model, which postulates a combination of a diffusion process and a jump process characterized by three parameters: arrival rate (the number of jumps per unit time), jump volatility, and jump drift. A third example is stochastic volatility models, which postulate a stochastic process for volatility, e.g. in the Hull and White model an independent geometric Brownian motion with constant coefficients. More complex processes for volatility include regime switching and jump-diffusion.

One example of the second approach is the Jarrow-Rudd parametric model, which makes adjustments to the lognormal distribution so as to match the first four cumulants (in effect, moments) of Q, as inferred from empirical data. A second example is the Jackwerth-Rubinstein smooth fitting model, which constrains the smoothness of Q according to a certain criterion, while maximizing a good fit to empirically given option prices.

Under the first approach, more generally, combinations of the various types of processes are employed. The empirical performance of a variety of models suggests that it is useful to allow certain variables in the stochastic price process themselves to be modeled as stochastic processes: jumps, volatility, and interest rates. Stochastic jumps and volatility can be important to reproducing the smile, including the smile on short-term options, while stochastic interest rates enhance the pricing fit of long-term options. In this way, the price process becomes doubly stochastic with respect to these variables, which are "latent" (not directly observable). The wider significance of latent variables in option pricing models, which is reinforced by other financial market evidence, is that markets are incomplete. When markets are incomplete, there are risks that are not separately traded.

The condition of no arbitrage is typically imposed on the models in the requirement that Q is a martingale or equivalent martingale measure (a valid probability distribution with predetermined null sets), as distinct from the joint requirement that Q is an equivalent martingale measure and is derivable from the given observable price distribution data P. The former requirement imposes only a weak constraint on Q. In technical terms, this means that the set {Q} is derived not from P, but from any distribution of the same mean and null sets as P (from that equivalence class of distributions). It is required that there exists a Q that is positive except on the null sets or, loosely speaking, that option price C (K,T) be non-decreasing in T and smile σ(K) be convex in K, at fixed T, with slope varying between −1 and zero.

A central issue in empirical tests of option pricing models is consistency between the two data sets: observed time-series data of the underlying asset price (possibly augmented by time series of option prices) and cross-sectional option prices (at a point in time, option prices grouped by common maturity), making due allowance for risk adjustment between the two. Two lines of inquiry ask "what does a model estimated from time series data imply about option pricing?" and "conditional on a given cross-section of option prices, what does the model predict about the joint behavior of asset and option prices (e.g., joint returns)?"

An example responding to the second question is that option returns are a levered function of asset returns, the function depending on option price. Experience with stochastic volatility models, however, shows that deriving plausible model parameters from time series data gives a poor fit to smiles compared to unconstrained parameters. More generally, in a variety of models, combining cross-sectional options data with time-series underlying asset price data effectively degenerates into a two-stage procedure, with option prices implying Q and realizations of latent variables, and time series asset prices implying the remaining parameters of the model.

These difficulties become acute in attempting to value risk premia for latent variables, such as stochastic jumps, volatility, and interest rates, which are not directly priced by other traded assets. In some early models, the risk premium was assumed to be zero (e.g., for jump risk in the Merton jump-diffusion model, and for stochastic volatility in the Hull and White model), by virtue of the assumption that the unhedged risk was diversifiable. In other models, the risk premium is assumed to take a specific parametric form and is fitted as a residual, e.g., in affine models the pricing kernel connecting P and Q is assumed to be exponential affine in the state vector. The common feature of these assumptions is that they impose pseudo-completeness on an incomplete market (e.g., unhedged risk becomes diversifiable or P is uniquely adjusted by the risk aversion of an implicit representative investor).

One of the costs of pseudo-completeness is the absence of a rational no-arbitrage basis for determining optimal upper and lower bounds to an option price. To avoid such pseudo-completeness, some have even abandoned the no-arbitrage paradigm and attempted to infer asset price bounds from another criterion (e.g., "good deal" excess return-to-risk ratios).

Numerical methods for implementing option models use, most often, one of three empirical techniques: Fourier inversion; finite difference methods; or Monte Carlo simulation. Calibrating models to market data is a computationally demanding task. The reason is that one must compute numerical solutions to partial differential equations (or, with lattice methods, stochastic differential equations) and, in the case of price processes with jumps, solutions to partial integro-differential equations. The computational burden can be important because option pricing models are typically updated daily or more frequently, and the results are needed quickly during "real time" trading sessions. An instance of the consequent limitations is Monte Carlo simulation, which often is run to determine only the mean of an option price under the distribution Q.

Associated to option pricing through each martingale measure Q (for a given underlying financial instrument) is a set of trading strategies. These strategies are defined by the property that successive strategies, starting from the two strategies of invest in the cash asset and buy-and-hold the underlying financial instrument, are uncorrelated under the probability measure Q. The absence of correlation can be desirable because it enables portfolio managers to control risk and return more accurately. In particular, it means that a portfolio manager who is willing to bear higher risk can aim to earn systematically higher returns. In recent years (especially since about 2003 on), hedge funds have become prominent active traders in a wide variety of financial markets, and many have earned superior returns against pre-specified benchmarks (such as the S&P 500 index). Empirical investigation suggests that hedge funds, including the so-called commodity trading advisors (CTAs), employ just such uncorrelated trading strategies. Efforts to explain and replicate hedge fund trading strategies have been essentially empirical, in that they seek to reproduce (e.g., through regression techniques) observed hedge fund returns on the basis of selected asset class returns in "liquid" (easily traded) assets. Such replication is important because hedge funds charge high management and performance fees, typically are illiquid (they restrict withdrawal of investment funds), and are opaque in that they limit disclosure of their proprietary trading strategies.

Further, the set of trading strategies provides an optimal hedge in an options portfolio, in the sense that a finite number of such strategies, if they were traded as derivative financial instruments in a frictionless market, would be able to hedge any options exposures almost completely. The possibility of optimal hedging has not been generally recognized by financial market investors, however. Optimal hedging is desirable because some banks, investment banks and other financial intermediaries hold large portfolios of options, acquired in the course of their customer flow of trading business, which constitute substantial risk exposures. The intermediaries seek to hedge these risk exposures through continuous hedging, day-by-day. The trading strategies and the option hedging strategies follow exactly the same trading pattern and may be considered to be one and the same thing. In practice, they differ in the way in which the time horizon for the strategy is determined. The trading strategy time horizon is based on a trading view as to when certain events may occur. The option hedging strategy time horizon is based on the maturities of the options to be hedged.

Accordingly, it is desirable to provide improved methods and systems for creating uncorrelated trading strategies in the underlying financial instrument, and for computing associated probability distributions to determine option prices.

Disclosed herein are embodiments of methods, apparatus, and systems for creating uncorrelated trading strategies in a financial instrument and computing probability distributions of the future price of the financial instrument. The disclosed embodiments can be used to realize a number of possible advantages. For example, in certain embodiments, the disclosed methods and systems do not, in effect, discard much of the information contained in historical time series data of the underlying asset price, but rather utilize that data in option pricing, without the need to select a specific parametric functional form for either the martingale measure Q, or the price process, or the risk premium (risk aversion) factor. In some embodiments, the disclosed methods and systems do not ignore or finesse the incomplete nature of the financial market, but rather incorporate it in a joint no-arbitrage requirement that Q is an equivalent martingale measure and is derivable from the data-determined P, so as to provide rational optimal bounds to option prices. In certain embodiments, the disclosed methods and systems significantly reduce the computational burden of option pricing. In some embodiments, the disclosed methods and systems generate explicit formulae (and related hedging parameters) for uncorrelated trading strategies in the underlying financial asset (instrument), independently of whatever might be inferred from hedge fund trading strategies or financial intermediary option hedging strategies.

III. Exemplary Embodiments for Computing Trading Strategies for Use in Portfolio Management and/or for Computing Probability Distributions Embodiments of the disclosed technology are capable of computing trading strategies for use in portfolio management (trading portfolios), and/or for computing associated martingale probability distributions for use in pricing financial derivatives. Embodiments of the disclosed technology will be illustrated with reference to a call option on a stock that does not pay dividends (which may be thought of as a portfolio of the stock and its accumulated dividends, re-invested in the stock). It is to be understood, however, that the technology is more generally applicable to other options, financial instruments, and trading strategies.

A. Overview of Disclosed Embodiments for Generating Trading Strategies and Probability Distributions In certain embodiments disclosed herein, two sets of cleaned price data are used: first, historical price data for the underlying instrument, including the current price, comprising a high frequency time series (such as daily closing prices); and second, current contemporaneous price data for the plurality of options, together with the corresponding strike price and maturity (expiration date) for each option, comprising options of discrete strike prices at each of discrete times to maturity. Further, the contemporaneous price data for the options, which may not be exactly contemporaneous (e.g., differing as to time of day), can be accompanied by corresponding (paired) price data for the underlying instrument, each corresponding price pair being contemporaneous, or nearly so (e.g., within a time threshold, such as within a minute, 5 minutes, an hour, or any other suitable threshold). The data for the underlying instrument can pertain to some historical interval from a starting date to the current date, and to some maximum frequency (such as daily). The data for the options can be grouped by each maturity T, and each such group can comprise options with a discrete set of strike prices. In addition, a contemporaneous present value discount factor can be provided for each maturity T derived from, for example, a forward price for the underlying instrument or a risk-free interest rate.

In some embodiments, a probability distribution model is defined by a distribution parameter function $\phi$, which constitutes one or more parameters, depending on the form of the function.

In certain embodiments, a short time interval $\Delta t$ that separates historical price data can then be selected, and the underlying instrument data can determine a buy-and-hold returns density at frequency $1/\Delta t$ (such as a daily returns density), where the integrated density (the cumulated density) corresponds to the historical probability distribution of returns. The returns density can be expressed, for example, in percent per unit time (e.g., scaled by $1/\Delta t$) and can be normalized by the number of observations so as to have total weight of unity. From the returns density, a conditional distribution of prices $P_{\Delta t}^{S_0}$ can be calculated, conditional on the current price which is denoted $S_0$. In particular embodiments, the conditional distribution is estimated from a prior distribution by orthogonal series. Other embodiments can employ financial econometrics known to those skilled in the art. One particular embodiment, for example, uses the so-called double-kernel method. Another embodiment uses the statistical model known as asymmetric GARCH.

In some embodiments, the values of the set of moments $\{s_k^*\}$ of the conditional distribution $P_{\Delta t}^{S_0}$ are computed (e.g., the mean, the variance, and so on). (In particular embodiments, a prespecified number of moments is computed.) The trading strategies $\{R_k^*\}$ pertaining to the conditional distribution $P_{\Delta t}^{S_0}$ can be determined, as explicit analytic functions that are orthogonal polynomials in the underlying instrument price, by algebraic computations with the moments $\{s_k^*\}$. In certain embodiments, the trading strategies represent the relative value of position to be taken in the financial instrument, dependent on (as a function of) the instrument's current market price, by trading (e.g., daily or more frequently). (The overall scale of the position can be user-selected.) The position can be, for example, long (buy) or short (sell short). The strategies can be displayed to the investor or other user of the disclosed technology in the form of electronically displayed graphs plotting the value of position against the market price of the instrument, for each strategy. In particular embodiments, a prespecified number of strategies is determined.

Two sets of coefficients, $\{a^*_k\}$ and $\{b^*_k\}$, can also be computed from the moments $\{s^*_k\}$ and the strategies $\{R^*_k\}$. In some embodiments, the coefficients $\{b^*_k\}$ are checked to ensure that none of them is equal or very nearly equal to zero, and they are adjusted if necessary in accordance with a predetermined or user-selected parameter (a small number) ε. The two sets of coefficients (adjusted if necessary) determine a matrix $L_0$, the generator of the conditional distribution. The eigenvalues $\{\lambda^*_k\}$ of the matrix $L_0$ can then be computed. In certain embodiments, the eigenvalues are checked to ensure that no two of them are equal or very nearly equal, and they are adjusted if necessary in accordance with a predetermined or user-selected parameter (a small number) η. The matrix $L_0$ can be adjusted to ensure that the lowest eigenvalue, $\lambda^*_0$, is equal to or nearly equal to zero. The eigenvalues represent the (expected) excess returns on the corresponding trading strategies, expressed as a return (percent per annum) in excess of the cash market interest rate. The excess returns can be displayed to the investor or other user of the disclosed technology in the form of an electronically displayed graph plotting the size of the excess return (e.g., a histogram) against a respective strategy, ordered by increasing risk class (e.g., by order of trading strategy). Hedging coefficients, such as delta and gamma, for the trading strategies can also be determined as explicit functions by related algebraic computations. The hedging coefficients represent the change in the value of a position to be made by an investor when the current market price of the financial instrument changes by a small amount. The coefficients can be displayed on a display device (e.g., by being plotted against market price of the instrument). The strategies and hedging coefficients can be determined regardless of whether or not options are traded on the underlying financial instrument.

In certain embodiments, a maturity T is selected, corresponding to a selected group of option prices. Each maturity and group can be taken in turn or a specific maturity T can be selected (e.g., by a user via a graphical user interface). From the eigenvalues $\{\lambda^*_k\}$ and the strategies $\{R^*_k\}$, a conditional martingale probability distribution of future financial instrument prices at time T (e.g., implied solely by underlying instrument prices) can be computed. This conditional martingale probability distribution is denoted $Q_T^{S_0}$ or $Q_T^{S_0}(S)$. Probability distributions and densities can be defined in current value terms (over the price $S_T$ prevailing at time T to which the distribution or density pertains). The conditional martingale probability distribution $Q_T^{S_0}(S)$ can alternatively be determined from the counterpart empirical probability distribution, denoted $P_T^{S_0}(S)$, which itself may be derived from the set of historical prices for the underlying instrument, by the method of the Esscher transform (exponential tilting).

In some embodiments, and in a similar manner to earlier computations with $P_{\Delta t}^{S_0}$, the values of the set of moments $\{s_k\}$ of the conditional martingale distribution $Q_T^{S_0}$ are computed. (In embodiments, a prespecified number of moments can be computed.) The orthogonal polynomials $\{R_k\}$ pertaining to the maturity date T can be determined, as explicit analytic functions in the underlying instrument price, by algebraic computations with the moments. Two sets of coefficients, $\{a_k\}$ and $\{b_k\}$, can be computed, associated to the polynomials $\{R_k\}$ and the moments $\{s_k\}$, and the coefficients $\{b_k\}$ can be adjusted if necessary to be non-zero. Also, an auxiliary set of orthogonal polynomials can be determined as explicit analytic functions by algebraic computations with the moments $\{s_k\}$ and the polynomials $\{R_k\}$.

In certain embodiments, a two-by-two transformation matrix, called the Nevanlinna matrix, is determined by algebraic computations with the coefficients $\{b_k\}$, the orthogonal polynomials $\{R_k\}$, and the auxiliary set of polynomials. Each element of the transformation matrix can be determined as an explicit analytic function that is a quasi-orthogonal polynomial (as explained later).

In some embodiments, the Stieltjes transform $\mathbb{S}[Q]$ (an integral transform) of the sought-after distribution Q (the distribution that best implies the given option prices, consistent with historical financial instrument prices), can be determined by the distribution parameter function φ, through the transformation matrix (the Nevanlinna matrix). The relation between $\mathbb{S}[Q]$ and φ is that $\mathbb{S}[Q]$ is a linear fractional transformation of φ (a fraction corresponding to the ratio of two linear transformations of φ). By means of an inverse Stieltjes transform, the measure Q can be computed from the functional value of the distribution parameter function φ (the values of the function for each value of its argument), if the latter is known or specified. In these embodiments, the distribution parameter function φ belongs to a certain class of functions, namely the compactified Nevanlinna class. Consequently, the distribution parameter function φ is characterized by two extremal values, a maximum and a minimum.

In certain embodiments, the extremal measures (distributions) $Q_F$ and $Q_K$, respectively called the Friedrichs and Krein measures, are determined by means of an inverse Stieltjes transform from the extremal values of the distribution parameter function φ. $Q_F$ and $Q_K$ correspond respectively to the optimal upper and lower bounds on option prices, and can be used to compute those bounds, when the contractual specification of an option is given. Using embodiments of the disclosed technology, the upper and lower bounds on option prices can be determined regardless of whether or not options are traded on the underlying financial instrument.

In some embodiments, an initial value $\tau_0$ of the distribution parameter function φ is determined, subject to the initial (transient) requirement that φ take the form of a constant scalar value τ, by optimization in accordance with the selected group of option prices corresponding to the selected maturity T. Optimization can determine the optimal value $\tau_0$ of the scalar τ by selecting a series of test values of τ, and for each test value computing the implied distribution by means of an inverse Stieltjes transform, computing the consequent implied option prices, and selecting the value $\tau_0$ that implies option prices that best approximate the group of option prices. In this way, an initial estimate of the martingale distribution Q can be determined, corresponding to $\tau_0$. The distribution Q pertains to the selected maturity T, and is sometimes denoted by $Q_T$ to emphasize the connection. Additionally, a set of n initial values $\{\tau_i\}_{i=1}^n$ of the distribution parameter function φ, where n denotes the number of option prices in the selected group, can be determined by the procedure just described, except that the optimization is in accordance with a single option price in the selected group, each price being taken in turn.

In certain embodiments, if the set of option prices of selected maturity T is not contemporaneous (within the set), the model can be calibrated based upon the set of contemporaneous underlying instrument prices.

In some embodiments, an initial value of another matrix (the value of each matrix element), an interpolation data matrix called the Pick matrix, is determined in accordance with the selected group of options data and the initial values $\{\tau_i\}_{i=1}^n$, given the underlying instrument data. The Pick matrix expresses the gradient of the distribution parameter function ϕ with respect to the strike price K. It is a matrix of dimension n-by-n and its off-diagonal elements are equal to differences in the $\tau_i$ taken in pairs, each divided by the difference in the corresponding option strike prices. The diagonal elements are determined by each $\tau_i$ in turn by a formula expressing an upper bound to a certain combination of weights in the distribution that is sought after.

In certain embodiments, the initial value of yet another matrix, an auxiliary two-by-two transformation matrix called the Potapov matrix, is determined in accordance with the initial value of the Pick matrix, the initial values $\{\tau_i\}_{i=1}^n$, and the n values of the strike prices of options in the selected group. The possible values of the distribution parameter function ϕ are now constrained, through the Potapov matrix, by an auxiliary distribution parameter function U, called the interpolation parameter function or, in brief, the interpolation function. The interpolation function U also belongs to the compactified Nevanlinna class of functions. The relation between ϕ and U is that ϕ is a linear fractional transformation of U. Various techniques can be used to determine an initial and subsequent values of the interpolation function U. In one embodiment, for instance, a requirement is imposed that the distribution parameter function ϕ belongs to a certain minimal sub-class of functions consistent with n, the number of prices provided in the selected group of options data. (The initial requirement that ϕ be a constant scalar can be dropped at this stage.) As a consequence, the interpolation function U can take the functional form of a constant scalar value, which is also denoted by U. An initial value $U_0$ of U can be determined by setting $U_0=\tau_0$, the initial value of the distribution parameter function ϕ.

In some embodiments, in an iterative process, a second value of the distribution parameter function ϕ, now a functional value denoted $\phi_{U_0}$, is determined as an explicit analytic function by the initial value of the Potapov matrix and the initial value of the interpolation function. A second estimate of the distribution Q can be determined by means of an inverse Stieltjes transform from the second value of the distribution parameter function ϕ, taken as a function (together with the value, now fixed, of the Nevanlinna matrix). The implied values of the prices of the options in the selected group can be computed from the estimate of the distribution. Additionally, a set of constant scalar test values $\{U_i\}$ of U are selected that lie close to $U_0$ and may fall in a similar range to that spanned by the maximum and minimum of the initial values $\{\tau_i\}_{i=1}^n$. From each value of $U_i$, a distribution parameter function $\phi_{U_i}$ can be calculated, the corresponding distribution $Q_i$ can be determined by means of inverse Stieltjes transform, and a corresponding set of implied values of the prices of the options in the selected group can be computed.

Various techniques can be used to determine a final estimate of the distribution Q. In one embodiment, for example, the final estimate is taken to be the distribution $Q_i$ that implies option prices that best approximate the selected group of option prices. In another embodiment, a second value of the Pick matrix is constructed before the final estimate is determined. Accompanying the final estimate, extremal measures $Q_H$ and $Q_L$ are calculated from the extremal values of U, corresponding respectively to conditional upper and lower bounds on option prices, which are conditional on the option price data.

The preceding method acts, onwards from the selection of a maturity T corresponding to a group of option prices, can be repeated for each group of options data, thereby determining distributions $\{Q_T\}$ pertaining to each of the option maturities $\{T\}$. In one embodiment, for example, the final (scalar) values $\{U_T\}$ of the interpolation function pertaining to the maturities $\{T\}$ are smoothed as a function of maturity, and the smoothed values are used at each maturity to determine a smoothed set of distributions $\{\widetilde{Q_T}\}$ that characterize the options market taken as a whole, with associated implied smoothed option prices.

Graphical displays can be generated and displayed on a suitable display device (e.g., a computer monitor, tablet display, smart phone display, or other display device) for each of the lower order trading strategies, optionally accompanied by one or more of the respective delta, gamma, and/or other hedging coefficients; and, at each of the selected maturities $\{T\}$, the display can include each of the martingale distributions $\{Q_T\}$, optionally accompanied by the respective optimal upper and lower bounds to the distribution and, optionally, the conditional upper and lower bounds. In certain embodiments, the displays can be plotted against, for example, the current market price of the underlying financial instrument.

B. Theoretical Foundations

The theoretical foundation for at least some of the embodiments described above is based on transforming empirically observed option price data into martingale probability distributions through a certain inverse integral transformation, given historical financial instrument price data. Under the assumption of no arbitrage in incomplete markets, there exists a set of martingale probability distributions $\{Q_T(S)\}$ that expresses market expectations regarding the potential future prices $\{S\}$ at time T of a financial instrument. Each $Q_T(S)$ incorporates a risk adjustment and, therefore, differs from the probability distribution $P_T(S)$. When a plurality of options on the underlying instrument are traded, of expiration date T and various strike prices, the observed transaction prices, together with $P_T$, provide information on $Q_T$ in the form of $\mathbb{S}[Q_T]$, the Stieltjes transform of $Q_T$. $\mathbb{S}[Q_T]$ is an integral transformation (a kind of weighted average of $Q_T(S)$ over all prices S). By means of the inverse Stieltjes transform (an inverse integral transformation), the values of each probability distribution $Q_T$ can be recovered from the option prices. The set of all $\{Q_T\}$ is determined by the set of all possible distribution parameter functions $\{\phi 0\}$ (a non-denumerably infinite set of cardinality the continuum). The short-run conditional probability distribution $P_{\Delta t}(S)$ can be used to determine a set of uncorrelated trading strategies that provide both excess returns commensurate with a predetermined risk class in an investment portfolio, and optimal hedging in an options portfolio.

More specifically, the starting point for certain embodiments of the disclosed technology is that, assuming no arbitrage, market expectations necessarily take the form of a present value operator that is a self-adjoint extension of the empirically observed operator. Trading strategies are eigenfunctions, necessarily orthogonal, of the self-adjoint extensions. In general, there is an infinite set of possible self-adjoint extensions, corresponding to the incomplete nature of financial markets. In certain cases, the mathematical theory of self-adjoint extensions of operators coincides with the classical theory of moments. The theory of moments describes the set of all possible probability distributions for which each moment $s_k$ (in an infinity of moments $s_0, s_1, s_2, \ldots$) equals a prescribed value (e.g., empirically prescribed). In some embodiments of the disclosed technology, the set of possible probability distributions is determined by the so-called Nevanlinna parametrization, in accordance with the Nevanlinna matrix (which can be used to encapsulate the underlying instrument data, as discussed below) and the distribution parameter function $\phi$, through a Stieltjes transform. To arrive at one distribution out of the many, one can construct a so-called Nevanlinna-Pick interpolation problem with a Pick matrix determined in accordance with the options price data. Finally, any such distribution can be approximated arbitrarily closely by one of the so-called m-canonical solutions, where m is any positive integer. An m-canonical solution is characterized by m free parameters (along with m+1 other parameters which may be considered fixed in the current context). For that reason, embodiments of the disclosed technology select an n-canonical solution, where n is the number of price observations (the number of options) in the selected group of options data.

Figure 2A:
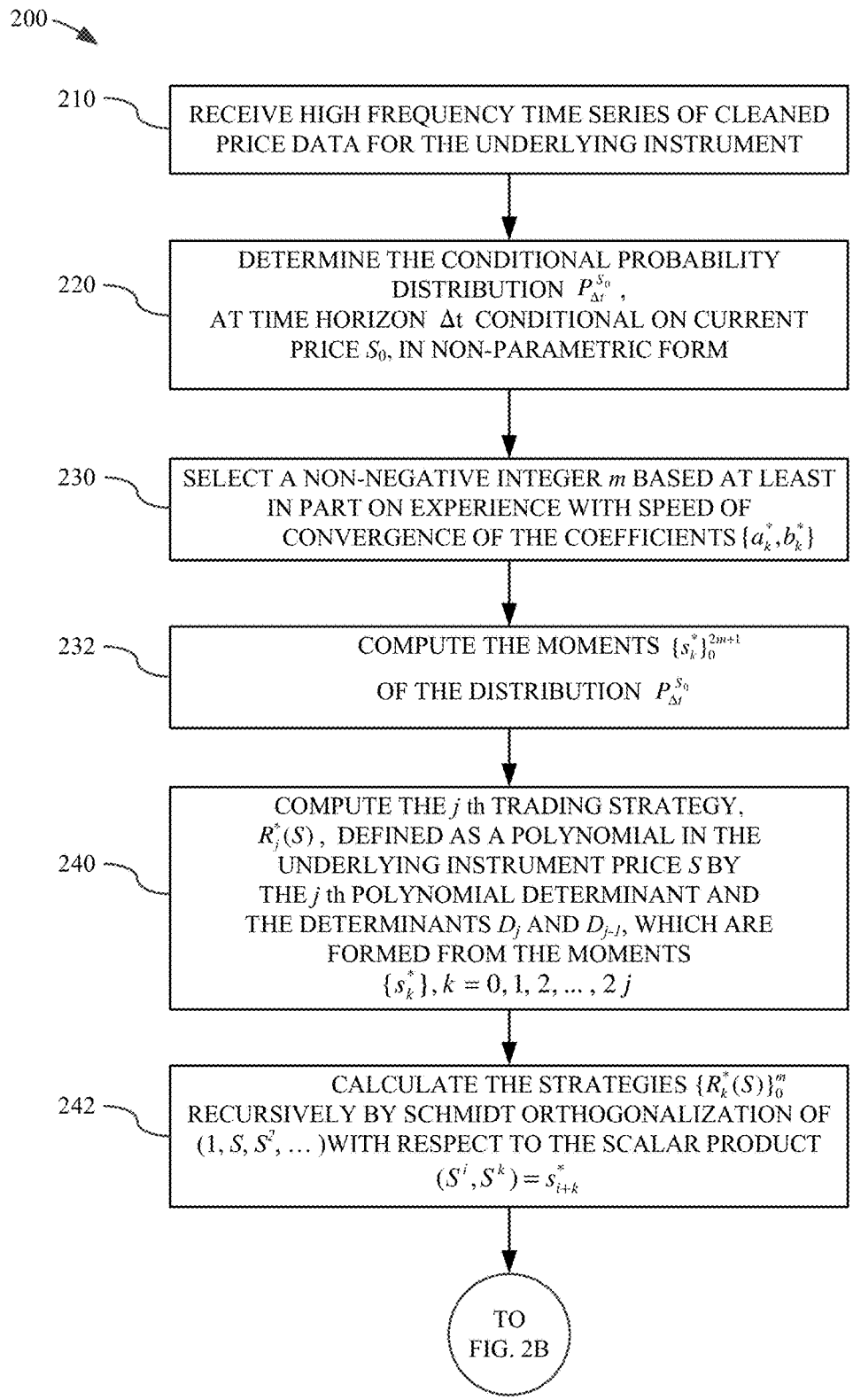
FIGS. 2A-2B show a flowchart of an exemplary method for creating a trading strategy, and associated hedging coefficients, in accordance with an embodiment of the disclosed technology.
Figure 2B:
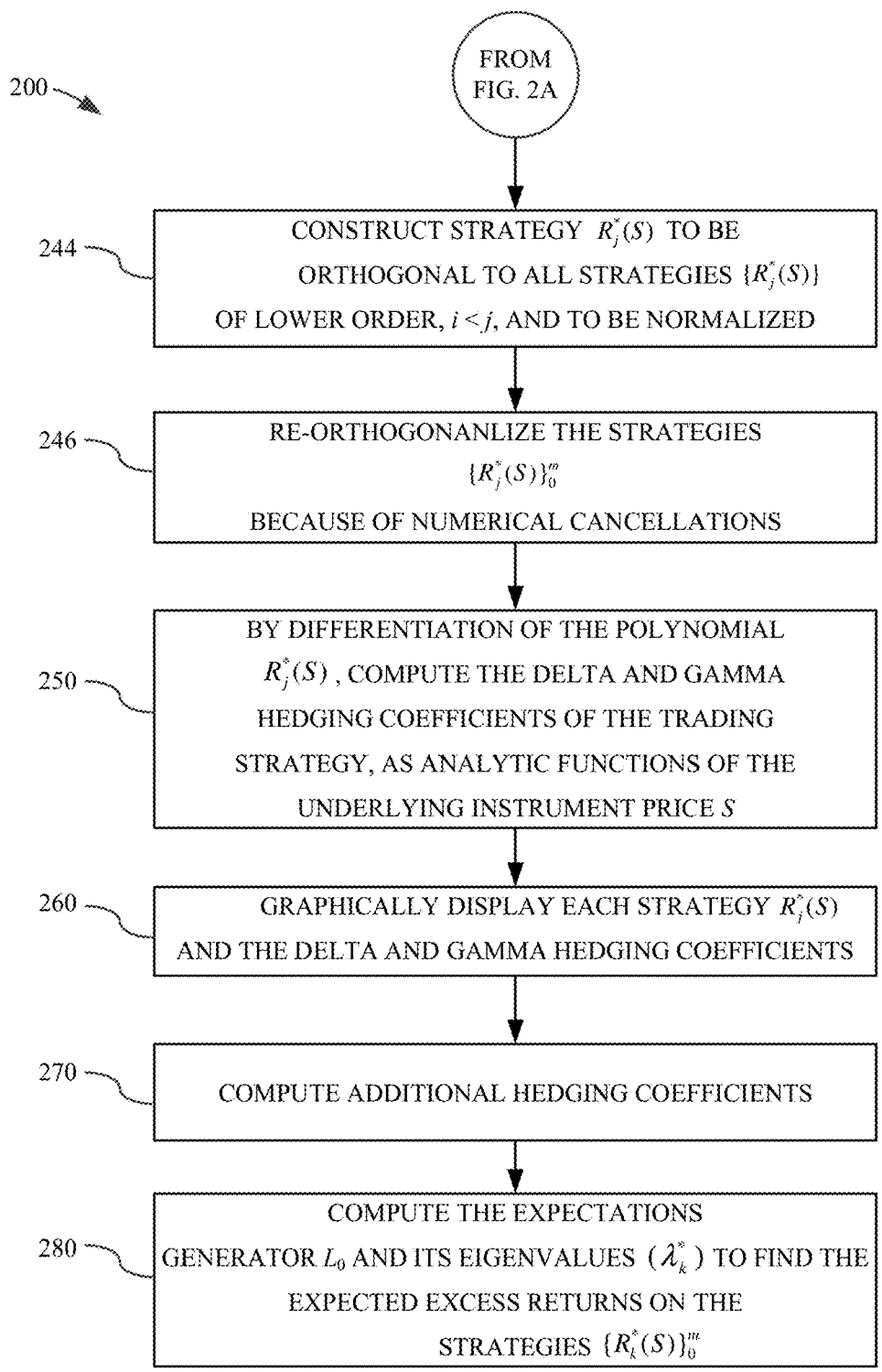

C. Detailed Description of Embodiments for Generating Trading Strategies and Probability Distributions 1. Generating Trading Strategies, Associated Hedging Coefficients, and Expected Excess Returns Using a Probability Distribution Model FIGS. 2A-2B show a flowchart 200 of an exemplary method for creating a trading strategy, and associated hedging coefficients, in accordance with an embodiment of the disclosed technology. In particular, the exemplary method in FIGS. 2A-2B is a method for generating trading strategies, associated hedging coefficients, and expected excess returns using a short-run probability distribution model. The exemplary method illustrated in FIGS. 2A-2B should not be construed as limiting, however, as any one or more of the illustrated acts can be performed alone or in various combinations and subcombinations with other method acts.

At 210, historical price data for the underlying financial instrument are received (e.g., buffered into memory or otherwise input and prepared for further use). The underlying instrument may be a stock, or basket of stocks, or stock index, or taken from some other asset class, including interest rates, currency exchange rates, commodity prices and credit spreads (or may relate to other areas of economic importance, such as energy, weather and catastrophe). In particular, as noted earlier, embodiments of the disclosed technology can be applied to a single asset, a single asset class, such as a market index, and/or a fixed weight portfolio, such as a basket of assets. The data may be already available to traders, portfolio managers, or investment banks that wish to employ embodiments of the disclosed technology (e.g., data stored in computer data storage areas). Alternatively, the data can be obtained from commercially available sources, including electronic disseminators of information (such as Bloomberg or Reuters), securities exchanges, and other data vendors. In certain desirable embodiments, price data pertains to actual trades or to indicative quotes or prices marked by traders (e.g., certain over-the-counter markets). In certain embodiments, the historical price data comprises a high frequency time series, meaning prices of at least daily frequency and possibly intra-day frequency (e.g. daily closing prices in the form of bid-ask spread), typically accompanied by the day's high/low prices. (Daily high/low prices are not typically used in an explicit mechanistic way, but can be used in a qualitative way by those skilled in the art to assess characteristics of the data (e.g., the reliability of the data).) When prices are provided in the form of a bid-ask spread, in some embodiments of the disclosed technology, the average of the bid and ask prices (or possibly some other derived quantity) is taken to be the price for the purposes of analysis. The time series can include, for example, the current price $S_o$ meaning, for example, the previous day's closing price, or the prevailing price in the market today within the last hour, or a price that prevailed in recent weeks or within another selected time period that is of interest for analysis. The contemporaneous price data can comprise, for example, a set of current or recent option prices $\{C_i\}$, grouped by each maturity (the expiration date) T, pertaining to a set of strike prices $\{K_i\}$. (If data is provided in the form of implied volatilities, they can be converted to prices.) The option prices may not be exactly contemporaneous (e.g. they may differ by one hour or other time interval during the trading day), but are desirably accompanied by pairwise contemporaneous current prices $\{S_i\}$ for the underlying instrument. The time series current price $S_0$ for the underlying instrument can be taken to be one of these pairwise contemporaneous current prices $\{S_i\}$. The prices can be provided in the form of a bid-ask spread, and the average of the bid and ask prices (or possibly some other derived quantity) can be taken to be the price in certain embodiments of the disclosed technology. In some embodiments, the data is supplemented by a real time datafeed (e.g. through an electronic data platform). Any of the time frequency or the overall length of the time series can be user-selected (via a graphical user interface) or predetermined.

In some embodiments, the data is provided in "cleaned" form. For example, the data can be filtered for erroneous and suspect or otherwise unsuitable prices, or can be cleaned by the trader, portfolio manager, investment bank, or other such entity, or by a commercial company skilled in such cleaning (such as Olsen Ltd.). Preferably, the data is cleaned according to a predetermined or user-selected set of guidelines. Simple examples of cleaning include, for time series, the removal of prices that deviate from the median of preceding and following neighbouring prices by more than a predetermined or user-selected amount. Such cleaning can be desirable for intra-daily data. A discussion of suitable data cleaning procedures that can be used with embodiments of the disclosed technology and the construction of databases is given in the book Dacorogna et al., *An Introduction to High Frequency Finance*, Chapter 4 (2001). The degree of cleaning and the frequency of the data provided will depend on, among other factors, the trading, hedging and pricing objectives of the traders, portfolio managers, investment banks, or other such entities who employ embodiments of the disclosed technology.

At 220, the distribution of short-run (namely, time horizon $\Delta t$) future prices of the underlying instrument conditional on the current price $S_0$, denoted by $P_{\Delta t}^{S_0}(S)$, is determined by the cleaned historical price data for the underlying financial instrument. According to one particular embodiment of the disclosed technology, the data points in the time series of historical price data are assumed equally spaced in time, though this need not be the case in actual implementations of the disclosed technology. In one exemplary embodiment, for instance, the conditional price distribution $P_{\Delta t}^{S_0}(S)$ (also referred to as the short-run probability distribution) is computed from every possible pair of price observations in the time series separated by the selected time interval. For example, in this particular embodiment, if there are 1,000 consecutive daily price observations, and the selected time interval is daily, the number of returns calculated is 999; if the interval is 2 days, the number is 998. Accordingly, in this embodiment, "short-run" refers to the time horizon $\Delta t$, which is user selected or pre-determined.

Figure 1B:
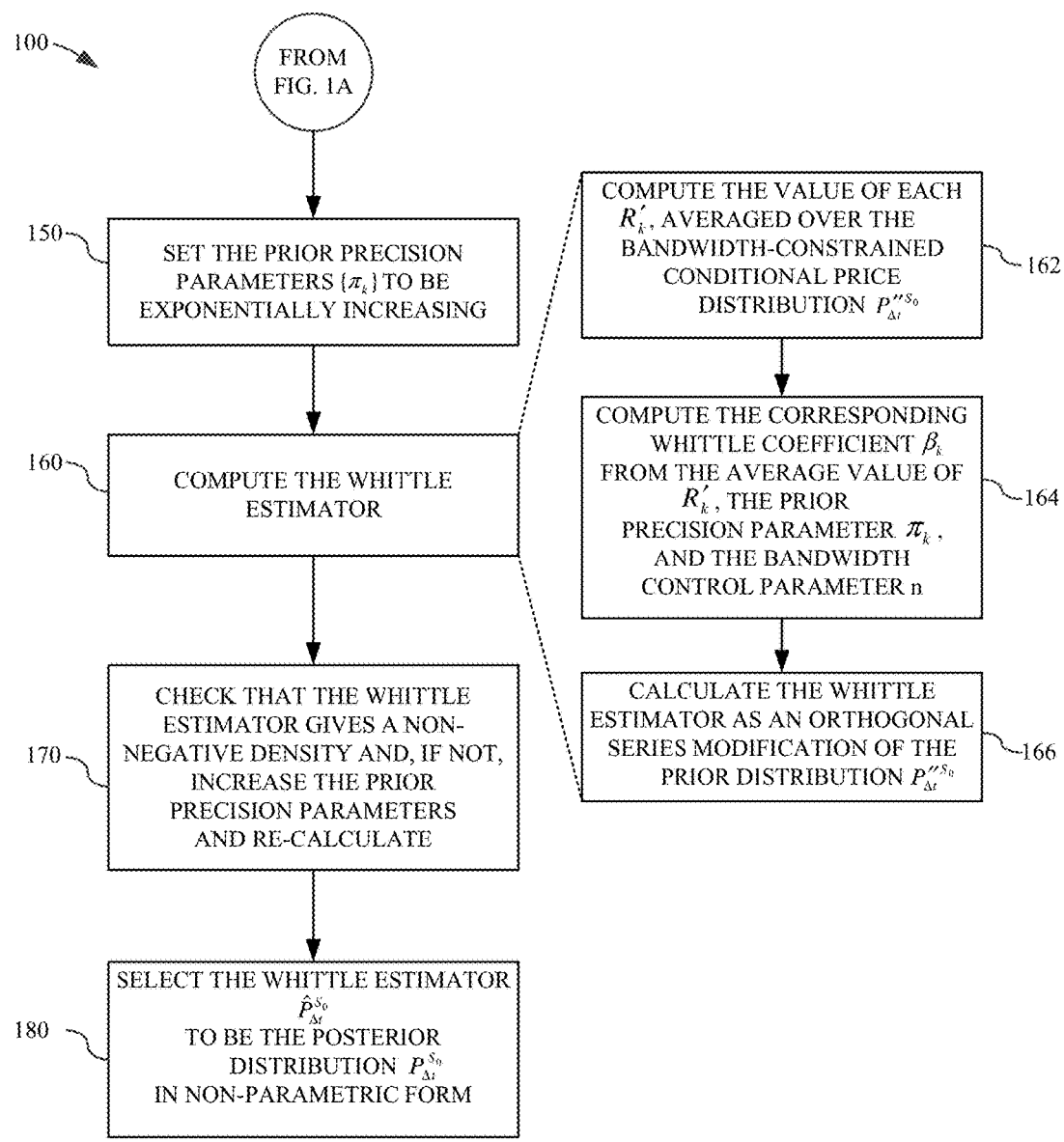

A variety of methods can be used to compute the short-run probability distribution $P_{\Delta t}^{S_0}(S)$. One exemplary method using a Whittle estimator is illustrated in FIGS. 1A-1B and discussed below in Section III.C.2. In an alternative embodiment, the conditional distribution $P_{\Delta t}^{S_0}(S)$ is estimated by the double-kernel method (see, e.g., J. Fan and Q. Yao, *Nonlinear Time Series*, section 6.5 (2005)). In another embodiment, the conditional distribution $P_{\Delta t}^{S_0}(S)$ is estimated by asymmetric GARCH (see, e.g., J. V. Rosenberg and R. F. Engle, "Empirical Pricing Kernels" in *Journal of Financial Economics*, vol. 64, pages 341-372 (2002)). Other alternative embodiments include truncating the time series to a shorter time horizon (possibly accompanied by selecting a higher returns frequency $1/\Delta t$), and using time weighted prices.

In the embodiment illustrated in FIGS. 2A-2B, the trading strategies $\{R^*_k\}$, the associated hedging coefficients delta, $\{\Delta_k\}$, and gamma, $\{\Gamma_k\}$, and the expected excess returns (above the cash interest rate) $\{\lambda^*_k\}$ are determined by the conditional distribution $P_{\Delta t}^{S_0}(S)$, through the moments of the distribution. The strategies, hedging coefficients, and expected excess returns can be determined, for example, regardless of whether or not options are traded on the underlying financial instrument (as noted earlier). At the outset, a theoretical observation about the illustrated embodiment is that, while it is desirable that the strategies $\{R^*_k\}$ relate to the martingale distributions $\{Q\}$ derived from the empirically observed distribution $P_{\Delta t}^{S_0}(S)$, it turns out that the strategies are in fact the same set for the martingale distributions because they are related to a single empirical approximation to the expectations generator (described below), implying that only one set of $\{R^*_k\}$ need be calculated. Then the values of the set of moments $\{s^*_k\}$ of the conditional distribution $P_{\Delta t}^{S_0}$ are computed, in accordance with the usual definition for $s^*_k$, the k-th moment:

$$s^*_k = \int_0^\infty S^k P_{\Delta t}^{S_0}(dS), k=0, 1, 2, \ldots.$$

In the illustrated embodiment, the computation proceeds as follows. At 230, an integer m (non-negative) is selected so as to determine the number of moments to be computed. (In certain embodiments, the number m can be in agreement with the integer m selected during the computation of the conditional price distribution $P_{\Delta t}^{S_0}$. For example, the number m can be the same as the number m discussed below with respect to FIGS. 1A-1B.). The selection of m can be based on, among other factors, experience with the speed at which the corresponding $\{a^*_k\}$ and $\{b^*_k\}$ coefficients, described below, converge to approximately fixed values.

At 232, the first $2m+2$ moments $\{s^*_k\}_0^{2m+1}$ are computed, including the zeroth moment $s^*_0$ which is set equal to unity, thereby normalizing the probability distribution to unity.

At 240, the trading strategies $\{R^*_k\}$ are determined as orthogonal polynomials in the underlying instrument price by the following formulae:

$$R^*_k(S) = \frac{1}{\sqrt{D_{k-1} D_k}} \begin{vmatrix} s^*_0 & s^*_1 & \ldots & s^*_k \\ s^*_1 & s^*_2 & \ldots & s^*_{k+1} \\ \ldots & \ldots & \ldots & \ldots \\ s^*_{k-1} & s^*_k & \ldots & s^*_{2k-1} \\ 1 & S & \ldots & S^k \end{vmatrix}, \quad \text{Equation 1}$$

$$k = 0, 1, 2, \ldots$$

where the determinant $D_k$ is defined by $$D_k = \begin{vmatrix} s^*_0 & s^*_1 & \ldots & s^*_k \\ s^*_1 & s^*_2 & \ldots & s^*_{k+1} \\ \ldots & \ldots & \ldots & \ldots \\ s^*_k & s^*_{k+1} & \ldots & s^*_{2k} \end{vmatrix} \quad k=0, 1, 2, \ldots \quad \text{Equation 2}$$

and, by convention, $D_{-1}=1$.

In particular embodiments, $m+1$ strategies $\{R^*_k\}_0^m$ are calculated, including the zeroth order $R^*_0(S) \equiv 1$, utilizing all but one of the calculated moments. It would be possible to calculate the strategies directly from the preceding formulae, taking care to neutralize the accumulation of rounding errors in large determinants. In one particularly desirable implementation, however, the strategies are calculated recursively. For example, and as shown at 242, the strategies are calculated recursively by means of the procedure of Schmidt orthogonalization of the sequence of polynomials $\{S^k\}$, $k=0, 1, 2, \ldots$, (i.e. $1, S, S^2, \ldots$) with respect to the inner (scalar) product, denoted $(,)$, defined by the moments:

$$(S^i, S^k) = s^*_{i+k} \quad \text{Equation 3}$$

and extended to be bilinear for any functions of S (e.g. $(aS^i + bS^j, S^k) = as^*_{i+k} + bs^*_{j+k}$). Additionally, the norm $\|f(S)\|$ of any function f of S is defined by the equation $$\|f(S)\| = \sqrt{(f(S), f(S))}, \text{ e.g. } \|S\| = \sqrt{s^*_2}.$$

The Schmidt orthogonalization starts by setting $R^*_0(S) = S^0 = 1$. $R^*_1(S)$ is constructed from S by subtracting from it a component proportional to 1, such that the result is orthogonal to $R^*_0(S)$, and is normalized (i.e. normalized to unity). Hence, it is defined by $$R^*_1(S) = \frac{S - (S, 1)1}{\|S - (S, 1)1\|}$$

In similar fashion, $R^*_2(S)$ is constructed from $S^2$ by subtracting from it components proportional to 1 and S, such that the result is orthogonal to $R^*_0(S)$ and $R^*_1(S)$, and is normalized. Hence, it is defined by $$R^*_2(S) = \frac{S^2 - (S^2, 1)1 - (S^2, R^*_1(S))R^*_1(S)}{\|S^2 - (S^2, 1)1 - (S^2, R^*_1(S))R^*_1(S)\|}$$

Subsequent $R^*_k(S)$ are constructed in the same way (to be orthogonal to all $R^*_i(S)$ of lower order, $i<k$, and to be normalized), as shown at 244. Hence, they are defined by $$R^*_k(S) = \frac{S^k - \sum_{i=0}^{k-1}(S^k, R^*_i(S))R^*_i(S)}{\left\|S^k - \sum_{i=0}^{k-1}(S^k, R^*_i(S))R^*_i(S)\right\|} \quad \text{Equation 4}$$

As constructed, the set $\{R^*_k\}$ is normalized to unity. For purposes of use of the $\{R^*_k(S)\}$ in trading and in graphical depiction, other normalization conventions may be adopted, e.g. the form of monic polynomials in which the coefficient of the highest power of price S (or of price scaled by a fixed constant such as $\sqrt{s^*_2}$) is set equal to unity. The monic polynomials, or otherwise normalized polynomials, represent the relative value of trading positions, according to a certain normalized scale. They constitute a set of trading strategies that can be displayed to the user through a graphical interface in the form of a graph of each polynomial plotted against market price of the underlying financial instrument.

At 246, and as needed, the procedure of orthogonalization may be supplemented by re-orthogonalization because of numerical cancellations that may occur in subtracting components. An exemplary approach to re-orthogonalization that can be used is described in Wilkinson, J. H., *The Algebraic Eigenvalue Problem*, chapter 6, sections 32-33 (1988). It can be observed that the strategies $\{R^*_k(S)\}$ are orthogonal to each other with respect to any measure (in particular, at the short-run time horizon) that possesses the given moments, $\{s^*_k\}_0^{2m+1}$.

Figure 3:
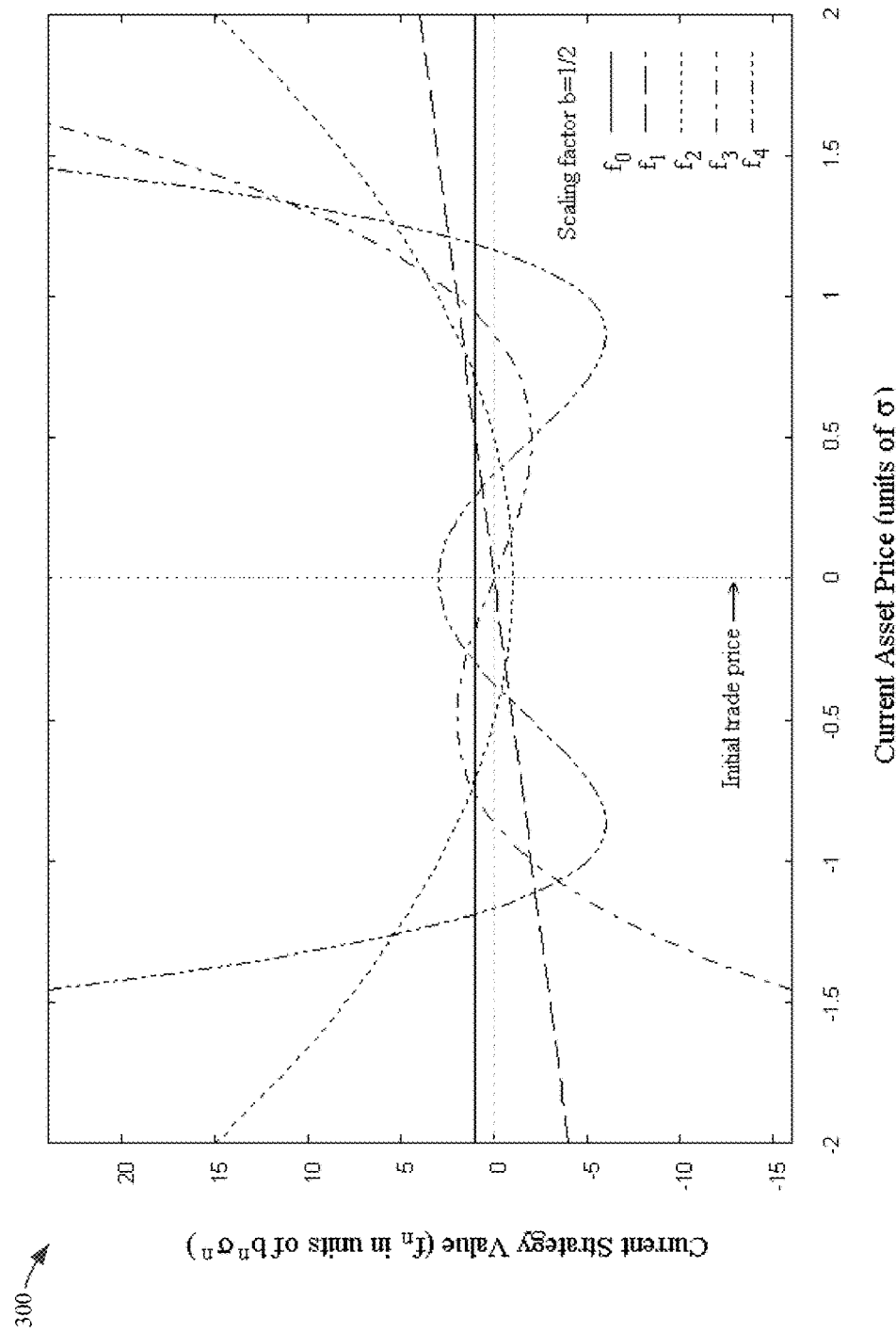
FIG. 3 shows a graph showing example trading strategies.

At 260, one or more of the strategies are graphically displayed on a display device (e.g., each strategy is graphically displayed on a display device). FIG. 3 is a representation of a graphical display 300 showing one exemplary manner in which the trading strategies can be displayed to a user. In FIG. 3, the trading strategies are depicted as polynomial functions of the price of the underlying financial instrument indicating the current strategy value. In the illustrated embodiment, each trading strategy is calculated as an explicit polynomial function of the underlying instrument market price that indicates the value of the strategy (investment position) for any given value of the instrument price. As the instrument price changes in the market, the trading strategy continually adjusts the investment position through dynamic trading so as to maintain the indicated value. The investment position (the quantity of each asset held) comprises a combination of both cash and the underlying instrument. The amounts of each are indicated by the polynomial function as follows. Negative values indicate borrowed positions (positions sold short). The constant term in the polynomial function corresponds to the amount of cash held. The remaining terms divided by the instrument price correspond to the amount of the underlying instrument held. Accordingly, the change in investment position necessitated by any given price change can be inferred from the polynomial function. The change is given in explicit terms by the hedging coefficients, as discussed below.

Hedging coefficients can also be computed and displayed. For example, at 250, the delta and gamma hedging coefficients of the trading strategy are determined as analytic functions of the underlying instrument price S. In particular implementations, the hedging coefficients delta, $\Delta_k$, and gamma, $\Gamma_k$, for the strategy $R^*_k$ are the first and second derivatives respectively, and hence are determined in explicit analytical form by the following equations:

$$\Delta_k = \frac{dR^*_k(S)}{dS} \qquad \text{Equation 5}$$

and $$\Gamma_k = \frac{d^2 R^*_k(S)}{dS^2} \qquad \text{Equation 6}$$

The delta and gamma hedging coefficients can be graphically displayed at 260 along with or separate from the graphical display of the strategies.

At 270, one or more additional hedging coefficients are optionally computed. For example, other hedging coefficients can be derived in similar fashion (e.g., the third derivative is related to skewness of the distribution).

In general, the delta hedging coefficient expresses the change in value of the trading strategy (investment position) for a small change in the price of the underlying instrument. In other words, it equals the rate of change of value with respect to price. For a small change in price, it indicates the required change in investment position in order to maintain the investment strategy as follows. Delta is expressed as a polynomial function of price. Excluding the constant term in the polynomial and dividing the remaining terms by price (of the underlying instrument) equals the rate of change (with respect to price) of the investment position in the underlying instrument. The gamma hedging coefficient, known to those skilled in the art, similarly expresses changes in the investment position additional to those indicated by the delta coefficient when prices jump in significant increments.

In an alternative embodiment, the trading strategies are calculated in the same manner as the exemplary embodiment described above, excepting that they are calculated with respect to the representative martingale distribution (described below) at a selected maturity T, not the short-run distribution. The computations of hedging coefficients and expected excess returns, described below, also proceed in the same manner, excepting that they are based on the representative martingale distribution.

At 280, the expected excess returns on the strategies $\{R^*_k(S)\}_0^m$ are computed. For example, the expectations generator $L_0$, and its eigenvalues $\{\lambda^*_k\}$, which equal the expected excess returns of the corresponding trading strategies, and the $\{a^*_k\}$ and $\{b^*_k\}$ coefficients can be derived from the strategies $\{R^*_k\}_0^m$ and the moments $\{s^*_k\}_0^{2m+1}$. The numerical calculation of the $\{R^*_k(S)\}$ by Schmidt orthogonalization (described above) gives rise to a second order finite difference equation $$b^*_{k-1}R^*_{k-1}+a^*_k R^*_k+b^*_k R^*_{k+1}=SR^*_k, \; k=1, 2, 3 \ldots \qquad \text{Equation 7}$$

with the initial condition $$(a^*_0-S)1+b^*_0 R^*_1=0,$$

in other words, the condition $R^*_0=1$ (and implicitly $b^*_{-1}=0$). Each pair of coefficients $a^*_k$ and $b^*_{k-1}$ can be determined by the preceding equation (1), which generates $R^*_{k+1}$. Alternatively, the coefficients can be computed from the explicit expressions $$a^*_k = G\{SR^*_k(S)R^*_k(S)\} \qquad \text{Equation 8}$$

$$b^*_k = \frac{\sqrt{D_{k-1} D_{k+1}}}{D_k}, k = 0, 1, 2, \ldots$$

taking care to neutralize the accumulation of rounding errors in large determinants, where the functional $G\{R(S)\}$ is defined by $$G\{R(S)\}=p_0 s^*_0+p_1 s^*_1+ \ldots +p_n s^*_n$$

for $R(S)=p_0+p_1 S+ \ldots +p_n S^n$. From these expressions, it can be seen that the computation of the coefficient $a^*_m$ requires knowledge of the moments $\{s^*_k\}_0^{2m+1}$. Accordingly, from the set of moments $\{s^*_k\}_0^{2m+1}$ the set of coefficients $\{a^*_k\}_0^m$ and $\{b^*_k\}_0^{2m-1}$ can be determined, and this is the set of coefficients that is computed in certain embodiments of the disclosed technology. The coefficients $\{b^*_k\}$ can be checked to ensure that none of them is equal or very nearly equal to zero, and they can be adjusted if necessary to be strictly positive in accordance with a predetermined or user-selected parameter (a small number) ε. An exemplary method of adjustment that can be used in embodiments of the disclosed technology is described by J. H. Wilkinson, *The Algebraic Eigenvalue Problem,* Chapter 5, sections 45-46 (1988). The two sets of coefficients (adjusted if necessary) determine a symmetric tridiagonal matrix $L_0$, the generator of the conditional distribution $P_{\Delta t}^{S_0}(S)$, identified by the equation $$L_0 = \begin{pmatrix} a_0^* & b_0^* & 0 & 0 & 0 & \ldots & \ldots \\ b_0^* & a_1^* & b_1^* & 0 & 0 & \ldots & \ldots \\ 0 & b_1^* & a_2^* & b_2^* & 0 & \ldots & \ldots \\ \ldots & \ldots & \ldots & \ldots & \ddots & \ldots & \ldots \\ \ldots & \ldots & \ldots & \ldots & \ldots & a_{m-1}^* & b_{m-1}^* \\ \ldots & \ldots & \ldots & \ldots & \ldots & b_{m-1}^* & a_m^* \end{pmatrix}$$

Equation 9 where the $\{a^*_k\}$ are real numbers, and the $\{b^*_k\}$ are strictly positive. (In analytical terms, with an infinite set of moments and corresponding infinite set of coefficients, the expectations generator $L_0$ is an infinite matrix. $L_0$, which encapsulates the empirical moments, represents the empirical approximation to its self-adjoint extensions, which act on differing densely-defined domains.)

The eigenvalues $\{\lambda^*_k\}_0^m$ of the matrix $L_0$ can be computed, for example by the bisection method. See, e.g., J. H. Wilkinson, *The Algebraic Eigenvalue Problem,* Chapter 5, sections 36-43 (1988). The eigenvalues can be checked to ensure that no two of them are equal or very nearly equal, and they can be adjusted if necessary in accordance with a predetermined or user-selected parameter (a small number) η.

An exemplary method of adjustment that can be used in embodiments of the disclosed technology is described in J. H. Wilkinson, *The Algebraic Eigenvalue Problem,* Chapter 5, section 59 (1988)). In an alternative embodiment, one could work with sub-matrices and calculate corresponding eigenvalues and eigenvectors. One could also work with a generator that is a function of the underlying instrument price, where $L_0 = L_0(S)$.

The matrix $L_0$ can be adjusted so as to help ensure that the lowest eigenvalue, $\lambda^*_0$, is zero. If the unadjusted $\lambda^*_0$ equals α, for example, then the adjustment can be to subtract the constant α (α times the unit matrix) from $L_0$, which shifts all eigenvalues equally. This exemplary adjustment corresponds to taking zero as the baseline for excess returns over the risk-free interest rate.

By way of explanation, the theoretical reason for adjusting the $\{b^*_0\}$ coefficients to be strictly positive and the separation of the eigenvalues $\{\lambda^*_k\}$ (the latter implies the former, but not conversely) is as follows. Under the assumption of no arbitrage, the expectations generator matrix $L_0$ is of finite multiplicity for financial instrument price processes that are, for example, time-homogeneous Markov processes, though not necessarily continuous (prices may jump). That means that each eigenvalue $\lambda^*_k$ is associated with a finite number of eigenvectors. For a single asset, single asset class, or fixed weight portfolio or basket, representing a single risk factor (possibly, a fixed weight combination of multiple factors), the expectations generator is of single multiplicity (on an appropriately reduced state space defined by a cyclic vector). That is, if the state is defined by the configuration of asset prices (as distinct from Arrow-Debreu states), then the multiplicity is single. Then each eigenvalue $\lambda^*_k$ is associated to a single eigenvector (no eigenvalues coincide). The methods of classical moment theory proceed from the basis that the generator matrix $L_0$ is of single multiplicity. In practice, expectations generators of higher than single multiplicity may behave empirically like the single multiplicity case for aggregate portfolio values: the empirical data can be adjusted by empirically insignificant amounts to arrive at a generator matrix $L_0$ of single multiplicity. This possibility is another justification for treating $L_0$ as a matrix of single multiplicity.

2. Generating Conditional Probability Distributions Using the Whittle Estimator

FIGS. 1A-1B show a flowchart 100 of an exemplary technique for determining a conditional returns distribution by an orthogonal series as may be used at method act 220 of FIGS. 2A-2B. The exemplary method illustrated in FIGS. 2A-2B should not be construed as limiting, however, as any one or more of the illustrated acts can be performed alone or in various combinations and subcombinations with other method acts.

At 110, a returns frequency 1/Δt is received (e.g., daily frequency), or equivalently a time interval Δt is received, where Δt defines the time interval that will be used to generate pairs of time series data points separated by the interval, so as to calculate returns. The returns frequency can be predetermined or can be received (e.g., buffered or otherwise input and prepared for use) as part of user data generated through a graphic user interface or other interface with a user. In one particular implementation, the minimum possible value of the time interval (corresponding to the maximum frequency) is the minimum interval in the time series; other intervals are integral multiples of the minimum.

Then, in one particular embodiment of the disclosed technology, the returns $\{r_j\}$ over the intervals Δt are computed to be equal to the percentage change, expressed in percent per unit time, in successive pairs of prices that are separated by time interval Δt; and all possible pairs can be taken. In this embodiment, each return $r_j$ is associated to the initial price $S_j$ (the price at the start of the interval Δt) from which it was derived. The set of returns $\{r_j\}$ constitutes a returns density, which can be normalized to have a weight of unity (normalized to be a probability density). The returns density can determine a conditional price distribution, conditional on the current price $S_0$, namely the probability distribution of all prices generated by the returns density acting over the time interval Δt starting from fixed initial price $S_0$. This distribution can be denoted by $P'^{S_0}_{\Delta t}(S)$ (to be distinguished from $P^{S_0}_{\Delta t}(S)$), and called the unconstrained conditional price distribution (or just unconstrained distribution) at time horizon Δt, where "unconstrained" indicates that the entire set of returns $\{r_j\}$ has been used in the computation.

At 120, the unconstrained conditional price distribution $P'^{S_0}_{\Delta t}(S)$ is computed. In the illustrated embodiment, the conditional distribution $P^{S_0}_{\Delta t}(S)$ is estimated by an orthogonal series, namely the orthogonal polynomials $\{R'_k(S)\}$, described below, as derived from the unconstrained distribution $P'^{S_0}_{\Delta t}(S)$. In this embodiment, the distribution $P^{S_0}_{\Delta t}(S)$ is set equal to the Whittle estimator as follows.

The Whittle estimator, denoted by $\hat{P}^{S_0}_{\Delta t}(S)$, is given by the following expression:

$$\hat{P}^{S_0}_{\Delta t}(S) = \hat{P}'^{S_0}_{\Delta t}(S)\left\{1 + \sum_{k=1}^{\infty} \hat{\beta}_k R'_k(S)\right\} \quad \text{Equation 10}$$

-continued truncated at $k = m$, $$\hat{\beta}_k = \left(\frac{L}{L-1+\pi_k}\right)\overline{R}'_k,$$

$$\overline{R}'_k = L^{-1}\sum_{j=1}^{L} R'_k(\tilde{S}_j) \quad k = 1, 2, \ldots,$$

where $\hat{P}'^{S_0}_{\Delta t}(S)$ denotes the prior distribution, and implicitly the zeroth-order polynomial is the function equal to 1 ($R'_0(S)=1$), representing the cash asset of constant price 1. The notation, $\hat{}$, denotes a statistical estimator, the dashed notation, ', simply denotes an alternative version and should not be mistaken for differentiation, and the tilde notation, , denotes a random variable. $\Delta t$ denotes the selected time interval as described above, and the $\{\hat{\beta}_k\}$ are the Whittle coefficients in the orthogonal series expansion (with implicitly $\hat{\beta}_0=1$ for a normalized distribution). In one particular embodiment, the elements of the Whittle estimator are computed as follows.

At 130, the prior distribution (more precisely, its estimator) is set equal to the unconstrained conditional price distribution $P'^{S_0}_{\Delta t}(S)$. Furthermore, the moments $\{s'_k\}$ are computed for the distribution. In particular implementations, the first 2m+1 moments of the prior distribution (including the zeroth order (normalizing) moment) are computed. The integer m can be selected as described below.

At 132, the polynomials $\{R'_k\}$ are calculated in the same manner as are the trading strategies described below, excepting that they are based on the prior distribution $P'^{S_0}_{\Delta t}(S)$, and for that reason the calculations are not described here. In a particular implementation, the integer m is selected to be the desired order of the highest order polynomial to be calculated ($R'_m$), meaning that, in the illustrated embodiment, m+1 polynomials $\{R'_k\}_0^m$ are calculated, including the zeroth order polynomial $R'_0(S)\equiv 1$, so as to approximate the distribution. (The notation $\{\ \}_0^m$ denotes the range of values of the variable index.) The resulting orthogonal polynomials $\{R'_k(S)\}$ satisfy the conditions that $R'_0(S)$ represent the cash asset and the orthogonal polynomials $\{R'_k(S)\}$, k=0, 1, 2, ..., m, are ordered by decreasing smoothness.

At 140, the bandwidth control parameter L is set. In the illustrated embodiment, the bandwidth control parameter L is set (e.g., via a predetermined selection or via user-selection through a graphical user interface or other interface with the user) to the desired number of time series observations at or close to the current price $S_0$.

At 142, the L observations closest to $S_0$, whether higher or lower, are taken. In particular, the subset of n returns that are determined by the selected bandwidth control parameter L are identified from the set of returns $\{r_j\}$, and the bandwidth-constrained conditional price distribution $P''^{S_0}_{\Delta t}(S)$ is constructed in non-parametric form.

At 150, the prior precision parameters are set to be exponentially increasing. The values $\{\pi_k\}$ are the prior precision parameters, and $\pi_k \geq 1$. The $\{\pi_k\}$ can be set to be exponentially increasing by, for example, the following formula: $\pi_k = c^k$ where c is a single digit integer.

At 160, one or more Whittle coefficients $\hat{\beta}_k$ are calculated (e.g., each Whittle coefficient) from the averaged polynomial $\overline{R}'_k$, where the averaged polynomial is averaged over the bandwidth-constrained values of price (the L observations closest to $S_0$). The computation of the Whittle coefficient can be performed in accordance with the formula given above. In the illustrated embodiment, this computation comprises the following. At 162, the values of each $R'_k$, averaged over the bandwidth-constrained conditional price distribution $P''^{S_0}_{\Delta t}(S)$, are computed. At 164, the corresponding Whittle coefficient $\hat{\beta}_k$ is computed from the average value of $R'_k$, the prior precision parameter $\pi_k$, and the bandwidth control parameter. At 166, the Whittle estimator is computed as an orthogonal series modification of the prior distribution $P'^{S_0}_{\Delta t}(S)$.

At 170, the Whittle estimator is evaluated to determine if it gives a non-negative density. If the eventually calculated probability density is negative, the prior precision parameters can be increased so as to ensure that the density is positive.

At 180, the conditional distribution can be set equal to the Whittle estimator:

$$P^{S_0}_{\Delta t}(S) = \hat{P}^{S_0}_{\Delta t}(S)$$

One advantage of the Whittle estimator is that it is directly applicable to data samples (sets of L bandwidth-constrained prices) of arbitrary size. Consequently, the Whittle estimator does not rely upon asymptotic properties. The distinction is meaningful because approaches that rely upon asymptotic optimality of sequences of estimators often invoke an assumption of ergodicity. Ergodicity implies that there is some possibility that any state of the market (defined by asset prices) could evolve into any other state, given a long enough time period. In these circumstances, the matrix representing the expectations operator is irreducible, which implies that the market is complete. But that is just the assumption that one wishes to avoid, in order to attain greater realism.

Figure 4:
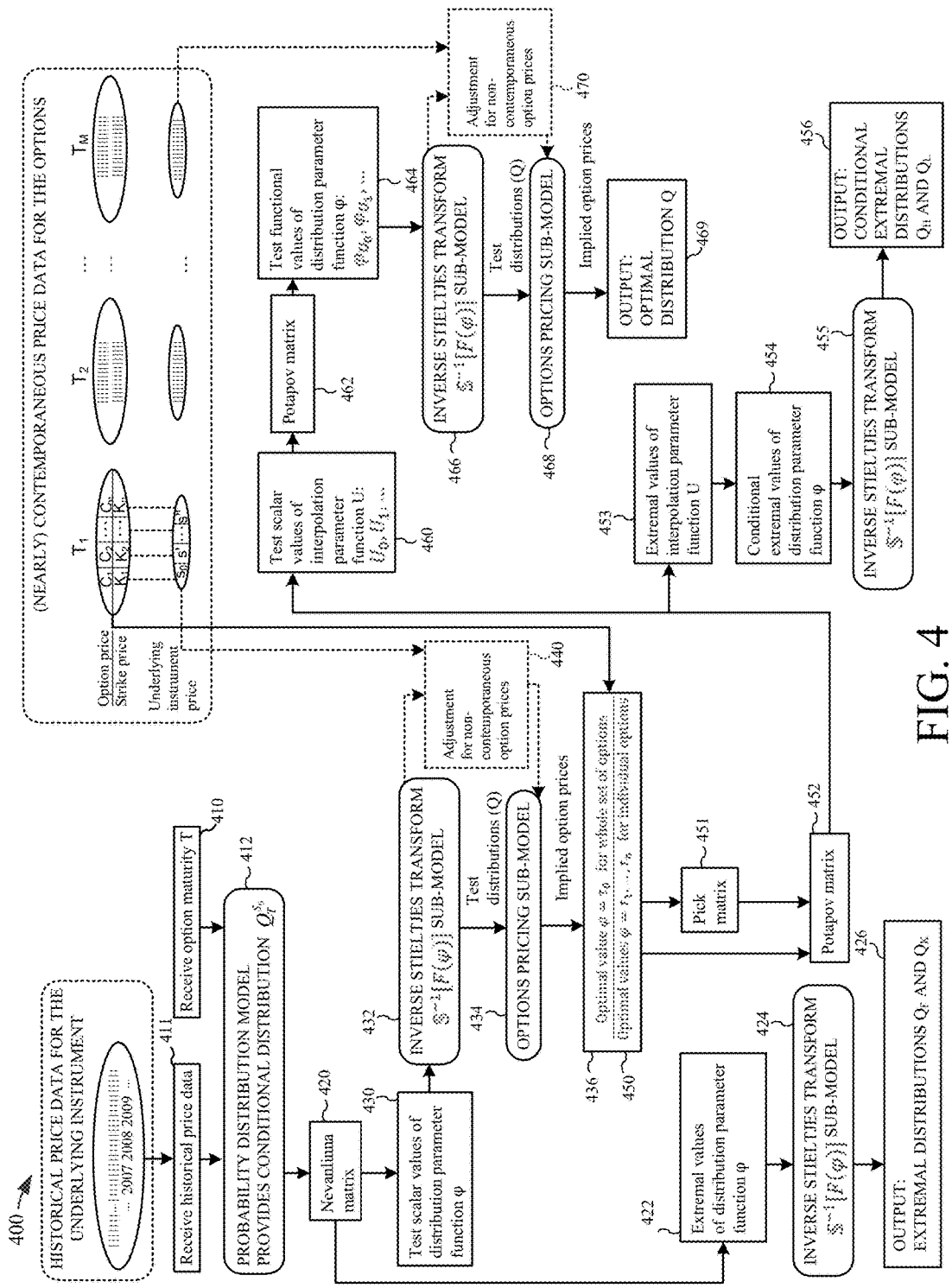
FIG. 4 shows a flowchart of an exemplary method for computing a martingale probability distribution and its optimal and conditional optimal upper and lower bounds in accordance with an embodiment of the disclosed technology.

3. Generating Martingale Distributions of Future Prices from Underlying Instrument Prices FIG. 4 is a schematic block diagram showing components of and the overall flow for an exemplary method of generating a set of two or more martingale probability distributions from price data of an underlying financial instrument. The particular components shown in FIG. 4 should not be construed as limiting, however, as the illustrated components can be used alone or in various combinations and subcombinations with one another. Similarly, the illustrated actions shown in FIG. 4 can be performed alone or in various combinations and subcombinations with one another.

In the illustrated embodiment, a conditional martingale distribution of future prices at time T (implied solely by underlying instrument prices), denoted $Q_T^{S_0}(S)$, is determined by the short-run conditional empirical distribution $P^{S_0}_{\Delta t}(S)$. Probability distributions and densities can be defined in current value terms (they describe prices prevailing at the time to which the distribution or density pertains, as opposed to discounted present value prices).

a. Computing the Representative Distribution $Q_T^{S_0}(s)$

At 410, an option maturity T is received (e.g., buffered into memory or otherwise input and prepared for further use). The option maturity T corresponds to the expiration date for a group of one or more options. The option maturity T can be received, for example, from user data generated by a user selecting the maturity T via a graphical user interface or other interface with the user. In particular implementations, multiple maturities are received and each maturity is taken in turn, though other orders are also possible.

At 411, historical price data for the underlying instrument is also received. For example, the historical price data can be accessed and input using any of the methods or formats described above with respect to method act 210.

At 412, the conditional martingale probability distribution $Q_T^{S_0}$ is computed using a probability distribution model. For example, the conditional martingale probability distribution $Q_T^{S_0}$ can be computed by means of a time evolution of the Fourier-type components of the initial distribution $P_0(S)$, in accordance with the expectations generator $L_0$ and its eigenvalues $\{\lambda^*_k\}_0^m$, as follows. The Fourier-type components are taken to be the orthogonal functions $\{R^*_k(S)\}_0^m$. Further, the components $\{R^*_k(S)\}_0^m$ can be identified with the eigenvectors of the expectations generator (in a suitably chosen coordinate basis for the state space). The coefficients $\{c_k\}_0^m$ of the components can be determined in the usual way by Fourier analysis, namely the integral of the product of the distribution $P_0(S)$ and the component concerned with respect to a distribution with moments $\{s^*_k\}_0^{1m+1}$:

$$c_k = (R^*_k(S), P_0(S)), k=0, 1, 2, \ldots, m,$$

where the integral is written as the scalar product defined earlier in equation (3). If, for example, the initial distribution is a fixed value of price $S_0$, then the distribution $P_0(S)$ has a Dirac delta density $\delta(S_0)$. Whatever the distribution, each coefficient can be regarded as time varying and is evolved through time depending upon the corresponding eigenvalue in accordance with the equation $$c_k(T) = \exp(-\lambda^*_k T) c_k \qquad \text{Equation 11}$$

where $c_k$ is equivalent to time zero $c_k(0)$. The distribution $Q_T^{S_0}$ is then equal to the sum of each function $R^*_k(S)$ multiplied by its corresponding time-evolved coefficient $(\Sigma_0^m c_k(T) R^*_k(S))$, re-normalized to unity by a suitable constant:

$$Q_T^{S_0}(S) = \frac{1}{\int_0^\infty dS \sum_0^m c_k(T) R^*_k(S)} \sum_0^m c_k(T) R^*_k(S).$$

In the foregoing formulae, particular numerical techniques can be used to approximate the integrals (e.g. truncation at an upper bound to price).

The distribution $Q_T^{S_0}$ can be adjusted, as needed, so that the first moment is equal to the forward price $S_T^{forward}$ (equal to $S_0$ in discounted present value terms), by scaling by a constant factor prices over which $Q_T^{S_0}$ is defined. A forward price $S_t^{forward}$ contemporaneous with the current price $S_0$ can be available for input directly as an empirical datum, or indirectly through a discount factor. In the latter case, $S_T^{forward}$ is set equal to the ratio $S_0/DF_T$. Here, $DF_T$ refers to the discount factor, or "deflator", pertaining to maturity T. If a forward price of the underlying financial instrument at date T, denoted $S_T^{forward}$ and contemporaneous with the current price $S_0$, is available from observed market transactions or quotes, then the discount factor is set equal to the ratio $$DF_T = \frac{S_0}{S_T^{forward}}.$$

Otherwise, the discount factor is set equal to the exponential $$DF_T = \exp(-r_T T),$$

where $r_T$ is a risk-free interest rate (e.g. a Treasury yield curve zero coupon rate) pertaining to maturity T, and derived from observed market rates contemporaneous with the current price $S_0$ of the underlying financial instrument. The formula is adapted in the case that the underlying instrument pays dividends or interest rate coupons.

In some embodiments, additional information can be supplied to users of the disclosed technology. For example, an estimate of the empirical probability distribution pertaining to time T, conditional on the current price $S_0$ of the underlying instrument, denoted by $P_T^{S_0}$, can be provided.

Conversely, if $P_T^{S_0}(S)$ is computed by another means, which can comprise computing $P_T^{S_0}(S)$ from the set of historical prices for the underlying instrument, then $Q_T^{S_0}(S)$ can be alternatively calculated from $P_T^{S_0}(S)$ by the method of the Esscher transform. The "exponentially tilted" distribution $e^{-\alpha S} P_T^{S_0}(S)$ is fitted to the forward price $S_T^{forward}$ that is described above by fitting a (the first moment of the distribution is set equal to $S_T^{forward}$). (It is assumed that $S_T^{forward}$ is either an empirical datum, or derived from an empirically given $S_0$ through a given discount factor.) Denoting the unique fitted value of $\alpha$ by $\theta$, $Q_T^{S_0}(S)$ is determined by setting $Q_T^{S_0}(S) = e^{-\theta S} P_T^{S_0}(S)$. The distribution $Q_T^{S_0}(S)$ can be regarded as a representative distribution in that any distribution with the same set of moments can serve the purposes that it serves.

The values of the determinants $\{D_k\}_0^m$, from equation (2), can be checked for the presence of any determinant that is zero or nearly zero. Likewise, the values of the determinants $\{D_k^+\}_0^m$ defined by the equations $$D_k^+ = \begin{vmatrix} s_1^* & s_2^* & \ldots & s_{k+1}^* \\ s_2^* & s_3^* & \ldots & s_{k+2}^* \\ \ldots & \ldots & \ldots & \ldots \\ s_{k+1}^* & s_{k+2}^* & \ldots & s_{2k+1}^* \end{vmatrix} \quad k = 0, 1, 2, \ldots \qquad \text{Equation 12}$$

can be checked for the presence of any determinant that is zero or nearly zero. If there is any such determinant among either the $\{D_k\}_0^m$ or the $\{D_k^+\}_0^m$, it can be concluded that there is only one martingale measure $Q_T$ corresponding to a particular time horizon T (the measure $Q_T$ is unique). Such an occurrence is typically exceptional. Then $Q_T$ can be set equal to the conditional martingale distribution $Q_T^{S_0}$ and constitutes the upper and lower bound, the conditional upper and lower bound, and the optimal martingale distributions at maturity T. Another option maturity can then be selected in an iterative process. For each maturity, and in one particular embodiment, the same conclusion is applied that there is only one martingale measure, and the unique measure is set equal to the conditional martingale distribution. Otherwise, and in some embodiments of the disclosed technology, the method proceeds as follows.

b. Computing Extremal Distributions $Q_F$ and $Q_K$

A probability distribution model that generates an optimal ("best fit") martingale probability distribution $Q_T$ is determined as to functional form by the Nevanlinna parametrization, wherein the Nevanlinna matrix is determined by the distribution $Q_T^{S_0}$ through the moments of the distribution, the extremal values of the distribution parameter function $\phi$ determine extremal measures $Q_F$ and $Q_K$, and $\phi$ itself is parametrized by the Potapov matrix, which is determined by options price data.

The embodiment illustrated in FIG. 4 proceeds as follows. At 420, the historical price data is encapsulated in the Nevanlinna matrix. In particular implementations, the Nevanlinna matrix is defined by:

$$\begin{pmatrix} A(z) & C(z) \\ B(z) & D(z) \end{pmatrix},$$

where A(z), B(z), C(z), and D(z) are four real polynomials in the variable z, which is a complex number, and by "real" is meant that each polynomial has real coefficients. (The polynomial D(z) should not be confused with the determinants $\{D_k\}$.) In certain embodiments, approximations to the four polynomials are constructed in the following way. Orthogonal polynomials $\{R_k(S)\}_0^m$ are calculated in the same manner as are the trading strategies described above, excepting that they are based on the distribution $Q_T^{S_0}(S)$. Additionally, the $\{b_k\}$ coefficients associated to the $\{R_k\}$ are computed in the same manner as described above (e.g. through Schmidt orthogonalization and re-orthogonalization), including adjustment if needed to make the $\{b_k\}$ strictly positive (and the $\{a_k\}$ coefficients are computed at the same time). Another set of orthogonal polynomials, auxiliary to the $\{R_k\}$, is defined by $$W_k(S) = G_{S^*}\left\{\frac{R_k(S) - R_k(S^*)}{S - S^*}\right\} \quad k = 0, 1, 2, \ldots m,$$

where $G_{S^*}$ denotes the functional G as defined earlier excepting with respect to the independent variable $S^*$. $W_k$ is a polynomial of degree k−1. The polynomials $\{W_k(S)\}_0^m$ are computed from the $\{R_k(S)\}_0^m$. Then the polynomials $A_n(z)$, $B_n(z)$, $C_n(z)$, $D_n(z)$, n=1, 2, . . . are defined as below:

$$A_n(z) = b_{n-1}\{W_{n-1}(0)W_n(z) - W_n(0)W_{n-1}(z)\},$$

$$B_n(z) = b_{n-1}\{W_{n-1}(0)R_n(z) - W_n(0)R_{n-1}(z)\},$$

$$C_n(z) = b_{n-1}\{R_{n-1}(0)W_n(z) - R_n(0)W_{n-1}(z)\},$$

$$D_n(z) = b_{n-1}\{R_{n-1}(0)R_n(z) - R_n(0)R_{n-1}(z)\}.$$

Here, the variable z is substituted for the real variable S in the polynomials $\{R_k\}$ and $\{W_k\}$. $B_n(z)$ and $D_n(z)$ are quasiorthogonal polynomials of degree n, and $A_n(z)$ and $C_n(z)$ are the corresponding numerators. By "quasiorthogonal polynomial of degree n" is meant a sum of $R_n$ and $R_{n-1}$ with fixed coefficients. By "the corresponding numerator" is meant the corresponding sum of $W_n$ and $W_{n-1}$ with the same fixed coefficients (respectively). For n tending to infinity (n→∞), $A_n(z)$, $B_n(z)$, $C_n(z)$, and $D_n(z)$ tend uniformly to their limits for all finite values of z, denoted respectively by A(z), B(z), C(z), and D(z). It is the latter polynomials that constitute the Nevanlinna matrix as defined above. In certain embodiments, for the purposes of calculation, the limits A(z), B(z), C(z), and D(z) are approximated by the m-th order approximants, respectively, $A_m(z)$, $B_m(z)$, $C_m(z)$, and $D_m(z)$ (where moments $\{s_k\}_0^{2m+1}$ have been computed), and similarly the Nevanlinna matrix is approximated by the m-th order approximant, defined $$\begin{pmatrix} A_m(z) & C_m(z) \\ B_m(z) & D_m(z) \end{pmatrix}.$$

Accordingly, the polynomials $A_m(z)$, $B_m(z)$, $C_m(z)$, and $D_m(z)$ are calculated as explicit analytical functions, and the Nevanlinna matrix (in approximation) is thereby determined.

The Stieltjes transform of the probability distribution Q(S) is defined by $$\mathbb{S}[Q] \equiv \int_0^\infty \frac{Q(dS)}{S - z}. \quad \text{Equation 13}$$

The lower limit to the integral is zero, because the underlying financial instrument (as illustrated, a stock) is of limited liability and, therefore, cannot take a negative value. $\mathbb{S}$ can be written as $\mathbb{S}_z$ to emphasize its dependence on the complex number z, and further as $\mathbb{S}_{\xi+i\eta}$ where $z=\xi+i\eta$, i denoting $\sqrt{-1}$ and $\xi$ and $\eta$ respectively denoting the real and imaginary components of z. All solutions $\{Q\}$ to the moment problem (distributions Q that possess the prescribed moments $\{S_k\}$) and assuming that there is more than one solution, satisfy the parametric formula (the "Nevanlinna parametrization"):

$$\mathbb{S}[Q] \equiv \int_0^\infty \frac{Q(dS)}{S - z} = -\frac{A(z)\phi(z) - C(z)}{B(z)\phi(z) - D(z)} \quad \text{Equation 14}$$

Incomplete Markets Formula where the distribution parameter function $\phi$ belongs to the "compactified Nevanlinna class" of functions, $\phi \in \overline{N}$ (the Nevanlinna class N augmented by the constant ∞ (which constitutes a compact set)). In this way, the parametric formula determines the Stieltjes transform as a fractional linear transformation of the distribution parameter function. The Nevanlinna class of functions N (sometimes referred to as Herglotz functions) consists of all analytic functions w=f(z) that map the half-plane Im z>0 to the half-plane Im w≥0, where Im denotes the imaginary part of a complex number value. (Nevanlinna functions can be considered to be extended to the lower half-plane by symmetry.) The immediately preceding formula will hereinafter be referred to as the "incomplete markets formula".

When markets are incomplete, knowledge of even all the moments (an infinite set) of a martingale probability distribution is insufficient to determine the distribution. As discussed below, a fixed infinite set of moments is consistent with an infinite set of distributions.

The inverse Stieltjes transform is given by the Stieltjes-Perron inversion formula:

$$\frac{Q(S+0) + Q(S-0)}{2} - \frac{Q(0+) + Q(0)}{2} = \lim_{\eta \to 0} \frac{1}{\pi} \int_0^S \text{Im}\mathbb{S}_{\xi+i\eta} d\xi \quad \text{Equation 15}$$

Here, "lim" denotes mathematical limit and +0, −0, and 0+ denote the limits approached from above, below and above respectively. An n-canonical solution to the incomplete markets formula is defined to be a distribution Q corresponding to a distribution parameter function $\phi$ that is a rational function of n-th degree and is real on the real axis. Because certain embodiments of the disclosed technology require the solution Q(S) to be an n-canonical solution, where n denotes the number of options of maturity T, Q(S) is a pure point measure and the weight at price zero (Q(0+)−Q(0)), if any, can be calculated explicitly as the residue at the pole (the singularity) at S=0. For the same reason, the points of increase of Q(S) can be located explicitly and hence the points where there is no increase in Q(S) are known and the values of Q at such points are determined by the Stieltjes-Perron inversion formula. (The number of points of increase are infinite for the exact analytical solution, but finite when using the m-th order approximants.) Computations performed in accordance with the preceding formula are referred to hereinafter as the inverse Stieltjes transform sub-model.

Consequently, the probability distribution model, which is based on the incomplete markets formula, can be used to compute any solution Q(S) that is an n-canonical solution, through appropriate selection of the distribution parameter function ϕ. Furthermore, every solution Q of the moment problem can be approximated arbitrarily closely by an n-canonical solution, for some value of n (in mathematical terms, the set of canonical solutions is dense in the set of all solutions).

In the case that the conjectured Q is determined by $\phi = \tau$, a scalar quantity, which in fact corresponds to zeroth-order canonical solutions, the results of Stieltjes-Perron inversion can be determined explicitly as follows. The location of the poles (the points of positive probability weight) are the solutions to the equation:

$$B(S)\tau - D(S) = 0;$$

and the size of the probability weight at such points equals ρ(S) given by $$\rho(S) = \frac{1}{D(S)\frac{dB(S)}{dS} - B(S)\frac{dD(S)}{dS}} \qquad \text{Equation 16}$$

In some embodiments of the disclosed technology, once a martingale probability distribution $Q_T$ is determined, the price of an option or other derivative is determined in the following manner. For an option with payoff $f(S_T)$ at time T, where $S_T$ denotes the prevailing price of the underlying financial instrument at time T, the price C of the option is given by the formula:

$$C = DF_T \int_0^\infty f(S_T) Q_T(dS_T) \qquad \text{Equation 17}$$

Here, $DF_T$ refers to the discount factor, defined above, pertaining to maturity T. Computations in accordance with the above formula for price C are hereinafter referred to as the options pricing sub-model.

At 422, the extremal measures $Q_F$ and $Q_K$ (respectively, the Friedrichs and Krein measures) are determined by the extremal scalar values of the distribution parameter function ϕ in the incomplete markets formula. For the case of a measure over positive values [0, ∞), corresponding to a limited liability financial instrument that does not take negative prices, preferably these values are taken to be $\phi = -\infty$ and $\phi = 0$ respectively for $Q_F$ and $Q_K$, $$\mathbb{S}_{[Q_F]} = -A(z)/B(z) \quad \mathbb{S}_{[Q_K]} = -C(z)/D(z) \qquad \text{Equation 18}$$

From these equations, the measures $Q_F$ and $Q_K$ are calculated by the inverse Stieltjes transform sub-model at 424. The measure $Q_F$ generates the upper bound to an option price and $Q_K$ the lower bound, through the options pricing sub-model. In an alternative embodiment, the absolute value of ϕ corresponding to $Q_F$ is taken to be large but finite, and may depend on the margin by which the lowest eigenvalue (before adjustment) of the empirical generator $L_0$ exceeds zero in a statistically significant way. The upper and lower bounds to an option price can be determined regardless of whether or not options are traded on the underlying financial instrument (as noted earlier, provided that the financial instrument is of limited (or approximately limited) liability).

c. Computing a Best Fit of Distribution Parameter Function ϕ

As described above, and in one embodiment of the disclosed technology, an initial optimal value $\tau_0$ of the distribution parameter function ϕ is determined by setting ϕ to be a scalar (a function equal to a fixed real number) and, from a set of scalar test values, choosing that value that gives a best fit to the selected group of option prices. At 430, one or more test values are generated. The one or more test values can initially be randomly generated, or can be user input, or based on some other criteria (e.g., a heuristic or from past sub-model runs). Given a test value, the implied price for each option in the group is computed by means of the inverse Stieltjes transform sub-model (applied at 432) and the options pricing sub-model (applied at 434).

At 436, the best fit set for the whole set of one or more options can be determined by comparing the results to contemporaneous (or nearly contemporaneous) price data for options. The best fit can be determined according to a predetermined or user-selected criterion (e.g., least squares, the fit that minimizes the sum of the squares of the deviations between each computed price and its empirical data counterpart, or other such criteria). The best fit determines the value $\tau_0$. At this point, the number of options in the selected group at maturity T can again be denoted by n.

At 450, additional to the value $\tau_0$, a set of n initial single-option values $\{\tau_i\}_i^n$ of ϕ can be computed by the same procedure, excepting that the optimization is in accordance with a single option price in the group, and $\tau_i$ corresponds to the i-th option, ordered, for example, by ascending value of strike price.

As illustrated at 440, in the above-described procedure and subsequently, if the set of option prices of selected maturity T is not contemporaneous (within the set), one of the prices can be selected out of the corresponding paired set of contemporaneous underlying instrument prices to be the current price $S_0$ for the purpose of further calculations. When implied option prices are calculated, the model can be calibrated to determine an adjustment to the martingale distribution $Q_T$ for each option for which the corresponding contemporaneous underlying instrument price differs from $S_0$. Denoting the differing price by S', a counterpart adjustment can be made to $Q_T$ for the purpose of pricing the corresponding option. In one embodiment, for example, the first moment of the distribution $Q_T$ is set equal to the forward price corresponding to price S' by shifting (e.g., adding to or subtracting from) all prices over which the distribution is defined by an equal constant amount. The corresponding forward price can be computed to be equal to the ratio of price S' to the time T discount factor ($S'/DF_T$), where the discount factor $DF_T$ is as defined earlier.

d. Computing the Optimal Martingale Distribution $Q_T$

In application to basket options (options written on a fixed weight portfolio of assets (such as stocks or currency exchange rates) priced in a common currency), it may be that options on that particular basket have not been traded hitherto, and for that or other reasons those particular option prices are not available. In that case, the final estimate of the optimal martingale distribution $Q_T$ can be determined by fixing a scalar value $\tau_0$ of the distribution parameter function ϕ, based on an assessment of various factors, including, for example, the corresponding initial optimal values $\{\tau_0\}$ estimated from option prices that are available on similar baskets or on some or all of the component assets of the particular basket.

At 451, an initial value of a Pick matrix is computed. The Pick matrix $\mathbb{P}$ is an n-by-n matrix representing the options data, where again n denotes the number of options in the group:

$$\mathbb{P}_n = (p_{K_j K_k})_{j,k=1}^n$$

and the subscripts $\{K_j\}$ denote the strike prices. The off-diagonal elements $p_{K_j K^k}$, $j \neq k$, are defined by $$p_{K_j K_k} = \frac{\tau_j - \tau_k}{K_j - K_k} \qquad \text{Equation 19}$$

where the $\{\tau_i\}_{i=1}^n$ are the set of n initial single-option values of the distribution parameter function $\phi$ (and may be substituted by subsequent values in subsequent iterations in an alternative embodiment). The diagonal elements $p_{K_j K_j}$ represent upper limits to limiting values of the off-diagonal elements (upper limits to the gradient of the distribution parameter function $\phi$ with respect to the strike price K). Such an upper bound (not necessarily optimal) can be deduced from the maximum weight in the distribution Q (to be determined) that can be concentrated at any given point, consistent with the given moments of the empirical distribution (consistent with the underlying financial instrument data). The point is that a maximum exists for the weight, covering all possible distributions. Accordingly, the diagonal elements are taken to be $$p_{K_j K_j} = \sum_i \frac{\rho(S_i)}{(S_i - K_j)^2} \qquad \text{Equation 20}$$

where the maximum weight $\rho(S)$ is defined as earlier, and the sum is taken over all values $\{S_i\}$ that are poles of the distribution corresponding to $\phi = \tau_j$. In the foregoing, the technical convenience is imposed (by slightly adjusting the distribution parameter function $\phi$, if necessary) that the distribution to be determined does not have any point of increase at a strike price $\{K_j\}$; otherwise one would have to work explicitly with complex variables. Further, in a particular implementation, the Pick matrix and its sub-matrices are required to be positive and may be adjusted, if necessary, to ensure that condition. Also, in one embodiment, the upper bounds on the diagonal elements in the Pick matrix can be tightened.

At 452, an initial value of a Potapov matrix is calculated. The Potapov matrix is defined as follows. Let I denote the n-by-n identity matrix, let e denote the n-dimensional unit column vector:

$$e = \begin{pmatrix} 1 \\ 1 \\ \vdots \\ 1 \end{pmatrix},$$

and let ' denote the transpose of a vector, so that $e' = (1\ 1\ \ldots\ 1)$ is the n-dimensional unit row vector. Let $v_\phi$ denote the n-dimensional column vector of the initial single-option values $\{\tau_i\}_{i=1}^n$ of the distribution parameter function $\phi$ (which may be substituted by subsequent values in subsequent iterations in an alternative embodiment):

$$v_\phi = \begin{pmatrix} \tau_1 \\ \tau_2 \\ \vdots \\ \tau_n \end{pmatrix},$$

so that $v'_\phi = (\tau_1\ \tau_2\ \ldots\ \tau_n)$. Let $Z_n$ denote the n-by-n diagonal matrix of strike prices in ascending order $$Z_n = \begin{pmatrix} K_1 & 0 & 0 & 0 \\ 0 & K_2 & 0 & 0 \\ 0 & 0 & \ddots & 0 \\ 0 & 0 & 0 & K_n \end{pmatrix}.$$

The two-by-two Potapov matrix $\Theta(z)$ can be defined by the matrix equation $$\Theta(z) = \begin{pmatrix} 1 & 0 \\ 0 & 1 \end{pmatrix} - \begin{pmatrix} v'_\phi \\ e' \end{pmatrix}(Z_n - z)^{-1} \mathbb{P}_n^{-1}(e - v_\phi) \qquad \text{Equation 21}$$

This formula is the "infinite constant $\alpha \to \infty$" version of Potapov's matrix. In an alternative embodiment, $\Theta^\alpha(z)$, a finite constant $\alpha$ version of Potapov's matrix can be used. A value of $\alpha$ is selected for computational convenience, subject to $\alpha > K_n$ (taking $K_n$ to be the largest strike price), and the Potapov matrix is defined by $$\Theta^\alpha(z) = \qquad \text{Equation 22}$$
$$\begin{pmatrix} 1 & 0 \\ 0 & 1 \end{pmatrix} - (z - a)\begin{pmatrix} v'_\phi \\ e' \end{pmatrix}(Z_n - z)^{-1} \mathbb{P}_n^{-1}(Z_n - aI)^{-1}(e - v_\phi).$$

Denoting the elements of the Potapov matrix by subscripts as follows $$\Theta(z) = \begin{pmatrix} \Theta_{11}(z) & \Theta_{12}(z) \\ \Theta_{21}(z) & \Theta_{22}(z) \end{pmatrix},$$

the functional values of the distribution parameter function $\phi$ can be determined by values of the interpolation function U in accordance with the fractional linear transformation given by the Potapov matrix:

$$\phi_U(z) = \frac{\Theta_{11}(z)U + \Theta_{12}(z)}{\Theta_{21}(z)U + \Theta_{22}(z)} \qquad \text{Equation 23}$$

which is referred to herein as the "interpolation formula". A parallel formula is applied if $\Theta^\alpha(z)$ is used in place of $\Theta(z)$. One feature of embodiments of the disclosed technology is that even if the $\{s_i\}_{i=2}^\infty$ are assumed to remain constant (regarded as centered moments), the implied option volatilities will vary with varying prices for the underlying instrument ($s_1$) and for the options, because the transformation matrices and the distribution parameter function vary.

Preferably, and in accordance with certain embodiments of the disclosed technology, the distribution parameter function $\phi$ is required to correspond to an n-canonical solution ($\phi$ is required to be a rational function of exactly n-th degree (and real on the real axis)), where n denotes the number of options in the selected group at maturity T. By implication, it follows that the interpolation function U necessarily is a scalar (a function equal to a fixed real number).

At 460, a set of test scalar values of $\{U_i\}$ is selected. The set can include the value $\tau_0$ (the initial value of $\phi$) and can fall in a range around $\tau_0$; the range of test values can be similar to that spanned by the maximum and minimum values in the set $\{\tau_i\}_1^n$.

At 462 and 464, from each of the set of scalar test values a corresponding test functional value $\phi_{U_i}$ of $\phi$ is determined, constituting the set $\{\phi_{U_i}\}$, by means of the fractional linear transformation given by the Potapov matrix (the equation just given above).

Given a test functional value $\phi_{U_i}$ of $\phi$, the implied price for each option in the group is determined by means of the inverse Stieltjes transform sub-model (at 466) and the options pricing sub-model (at 468). (As before, the options pricing can include an adjustment for non-contemporaneous option prices at 470.) Accordingly, the sets of implied option prices corresponding to each $\phi_{U_i}$ taken in turn are computed, together with each corresponding martingale distribution $Q_i$.

At 469, the final estimate of the optimal martingale distribution $Q_T$ is output. For example, the final estimate of the optimal martingale distribution $Q_T$ can be stored (e.g., on one or more non-transitory readable medium) and then displayed to a user using a suitable display device.

e. Computing the Final Estimate of the Martingale Distribution $Q_T$

In one embodiment, the final estimate of the optimal martingale distribution $Q_T$ is taken to be the distribution $Q_i$ that implies option prices that best approximate (or approximate within a user-selected or predetermined margin) the empirical data prices of the selected group of options, according to a predetermined or user-selected criterion (e.g. least squares).

Figure 5A:
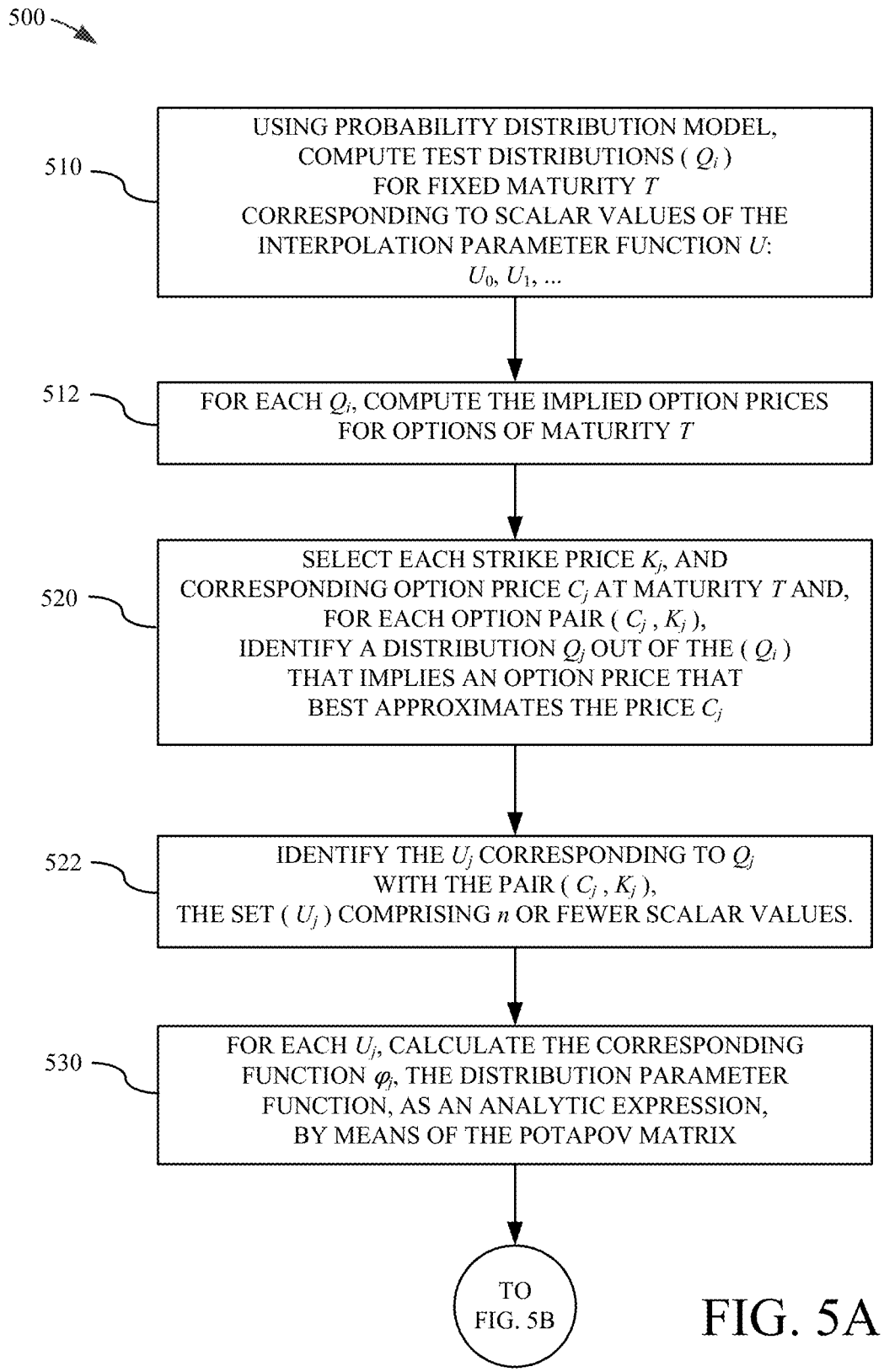
FIGS. 5A-5B show a flowchart of an exemplary technique for determining a final estimate of a martingale probability distribution by constructing a second value of the Pick matrix in accordance with an embodiment of the disclosed technology.
Figure 5B:
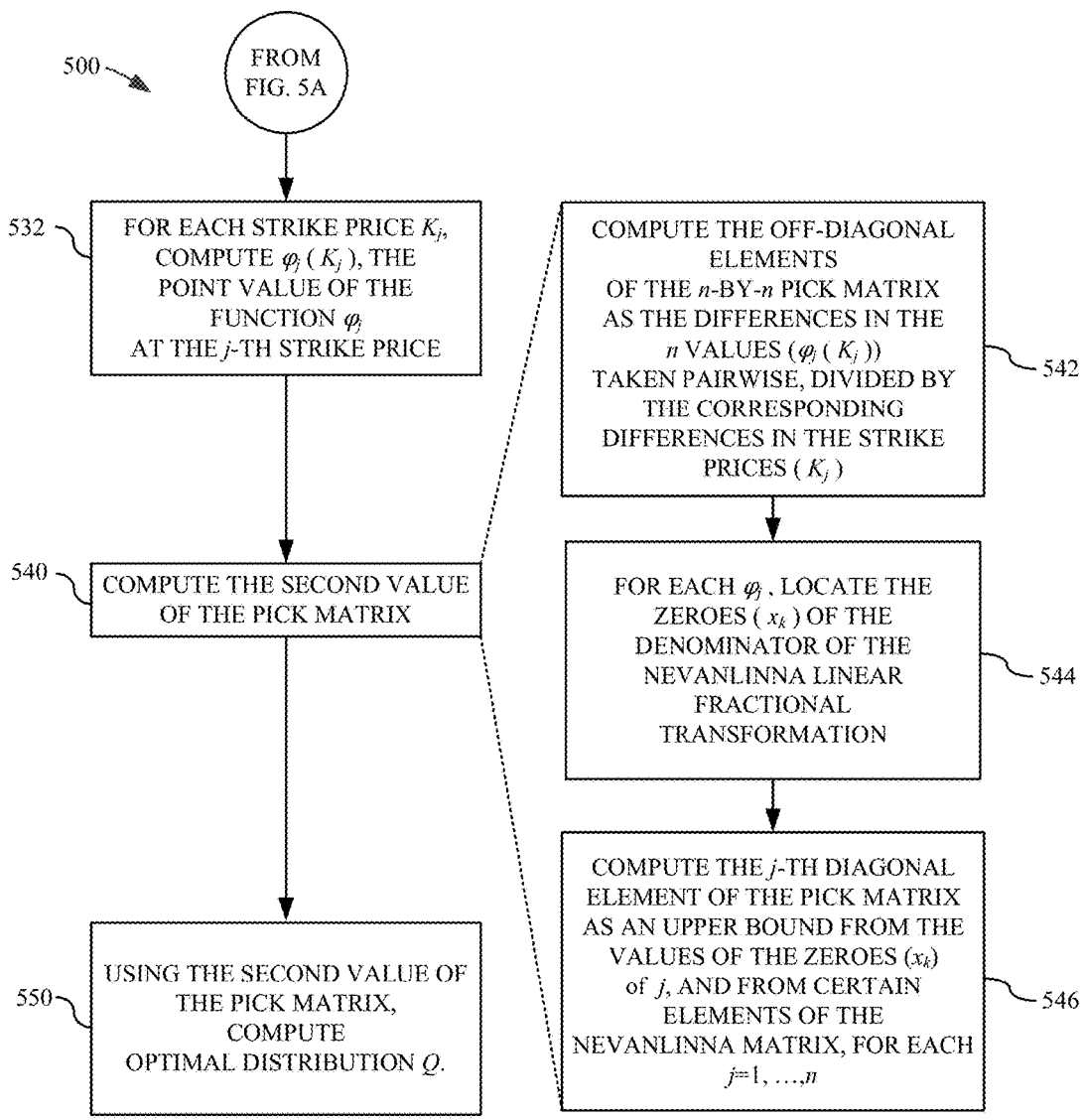

Another embodiment is illustrated in FIGS. 5A-5B. In particular, FIGS. 5A-5B show a flowchart 500 of an exemplary technique for determining a final estimate of a martingale probability distribution by constructing a second value of the Pick matrix in accordance with an embodiment of the disclosed technology.

At 510, and using the probability distribution model as described above, test distributions $\{Q_i\}$ at maturity T and corresponding to scalar values of the interpolation parameter function U are computed.

At 512, the implied option prices for options of maturity T are computed for each $Q_i$ (as described above at 466 and 468)

At 520 and 522, a subset of n or fewer distributions are selected from the set $\{Q_i\}$ such that each $Q_i$ implies an option price that best approximates (or approximates within a user-selected or predetermined margin) a single option price in the selected group, each price being taken in turn or in some other order.

At 530 and 532, the corresponding values of $U_i$ are used to calculate corresponding values $\phi_i$ of $\phi$ for the function valued at the corresponding strike price of the option concerned.

From these values, and at 540, a second value of the Pick matrix is constructed. As shown at 542, 544, 546, the method acts in the previously described method subsequent to the determination of the initial value of the Pick matrix are followed, with the values $\{\phi_i\}$ substituted for the initial values $\{\tau_i\}$ of the distribution parameter function $\phi$.

At 550, a final estimate of the distribution Q is determined. For example, in particular implementations, the final estimate is determined according to the embodiment described previously, namely the $Q_i$ that implies option prices that best approximate (or approximate within a user-selected or predetermined margin) the option prices of the selected group taken together.

f. Computing Conditional Extremal Distributions $Q_H$ and $Q_L$

Returning to FIG. 4, at 453, 454, 455, 456, the conditional extremal distributions, conditional on the contemporaneous option price data, are given by extremal values of U, in analogy to the extremal values of the distribution parameter function $\phi$, namely U is set to be infinite or zero, corresponding respectively to $$\phi_H = \Theta_{11}/\Theta_{21} \quad \Theta_L = \Theta_{12}/\Theta_{22} \qquad \text{Equation 24}$$

in order to generate measures that give respectively the conditional high and low price bounds to options.

g. Further Considerations

Any of the method acts introduced above, from the selection of T onwards, can be repeated for each group of options, corresponding to each of the maturities $\{T\}$. As noted above, the final estimates of distributions $\{Q_T\}$ correspond to a final set of scalar values $\{U_T\}$ which may be smoothed as a function of maturity, so as to infer smoothed martingale distributions that characterize the options market taken as a whole.

In certain embodiments of the disclosed technology, graphical displays are generated of various quantities of interest, as functions of the underlying instrument price S expressed in, for example, current value terms. The various quantities of interest can additionally or alternatively be stored as data in one or more non-transitory computer-readable storage media. The quantities that are stored and/or displayed can include, for example, one or more of: the strategies $\{R^*_k\}$ (up to a predetermined or user-selected desired number); the associated hedging coefficients delta, $\{\Delta_k\}$, and gamma, $\{\Gamma_k\}$; and, for each maturity T, the martingale distribution $Q_T$, the associated optimal upper and lower bounds to the distribution ($Q_F$ and $Q_K$, which are respectively the Friedrichs and Krein measures), and the conditional high and low bounds, $Q_H$ and $Q_L$, which are conditional on the empirically given option prices. The displayed data can be displayed in a variety of formats (e.g., as part of a computer-displayed graph or graphical user interface). The displayed data can also be printed.

While the disclosed technology has been particularly shown and described with reference to preferred embodiments thereof, it will be understood by those skilled in the art that various changes in form and details can be made without departing from the spirit and scope of the invention. In particular, it will be understood that variants of the disclosed technology can include the following considerations: application to various asset classes, including stocks, interest rates, currencies, commodities, and credit; incorporation of dividend or interest payments; application to multi-asset options; application to American and mildly path-dependent options and other forms of derivatives; use of put option prices by means of put-call parity relations; adaptation to use of both forward prices and discount factors in place of one of the foregoing together with current prices of the underlying financial instrument; adaptation to negative prices for financial instruments that do not have limited liability; adaptation to use of non-equal time intervals between underlying instrument price observations; and adaptation to use of option delta in place of strike price.

D. Generalized Embodiments of the Disclosed Technology

Figure 6A:
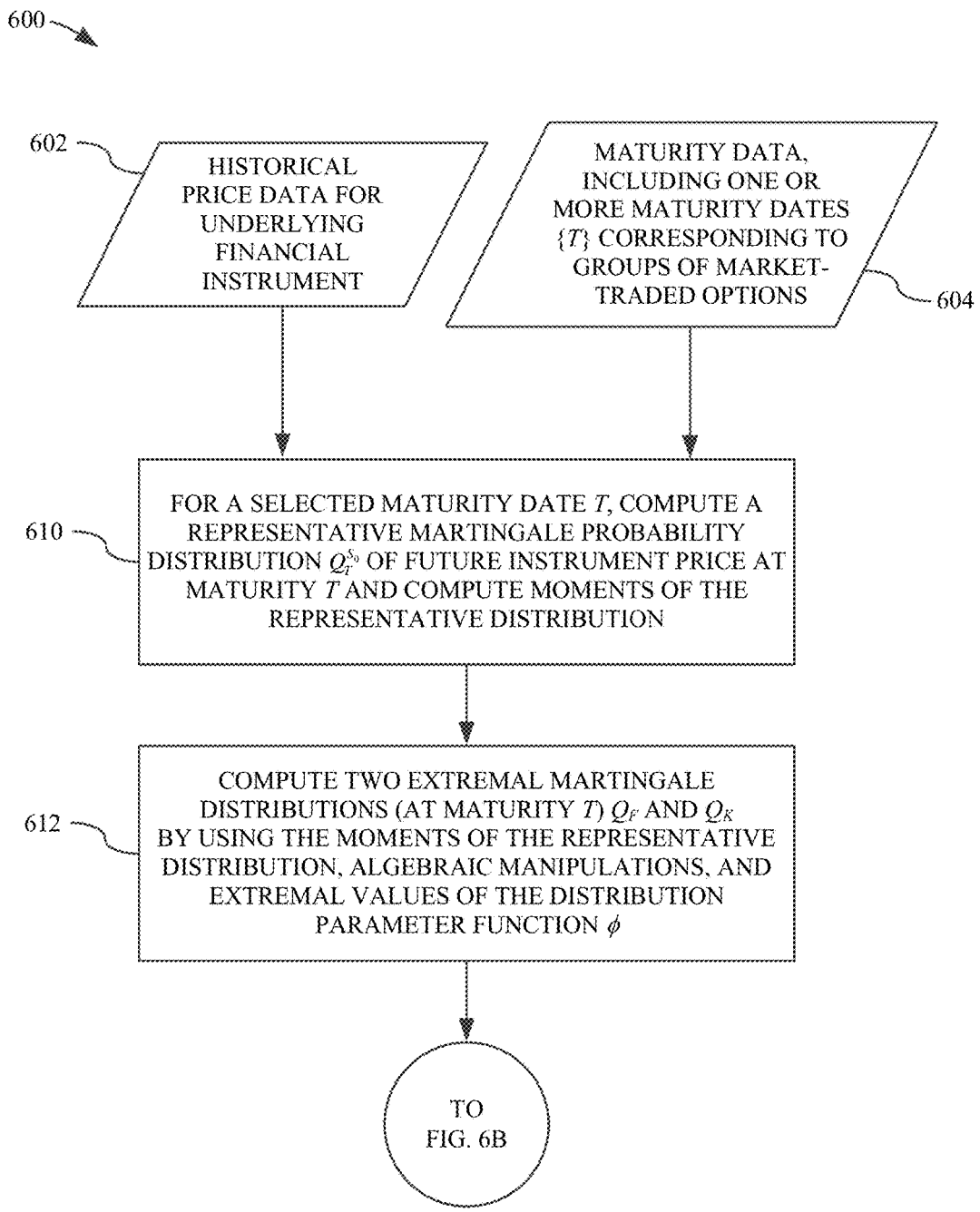
FIGS. 6A-6B show a flowchart illustrating a generalized method for generating multiple martingale probability distributions for an option or a group of options having a common maturity date.
Figure 6B:
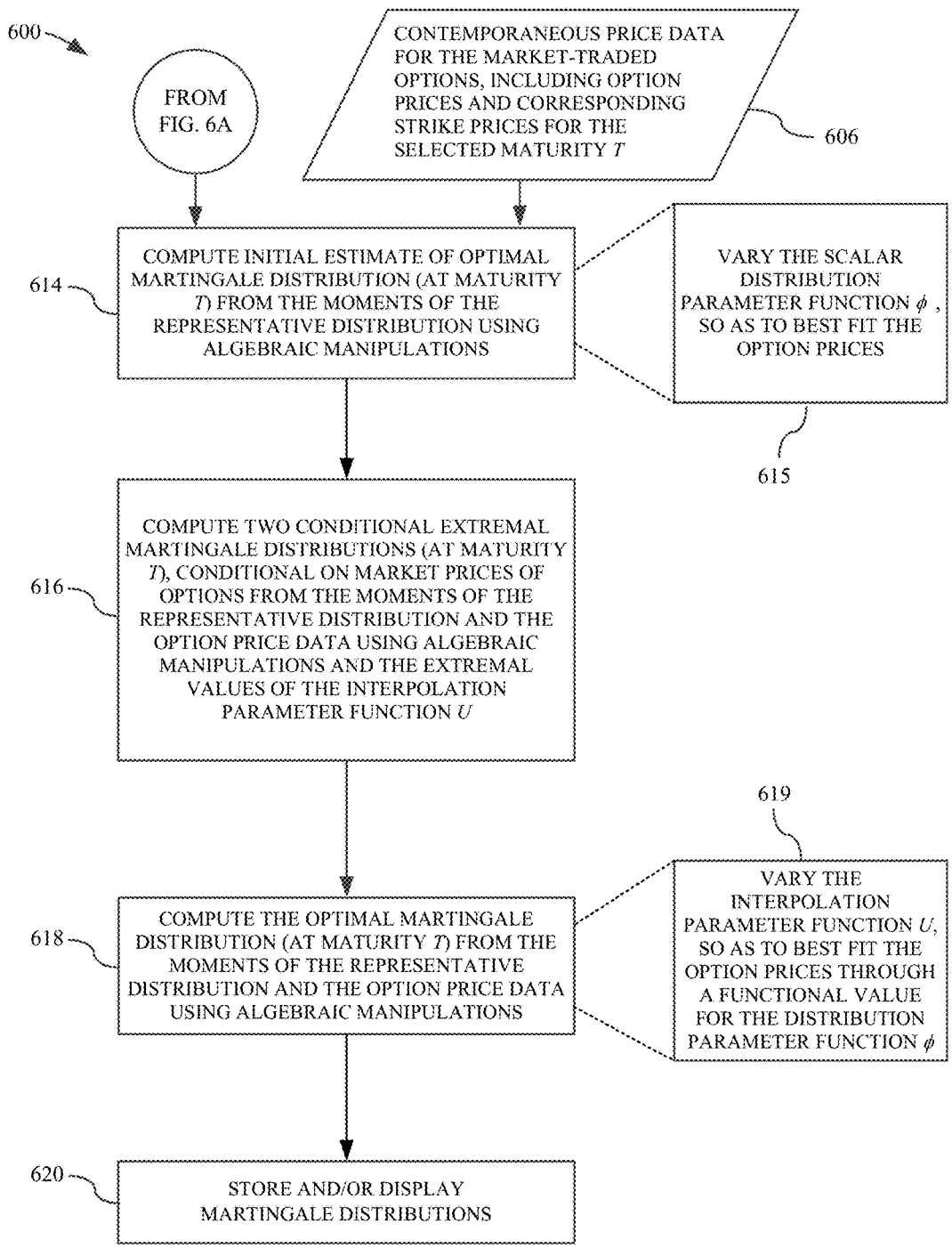

1. Generalized Methods for Generating Multiple Martingale Probability Distributions FIGS. 6A-6B show a flowchart 600 illustrating a generalized method for generating multiple martingale probability distributions for an option or a group of options having a common maturity date. In particular, FIGS. 6A-6B illustrate a generalized version of the embodiment illustrated in FIG. 4. The exemplary method illustrated in FIGS. 6A-6B should not be construed as limiting, however, as any one or more of the illustrated acts can be performed alone or in various combinations and subcombinations with other method acts.

In the exemplary method shown in FIGS. 6A-6B, historical price data is used only through the moments of a representative martingale distribution at maturity T. The moments comprise the average of x, the average of $x^2$, the average $x^3$, and so on. This is in contrast to alternative approaches in which historical price data is used implicitly (and in some instances explicitly) in the selection of a parametric functional form for a probability distribution. In effect, the functional form in such alternative approaches assumes more information than the data itself actually provides.

Furthermore, in the illustrated embodiment, martingale probability distributions, computed in the form of "average components" followed by an inversion (e.g., integral and inverse integral transformations), are computed by algebraic manipulations. For instance, in certain implementations of the illustrated embodiment, the computation of the martingale probability distributions is performed without using any stochastic or differential equation methods (e.g., the computation of the martingale probability distributions is performed using only algebraic manipulations).

Further, in the illustrated embodiment, the input data used for various method acts (e.g., the representative martingale distribution at maturity T, and the short-run distribution) is input in the form of a finite set of discrete data, not a function. The moments of those distributions are then calculated and used in subsequent computations.

At 610, a representative martingale probability distribution of the future instrument price at maturity T is computed for an underlying financial instrument. In certain embodiments, the computation is performed using the historical price data for the underlying instrument (e.g., using only the historical price data for the underlying instrument). The historical price data 602 can be input (e.g., buffered into memory or otherwise loaded and prepared for further processing), for example, by accessing a suitable database (as described above in Section III.C.1 with respect to method act 210). Furthermore, the maturity date T can be input by a user as part of maturity data 604. The maturity data 604 can comprise one or more maturity dates for individual market-traded options or groups of options. In particular implementations, the maturity date T is provided by a user via a suitable graphical user interface. Further, the maturity date T can be based on the available maturities of the market-traded options. (It should be noted that, in some instances, the representative distribution is termed "conditional" because it is conditional on the current market price of the underlying instrument. This usage should not be confused with "conditional on option prices", which is used herein to refer to the conditional extremal distributions.)

In the illustrated embodiment, the historical price data is used to compute a short-run probability distribution, the moments of which are then calculated. For purposes of this discussion, "moments" refer to one or more of the average of x, the average of $x^2$, the average of $x^3$, and so on. In particular embodiments (e.g., as described in Section III.C.3.a above), only the moments together with the current price of the underlying instrument are used to compute the representative distribution (other historical price statistics are not used). In certain embodiments, the computation of the representative distribution proceeds from the moments by calculating the corresponding trading strategies (e.g., in the form of orthogonal polynomials) and excess returns. In other embodiments, the empirical (as opposed to the martingale or "risk neutral") distribution at maturity T is calculated from the historical price data. Then, the Esscher transform is used to compute the representative distribution (e.g., as described in Section III.C.3.a above). The Esscher transform turns an empirical distribution into a martingale distribution, and can be computed in a straightforward manner.

In certain embodiments of the disclosed technology, the only way that the representative distribution is used in subsequent calculations is through its calculated moments. In technical terms, the moments constitute a sufficient statistic for the historical price data. Accordingly, and in some implementations, no parametric functional forms are used (or need to be used). In particular embodiments (and as described in Section III.C.3.b), the representative distribution is computed in the form of a finite set of data points, without the use of any parametric functional form, nor any stochastic or differential equation methods. It should also be noted that, in the illustrated embodiment, the use of the moments used in process blocks 612-618 is separate (and complementary) to the use of the moments of the unconstrained conditional price distribution shown at blocks 130-132.

At 612, extremal probability distributions are computed. In particular implementations, the extremal probability distributions are the distributions that give rise to upper and lower bounds on the price of any option at maturity T for the underlying instrument. These distributions are also referred to as the Friedrichs and Krein distributions, respectively. In the illustrated embodiment, the distributions are computed indirectly in the form of "average components" (or simply "averages"). The average components can be viewed as being analogous to frequency components in a frequency decomposition of a musical signal. In one exemplary embodiment, the average is the Stieltjes transform of the distribution, and is an integral transformation (e.g., as described in Section III.C.3.b above). The average components for each distribution can be computed by a formula that depends on both historical price data and a parameter that can be varied. For instance, in the illustrated embodiment, the historical price data are used through the moments of the representative martingale distribution (e.g., only through the moments of the representative martingale distribution). In one particular exemplary implementation of the illustrated method (as described in Section III.C.3.b above), the historical price data is encapsulated in matrix form (e.g., the Nevanlinna matrix), and the parameter that can be varied is termed the distribution parameter function. In this implementation, the average is the fractional linear transformation, determined by the Nevanlinna matrix, of the distribution parameter function, which takes the mathematical form of a compactified Nevanlinna class. The distribution parameter function has two extremal values, namely two fixed numbers. Substituting these numbers gives the average components of the extremal distributions. The distributions themselves can be computed from the averages by an inverse method (an inverse integral transformation). For instance, in one exemplary implementation, the inverse method is the inverse Stieltjes transform (also termed the Stieltjes-Perron inversion formula). By the inverse method, the extremal distributions are computed. In the particular implementation described above, the computations involving the historical price data and the inverse method require only algebraic manipulations and, therefore, do not use stochastic or differential equation methods.

At 614, an initial estimate of the optimal martingale distribution (sometimes referred to as the "approximating martingale distribution") at maturity T is computed. The approximating martingale distribution at maturity T is the one that, when used to price the group of market-traded options (the one or more options) of maturity T, gives the best fit to contemporaneous market prices for options for which contemporaneous prices have been provided. By "best fit" is meant the value that best meets a predetermined or user-selected criterion (e.g. least squares, the fit that minimizes the sum of the squares of the deviations between each computed price and its empirical data counterpart, or other such criteria). Furthermore, in some implementations, the best fit can be within some predetermined or user-selected tolerance of the best possible value (e.g., within 1%, 2%, 5%, or 10%). In some embodiments, during the computation of the initial estimate of the optimal distribution, option prices are not used to compute the various candidate distributions, but only to select the best fit distribution. Subsequent estimates (iterations) use the option prices in the computation of the candidate distributions.

In one particular exemplary implementation, the computation proceeds as follows. A set of scalar values (numbers) are selected for the distribution parameter function. It should be noted that the distribution parameter function can take not only scalar, but also functional values. In other words, the distribution parameter function (e.g., distribution parameter function $\phi$) can be not only a specific number, but also a specific function. At this stage of the initial estimate, however, the distribution parameter function is a scalar; when option prices are subsequently provided, the distribution parameter function is computed as a function (e.g., by means of the Potapov matrix and the interpolation parameter function). From the set of scalar values, a set of corresponding test distributions are computed. In particular, from each scalar value, a distribution is computed in the indirect form of "average components" (e.g., using the Stieltjes transform) by means of the incomplete markets formula (e.g., using equation (14)). This formula uses historical prices in the form of the Nevanlinna matrix (the historical prices can be said to be encapsulated by the Nevanlinna matrix), which has been calculated at maturity T from the relevant moments. The "average components" form of each distribution is inverted to give the distribution by means of the inverse method (e.g., using the inverse Stieltjes transform). Then, for each test distribution, the implied prices are computed for the provided market-traded options (the one or more options) of maturity T. The calculations are carried out by means of the options pricing sub-model. The options pricing sub-model is a pricing procedure that computes the price of any option of the same maturity T given a martingale distribution at maturity T. Exemplary options pricing sub-models that can be used include, for example, equation (17) above. Details of how to compute the price according to the formula are known and need not be set forth here. In the particular implementation described above, the computations with the incomplete markets formula, the inverse method, and the options pricing sub-model require only algebraic manipulations, not stochastic or differential equation methods.

Each set of implied prices is compared to the provided set of market prices for options of maturity T, and a best fit set is determined. For example, at 615 in the illustrated embodiment, the scalar distribution parameter function $\phi$ is varied to find the best fit of the implied prices to the provided set of market prices. Thus, a best fit scalar value for the distribution parameter function is determined. If the provided option prices at maturity T are not exactly contemporaneous (e.g., were prevailing at different times of the trading day) then the calculated implied prices can be adjusted by known methods (e.g., as described at Section III.C.3.c above). In one exemplary implementation, the best fit scalar value for the distribution parameter function is used subsequently merely as a guide for test values for the interpolation parameter function. But the single-option best fit scalar values for the distribution parameter function, calculated at the same time, are used directly to construct the Pick matrix (e.g., as described at Sections III.C.3.d and III.C.3.e above).

At 616, two conditional extremal martingale distributions are computed. The two conditional extremal distributions are conditional on the provided market prices of options at maturity T. In other words, the conditional extremal distributions incorporate the information from the option prices (whereas the unconditional extremal distributions were based only on historical price data for the underlying instrument). In general, the conditional extremal distributions provide tighter bounds on upper and lower option prices than do the unconditional counterparts. At this stage of the computations, with the input of option prices, the distribution parameter function is no longer constrained to be a scalar (a number), but may instead take functional values. This produces a better distribution, as evidenced by a more accurate fit to market data. In one particular implementation (e.g., as described above at III.C.3.f and III.C.3.d), functional values of the distribution parameter function are computed in two stages, both of which use the provided market option prices (at maturity T). In the first stage, a mathematical operator is calculated (e.g., the Pick matrix as described above in III.C.3.d). In the second stage, the distribution parameter function is given in terms of another parameter, the interpolation parameter function, by a formula (e.g., using the Potapov matrix, which depends on the Pick matrix, as described above at III.C.3.d with respect to equation (23)). The conditional extremal distributions are generated by the two extremal scalar values of the interpolation parameter function. The two extremal scalar values produce two corresponding functional values of the distribution parameter function (e.g., using equation (23)). In turn, those two functional values are used in the incomplete markets formula to produce two indirect ("average components") forms of the distributions. In turn, the two indirect forms are used in the inverse method (inverse Stieltjes transform) to produce two extremal distributions. In the particular implementation described above, the computations require only algebraic manipulations, not stochastic or differential equation methods.

At 618, the optimal martingale distribution at maturity T is computed. The optimal distribution is computed by finding an optimal functional value for the distribution parameter function. (In general, the use of a functional value here improves the results from the initially estimated scalar value.) Further, in the illustrated embodiment, the functional value is computed using the option price data (for options of maturity T). In one particular implementation (e.g., as described above in Sections III.C.3.d and II.C.3.e), functional values for the distribution parameter function are computed in two stages. In the first stage, a mathematical operator (e.g., the Pick matrix, as described above in Section III.C.3.d) is calculated. In the second stage, the distribution parameter function is given in terms of another parameter, the interpolation parameter function, by a formula (e.g., using the Potapov matrix, which depends on the Pick matrix, as described above in Section III.C.3.d). In this implementation, the mathematical operator (e.g., the Pick matrix) is computed from the options price data and expresses the gradient of the distribution parameter function with respect to the strike price of the options (the one or more options) of maturity T. Accordingly, it represents a generalization of the volatility smile (the gradient of volatility against strike price) known to those skilled in the art. By using the Potapov matrix, functional values of the distribution parameter function are generated according to the values assigned to the interpolation parameter function. In certain desirable implementations (e.g., as described above in Section III.C.3.d), the interpolation parameter function is taken to be a scalar value. In such implementations, any number of candidate probability distributions (and desirably all candidate probability distributions) can be generated by a single scalar parameter (the interpolation parameter function). To compute the candidate probability distributions, test scalar values of the interpolation parameter function are selected (e.g., two or more test scalar values). The test scalar values can be selected by using the previously fitted scalar values (aggregate and single option) of the distribution parameter function or by some other means (e.g., randomly, predetermined, or user input). From each of the set of scalar test values, a corresponding test functional value of the distribution parameter function is determined. From each test value of the distribution parameter function, again functional values, an indirect ("average components") form of the corresponding test distribution is computed by means of the incomplete markets formula. From the indirect form, the distribution is computed by using the inverse method (e.g., an inverse Stieltjes transform). Then, for each test distribution, the implied prices are calculated of the provided market-traded options (the one or more options) of maturity T. The calculations are carried out by means of the options pricing sub-model. In the particular implementation described above, the computations with the certain formula, the Pick and Potapov matrices, the incomplete markets formula, the inverse method, and the options pricing sub-model require only algebraic manipulations, not stochastic or differential equation methods.

Each set of implied prices is compared to the provided set of market prices for options of maturity T, and a best fit set is determined. For example, at 619 in the illustrated embodiment, the interpolation parameter function U is varied to find the best fit of the implied prices to the provided set of market prices through a functional value for the distribution parameter function φ. Thus, a best fit scalar value for the interpolation parameter function (and a functional value for the distribution parameter function) is determined.

At 620, the martingale probability distributions at each selected maturity T are stored or stored and displayed (e.g., as described above at Section III.C.3.g). In the illustrated embodiment, the martingale probability distributions stored and/or displayed comprise the optimal distribution, the two extremal distributions, and the two conditional extremal distributions. In particular implementations, the martingale probability distributions are stored and displayed as distributions of the underlying financial instrument price, expressed in current value terms (as a price prevailing at date T) (e.g., as described above). The displayed data can be displayed in a variety of formats (e.g. as part of a computer-displayed graph or graphic user interface) and on a variety of different display devices (e.g., computer monitors, touch-screen displays, tablet displays, and the like). The displayed data can also be printed.

Figure 7:
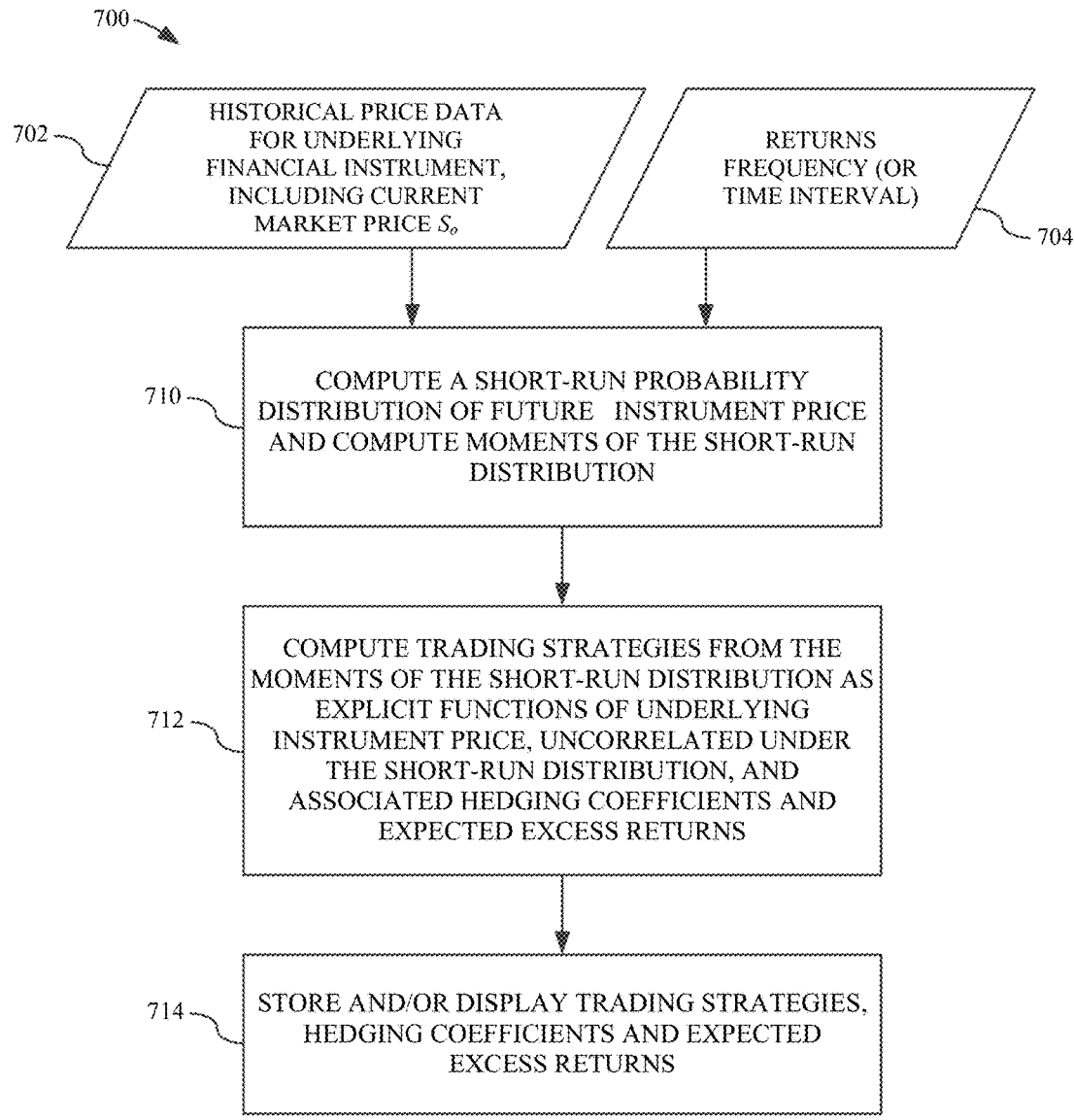
FIG. 7 is a flowchart illustrating an exemplary method for generating one or more of trading strategies, hedging coefficients, or expected excess returns for an underlying financial instrument.

2. Generalized Methods for Generating Multiple Trading Strategies, Associated Hedging Coefficients, and Expected Excess Returns FIG. 7 is a flowchart 700 illustrating an exemplary method for generating one or more of trading strategies, hedging coefficients, or expected excess returns for an underlying financial instrument. In particular, FIG. 7 illustrates a generalized version of the embodiment described above with respect to FIG. 2. The exemplary method illustrated in FIG. 7 should not be construed as limiting, however, as any one or more of the illustrated acts can be performed alone or in various combinations and subcombinations with other method acts.

The method illustrated by flowchart 700 uses historical price data 702 (a time series) for the underlying financial instrument, including the current market price, as input. The historical price data can be input (e.g., buffered into memory or otherwise loaded and prepared for further processing), for example, by accessing a suitable database (as described above in Section III.C.1 with respect to method act 210). The method illustrated by flowchart 700 also uses a returns frequency 704, equivalently a time interval, as input. The returns frequency (or time interval) can be received as part of user data generated by a user selecting the returns frequency through a graphical user interface or other interface with a user. In particular implementations, the minimum time interval is the time between data observations, other intervals being integral multiples of that minimum. The overall length of the time series can also be received as part of user data generated by a user selecting the length through a graphical user interface or other interface. Alternatively, any one or more of the returns frequency or the length of the time series can be predetermined.

At 710, from one or more pairs of price observations separated by the selected time interval (e.g., from every pair of price observations), the short-run return is calculated. For example, in one particular implementation, if there are 1,000 consecutive daily price observations, and the selected time interval is daily, the number of returns calculated is 999; if the interval is 2 days, the number is 998. The set of returns so obtained constitutes the returns density (a probability density). In one exemplary implementation, an initial short-run probability distribution, the unconstrained conditional price distribution, is computed as follows. (This distribution, like all others, is a distribution over the underlying financial instrument price.) The returns density acting over the selected time interval on the current market price of the underlying instrument generates the initial short-run probability distribution (e.g., as described above in Section III.C.1 and III.C.2). The distribution is termed "conditional" because it is conditional on the current market price of the underlying financial instrument. It is termed unconstrained because there is at this stage no constraint on returns observations (e.g. as to whether they arise from prices close to the current market price of the underlying instrument). The constrained short-run probability distribution, meaning the constrained distribution which will be used in subsequent calculations, can be computed using a variety of methods. For example, in one embodiment, the Whittle estimator is used (e.g., as described above at Section III.C.2). In this embodiment, a "bandwidth" is selected that determines which observations from the historical price data are to be retained ("the constrained data"), dependent on whether the returns were generated from a price close to the current market price of the underlying instrument. The unconstrained distribution (the initial short-run distribution) is modified by the technique of orthogonal series. In a particular implementation, the calculation uses orthogonal polynomials whose value is determined solely by the constrained data. Other embodiments can also be used (e.g., as described above with respect to method act 220).

In the illustrated embodiment, the moments of the short-run distribution are computed and used in subsequent computations. In particular implementations of the illustrated embodiment, only the moments are used, not any other statistics of the distribution, nor any parametric functional form for it. For instance, the short-run distribution can be computed in the form of a finite set of data points, without the use of any parametric functional form, nor any stochastic or differential equation methods. The number of moments computed can be predetermined or user selected.

At 712, the trading strategies are computed from the moments. The trading strategies form a long sequence (e.g., an endless sequence) and so only a pre-determined or user-selected number are computed. In general, the maximum number of trading strategies is limited by the number of moments calculated. In one exemplary implementation, the trading strategies are calculated recursively as polynomials, orthogonal to each other with respect to the short-run distribution (e.g., as described above in Section III.C.1 with respect to method act 242). In other words, given a starting strategy, each successive strategy is uniquely determined by the condition that it be orthogonal to previously computed strategies (e.g., all previously computed strategies) with respect to the short-run distribution. (Orthogonal means that the expected value, under the distribution, of the product of any two strategies equals zero.) The starting strategy (the zeroth order one) is typically taken to be the function 1 (referring to investment in the cash asset (which has a value of 1 per unit investment)). The independent variable in the polynomials is the underlying instrument price. In other words, the trading strategies are expressed as polynomial functions of the underlying instrument price. The trading strategies are thus calculated as explicit functions of the underlying instrument market price. The function indicates the value of the strategy (investment position) for any given value of the instrument price. That is, the value of the trading strategy is indicated by the explicit function of the instrument price. Because the trading strategies are constructed to be orthogonal, they are uncorrelated (which is a desirable features since traders want to be able to separate out their risks). The hedging coefficients are computed in explicit functional form as functions of the underlying instrument price (e.g., as explained above in Section III.C.1 with respect to method act 250). At least two coefficients can be calculated for each trading strategy, the delta coefficient and the gamma coefficient, which are coefficients commonly used by investors in making investment decisions. The expected excess return for each trading strategy can be calculated (as a fixed number) (e.g., as described above in Section III.C.1 with respect to method act 280). The expected excess return is the excess return (per cent per annum) expected over and above the return to the cash strategy (an investment in cash (a money market instrument)). Because the trading strategies, associated (corresponding) hedging coefficients, and expected excess returns are computed purely from the moments of the short-run distribution, they can be determined regardless of whether or not options are traded on the financial instrument. That is, the trading strategies do not require the input of any option price data.

In an alternative embodiment, the trading strategies are calculated in the same manner as the exemplary embodiment described above, excepting that they are calculated with respect to the representative martingale distribution at a selected maturity T, not the short-run distribution. The computations of hedging coefficients and expected excess returns also proceeds in the same manner, excepting that they are based on the representative martingale distribution.

At 714, any one or more of the trading strategies, associated (corresponding) hedging coefficients, or excess returns are stored or stored and displayed. For example, the trading strategies and hedging coefficients can be stored and displayed as functions of the underlying financial instrument price, expressed in current value terms (as a price prevailing at date T) (e.g., as described above in connection with FIG. 3). The displayed data can be displayed in a variety of formats (e.g. as part of a computer-displayed graph or graphic user interface) and on a variety of different display devices (e.g., computer monitors, touchscreen displays, tablet displays, and the like). The displayed data can also be printed.

IV. Exemplary Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones, tablet computers, netbooks, or other devices that include computing hardware). Any of the computer-executable instructions for implementing the disclosed techniques as well as any data created and used during implementation of the disclosed embodiments (e.g., the input data, or any one or more of the generated intermediate probability distributions or their moments, associated "a and b coefficients" or expectations generator, trading strategies or associated expected excess returns or hedging coefficients, Nevanlinna, Pick or Potapov matrices, extremal or optimal martingale distributions, distribution parameter or interpolation functions, or other elements) can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display configured to display.

Figure 8:
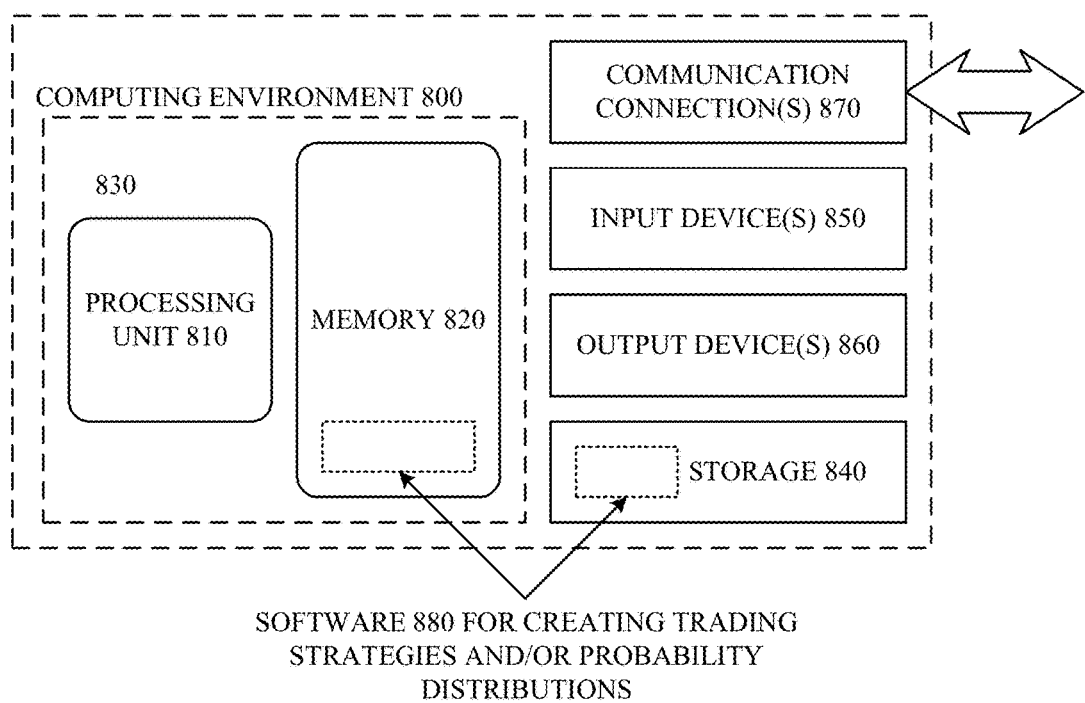
FIG. 8 shows a schematic block diagram of a computing environment that can be used to implement embodiments of the disclosed technology.

FIG. 8 illustrates a generalized example of a suitable computing environment 800 in which several of the described embodiments can be implemented. The computing environment 800 is not intended to suggest any limitation as to the scope of use or functionality of the disclosed technology, as the techniques and tools described herein can be implemented in diverse general-purpose or special-purpose environments that have computing hardware.

With reference to FIG. 8, the computing environment 800 includes at least one processing unit 810 and memory 820. In FIG. 8, this most basic configuration 830 is included within a dashed line. The processing unit 810 executes computer-executable instructions. In a multi-processing system, multiple processing units execute computer-executable instructions to increase processing power. The memory 820 may be volatile memory (e.g., registers, cache, RAM), non-volatile memory (e.g., ROM, EEPROM, flash memory), or some combination of the two. The memory 820 stores software 880 implementing one or more of the described techniques for operating or using the disclosed technology. For example, the memory 820 can store software 880 for implementing any of the disclosed techniques described herein and their accompanying user interfaces.

The computing environment can have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 can be removable or non-removable, and includes magnetic disks, magnetic tapes or cassettes, CD-ROMs, DVDs, or any other tangible non-transitory non-volatile memory or storage medium which can be used to store information and which can be accessed within the computing environment 800. The storage 840 can also store instructions for the software 880 implementing any of the described techniques, systems, or environments.

The input device(s) 850 can be a touch input device such as a keyboard, touchscreen, mouse, pen, trackball, a voice input device, a scanning device, or another device that provides input to the computing environment 800. The output device(s) 860 can be a display device (e.g., a computer monitor, smartphone display, tablet display, netbook display, or touchscreen), printer, speaker, CD-writer, or another device that provides output from the computing environment 800.

The communication connection(s) 870 enable communication over a communication medium to another computing entity. The communication medium conveys information such as computer-executable instructions, resource allocation messages or data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 800, computer-readable media include tangible non-transitory computer-readable media such as memory 820 and storage 840.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 9:
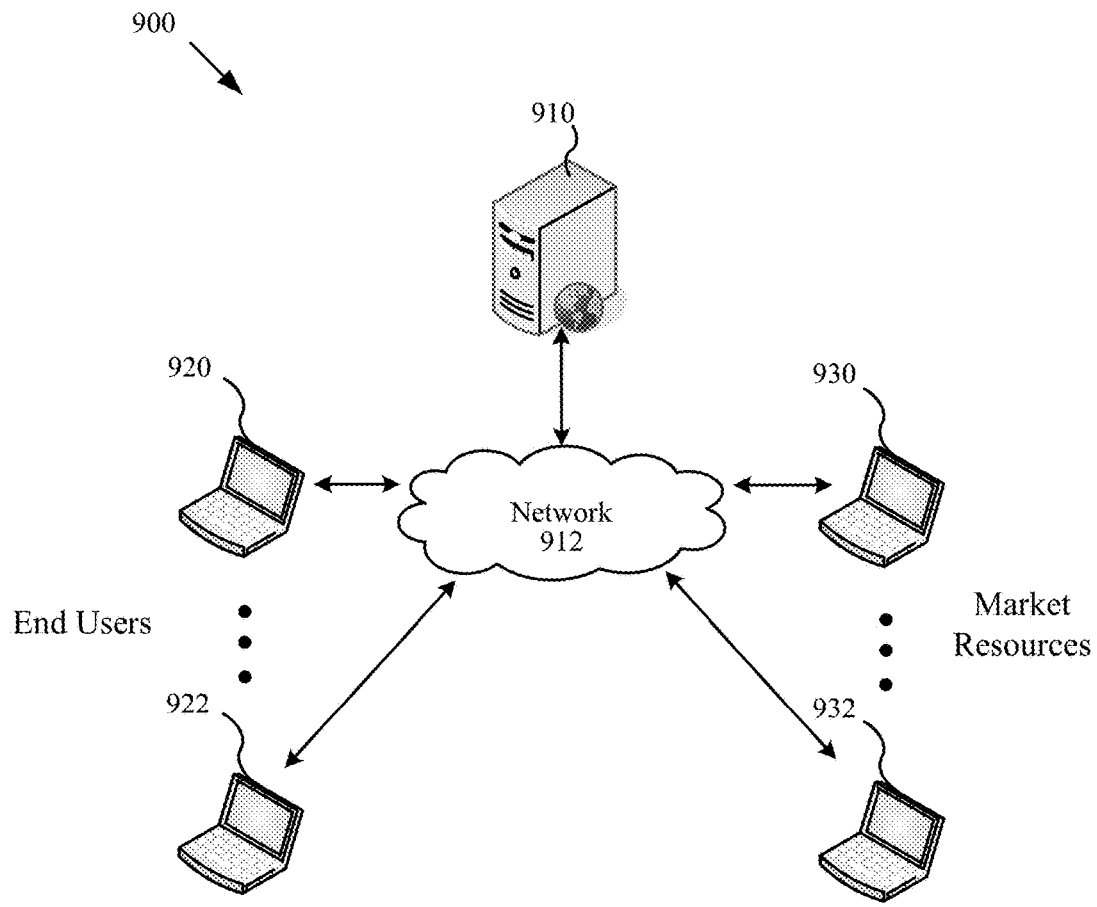
FIG. 9 shows a schematic block diagram of a first network topology that can be used to implement embodiments of the disclosed technology.

An example of a possible network topology (e.g., a client-server network) for implementing a system according to the disclosed technology is depicted in FIG. 9. Networked computing devices 920, 922, 930, 932 can be, for example, computers running browser or other software that communicates with one or more central computers 910 via a network 912. The computing devices 920, 922, 930, 932 and the central computer 910 can have computer architectures as shown in FIG. 8 and discussed above. The computing devices 920, 922, 930, 932 are not limited to traditional personal computers but can comprise other computing hardware configured to connect to and communicate with a network 912 (e.g., smart phones or other mobile computing devices, servers, dedicated devices, and the like).

In the illustrated embodiment, the computing devices 920, 922, 930, 932 are configured to communicate with one or more central computers 910 (e.g., using a cloud network or other client-server network). In certain implementations, the central computers 910 computes one or more of the intermediate or final values associated with the disclosed embodiments (e.g., any one or more of the generated intermediate probability distributions or their moments, associated "a and b coefficients" or expectations generator, trading strategies or associated expected excess returns or hedging coefficients, Nevanlinna, Pick or Potapov matrices, extremal or optimal martingale distributions, distribution parameter or interpolation functions, or other elements) and transmits the intermediate or final values to any of the computing devices 920, 922 (e.g., as data to be displayed on a graphic user interface or web page at the computing devices 920, 922). For example, the computing devices 920, 922 can transmit a request for the data to the central computer 910 over the network 912. In order to compute the intermediate or final values, the one or more central computers 910 can access data from computing devices 930, 932, which can store various types of market data. For example, the computing devices 930, 932 may store historical price information that is used in connection with the disclosed embodiments. Alternatively, the one or more central computers 910 may themselves store the historical price information used in connection with the disclosed embodiments.

Figure 10:
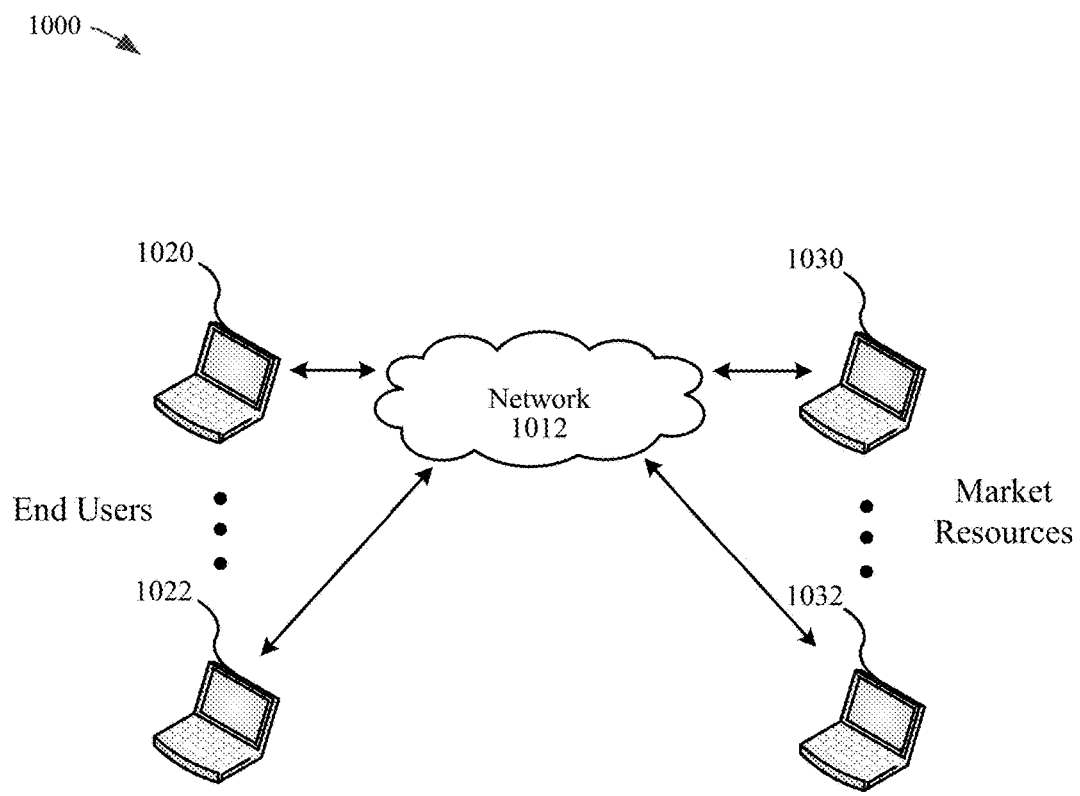
FIG. 10 shows a schematic block diagram of a second network topology that can be used to implement embodiments of the disclosed technology.

Another example of a possible network topology for implementing a system according to the disclosed technology is depicted in FIG. 10. Networked computing devices 1020, 1022, 1030, 1032 can be, for example, computers running browser or other software connected to a network 1012. As above, the computing devices 1020, 1022, 1030, 1032 can have computer architectures as shown in FIG. 8 and discussed above. The computing devices 1020, 1022, 1030, 1032 are not limited to traditional personal computers but can comprise other computing hardware configured to connect to and communicate with a network 1012 (e.g., smart phones or other mobile computing devices, servers, dedicated devices, and the like).

In the illustrated embodiment, the computing devices 1020, 1022 are configured to communicate directly with computing devices 1030, 1032 via the network 1012. In the illustrated embodiment, the computing devices 1020, 1022 are configured to locally compute one or more of the intermediate or final values associated with the disclosed embodiments (e.g., any one or more of the generated intermediate probability distributions or their moments, associated "a and b coefficients" or expectations generator, trading strategies or associated expected excess returns or hedging coefficients, Nevanlinna, Pick or Potapov matrices, extremal or optimal martingale distributions, distribution parameter or interpolation functions, or other elements) using data obtained from the computing devices 1030, 1032 via the network 1012 (e.g., historical price information). Any of the intermediate or final values can be stored or displayed on any of the computing devices 1020, 1022 (e.g., displayed as data on a graphic user interface or web page at the computing devices 1020, 1022).

In the illustrated embodiments, the illustrated networks 912, 1012 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, and most likely, at least part of the networks 912, 1012 can be the Internet or a similar public network and operate using an appropriate protocol (e.g., the HTTP protocol).

V. Additional Embodiments

It should be understood that the embodiments introduced above are representative embodiments that are not intended to be limiting in any way. Instead, any one or more aspects of the disclosed technology can be applied in other embodiments, such as the embodiments described below.

In one exemplary embodiment, a computer-implemented method comprises producing complete option pricing in an incomplete market by explicitly modelling the nature of the incomplete market so as to determine a range of all possible prices for an option on an underlying financial instrument. The underlying financial instrument can be one of a single asset, a single asset class, or a fixed-weight portfolio. In certain implementations, the method is performed without using parametric functional forms for the underlying instrument's price process or risk premium. Further, in some embodiments, the method is performed without using differential or stochastic equations, or their associated numerical solution techniques. In certain embodiments, the method further comprises determining a set of martingale probability distributions corresponding to the possible prices and causing one or more of the distributions to be displayed on a display device.

In another exemplary embodiment, a computer-implemented method comprises receiving historical prices for an underlying instrument, and deriving one or more risk factors from a probability distribution of short-run future prices of the underlying instrument, wherein the probability distribution is based on historical price data for the underlying instrument. One or more of the risk factors can be determined by the moments of the probability distribution of short-run future prices. In certain embodiments, the method is performed without using parametric functional forms for the underlying instrument's price process or risk premium. In some embodiments, the probability distribution of short-run future prices is determined using the technique of orthogonal series. In certain embodiments, the risk factors are obtained as explicit analytical functions of the underlying instrument price. In particular embodiments, the method is performed without using differential or stochastic equations, or their associated numerical solution techniques. In certain embodiments, the method is performed without using contemporaneous price data for options on the underlying instrument.

In another exemplary embodiment, a computer-implemented method comprises determining an expectations generator that generates expected present value pricing from the probability distribution of short-run future prices. In certain embodiments, the expectations generator is determined by the moments of the probability distribution of short-run future prices. In some embodiments, the method is performed without using parametric functional forms for the underlying instrument's price process or risk premium. In certain embodiments, the method is performed without using differential or stochastic equations, or their associated numerical solution techniques. In some embodiments, the method is performed without using contemporaneous price data for options on the underlying instrument.

In a further exemplary embodiment, a computer-implemented method comprises determining one or more trading strategies, associated hedging coefficients, associated excess returns, or any combination of trading strategies, associated hedging coefficients, and associated excess returns based on one or more of the risk factors and the expectations generator; and causing one or more of the trading strategies, the associated hedging coefficients, the associated excess returns, or any combination of the trading strategies, the associated hedging coefficients, and the associated excess returns to be displayed on a display device. In certain embodiments, one or more of the risk factors are used as uncorrelated trading strategies in the underlying instrument. In some embodiments, the associated hedging coefficients delta and gamma are obtained as explicit analytical functions of the underlying instrument price. In certain embodiments, the associated excess returns are obtained as the eigenvalues of the expectations generator. In some embodiments, the method is performed without using parametric functional forms for the underlying instrument's price process or risk premium. In some embodiments, the method is performed without using differential or stochastic equations, or their associated numerical solution techniques. In certain embodiments, the method is performed without using contemporaneous price data for options on the underlying instrument.

In another exemplary embodiment, a computer-implemented method comprises generating a representative martingale probability distribution pertaining to a future time, corresponding to an option expiration date, by combining the risk factors and risk premia. In some embodiments, the time evolution of each risk factor is determined by the corresponding risk premium. In certain embodiments, the initial combination of risk factors is determined uniquely. In some embodiments, the method is performed without using parametric functional forms for an underlying instrument's price process or risk premium. In certain embodiments, the method is performed without using differential or stochastic equations, or their associated numerical solution techniques. In some embodiments, the method is performed without using contemporaneous price data for options on the underlying instrument. In certain embodiments, the combination of risk factors and risk premia is replaced alternatively by a given empirical probability distribution pertaining to the future time, which distribution may be derived from the set of historical prices for the underlying instrument, and the Esscher transform of the given distribution (the exponentially tilted distribution) is used as a representative of all the distributions bearing the same moments as the representative martingale probability distribution.

In a further exemplary embodiment, a computer-implemented method comprises determining one or more martingale distributions pertaining to a future time that can be used to price an option with corresponding expiration date on an underlying instrument by using a single function, wherein the relationship of each of the one or more distributions to the single function is based on historical price data for the underlying instrument. In certain embodiments, the relationship of each of the one or more distributions to the single function is based on the moments of the representative martingale distribution. In some embodiments, the relationship of each of the one or more distributions to the single function is that of an inverse integral transform of a fractional linear transformation of the single function. In certain embodiments, the single function belongs to the compactified Nevanlinna class and has two extremal values that determine extremal distributions and associated upper and lower bounds to a price of an option on the underlying instrument. In some embodiments, the method is performed without using parametric functional forms for the underlying instrument's price process or risk premium. In certain embodiments, the method is performed without using differential or stochastic equations, or their associated numerical solution techniques. In some embodiments, the method is performed without using contemporaneous price data for options on the underlying instrument. In certain embodiments, wherein the method further comprises pricing a basket option using the single function without any historical price data for the basket option, wherein a value is assigned to the single function. In some embodiments, the method further comprises causing one or more of the future martingale distributions, which may include the extremal distributions, to be displayed on a display device.

In another exemplary embodiment, a computer-implemented method comprises receiving contemporaneous prices for one or more of a plurality of options with a single expiration date on an underlying instrument; and determining one or more martingale distributions pertaining to the expiration date that can be used to price an option with the expiration date on the underlying instrument by using a single scalar parameter, wherein the relationship of the single function corresponding to each of the one or more martingale distributions to the single scalar parameter is based on both historical price data for the underlying instrument and contemporaneous price data for one or more of the plurality of options. In certain embodiments, the relationship of the single function corresponding to each of the one or more martingale distributions to the single scalar parameter is that of a fractional linear transformation of the single scalar parameter. In some embodiments, the scalar parameter has two extremal values that determine conditional upper and lower bounds to the price of any option on the underlying instrument, conditional on the contemporaneous option prices. In certain embodiments, the method is performed without using parametric functional forms for the underlying instrument's price process or risk premium. In some embodiments, the method is performed without using differential or stochastic equations, or their associated numerical solution techniques. In certain embodiments, the method further comprises causing one or more of the future martingale distributions, which may include the conditional extremal distributions, to be displayed on a display device. In some embodiments, the method further comprises determining an optimal martingale distribution from among the distributions, wherein the single scalar parameter is set equal to a value that implies option prices for one or more of the plurality of options that approximate the corresponding contemporaneous prices. In certain embodiments, the method further comprises causing the optimal martingale distribution to be displayed on a display device.

In a further exemplary embodiment, a method for creating trading strategies in an underlying financial instrument and deriving probability distributions of the price of the underlying financial instrument at future times comprises: (a) providing a probability distribution model having a distribution parameter function, constituting at least one distribution parameter; (b) providing a set of historical prices for the underlying financial instrument; (c) providing a set of contemporaneous prices for a plurality of options on the underlying financial instrument, the options being associated to a set of strike prices and expiration dates, and accompanied by a paired set of prices for the underlying financial instrument, each pair of prices being contemporaneous; (d) analyzing the set of historical prices to determine a probability distribution of short-run future prices of the underlying financial instrument; (e) determining a set of trading strategies in the underlying financial instrument in accordance with an expectations generator matrix; (f) determining a set of hedging coefficients and excess returns, corresponding to the trading strategies; (g) generating a probability distribution of future financial instrument prices pertaining to a selected time corresponding to one of the expiration dates of the plurality of options; (h) determining two extremal probability distributions of future financial instrument prices in accordance with an incomplete markets formula; (i) analyzing a subset, defined by the selected time, of the contemporaneous prices for the plurality of options to determine a distribution parameter function value in accordance with an interpolation formula; (j) determining two conditional extremal probability distributions of future financial instrument prices, conditional on the set of contemporaneous prices; (k) defining an optimal probability distribution that determines option prices approximating the subset of contemporaneous prices using the probability distribution model and the distribution parameter function value; (l) displaying graphically on a display device the optimal probability distribution, and the extremal and conditional extremal probability distributions; (m) displaying graphically on the display device the trading strategies and the associated hedging coefficients and excess returns, wherein the determined trading strategies, hedging coefficients and excess returns are used in an investment portfolio to provide excess returns and in an options portfolio to provide optimal hedging, the determined extremal and conditional extremal probability distributions are used in an option pricing model to provide upper and lower bounds to the price of a specified option on the underlying financial instrument, and the defined optimal probability distribution is used in an option pricing model to provide a price of a specified option on the underlying financial instrument.

VI. Concluding Remarks

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. I therefore claim all that comes within the scope and spirit of these claims.

What is claimed is:

1. A method, comprising:
   by a computing device,
   receiving historical price data, the historical price data indicating one or more historical prices for a financial instrument;
   receiving a time horizon, the time horizon being not less than a shortest period between successive prices in the historical price data;
   computing a time horizon probability distribution indicating probabilities of possible prices for the financial instrument at the time horizon, wherein the time horizon probability distribution is based at least in part on the historical price data and the time horizon;
   computing one or more mathematical moments of the time horizon probability distribution;
   computing one or more trading strategy coefficients, the one or more trading strategy coefficients being based at least in part on the one or more mathematical moments of the time horizon probability distribution; and
   computing a succession of trading strategies based at least in part on the one or more trading strategy coefficients, each of the trading strategies relating a value of the respective trading strategy to a price of the financial instrument, each of the trading strategies, excepting a last trading strategy, having a successor trading strategy, and each of the trading strategies, excepting a first trading strategy, having a set of one or more preceding trading strategies,
   wherein each successor trading strategy of the trading strategies is determined by a second order finite difference in selected preceding trading strategies, the coefficients of the second order finite difference being selected from the one or more trading strategy coefficients,
   wherein the computing the trading strategies is based on one or more mathematical moments of the time horizon probability distribution, and not on any other use of the historical price data,
   wherein the computing the trading strategies is performed using only algebraic manipulations without using stochastic computations or differential equation computations; and
   storing the one or more trading strategies.

2. The method of claim 1, further comprising, for each of the one or more trading strategies, computing an excess return, one or more hedging coefficients, or both an excess return and one or more hedging coefficients.

3. The method of claim 1, wherein the one or more mathematical moments are computed using an orthogonal series method.

4. The method of claim 1, wherein the time horizon is a first time horizon, and wherein the computing the one or more trading strategies comprises:
   receiving a second time horizon, the second time horizon being different than the first time horizon;
   receiving a forward price or discount factor for the financial instrument at the received second time horizon;
   computing a representative martingale probability distribution using the forward price or the discount factor, the representative martingale probability distribution indicating probabilities of possible prices for the financial instrument at the second time horizon;
   computing one or more mathematical moments of the representative martingale probability distribution; and
   computing one or more coefficients of the second order finite difference, the one or more coefficients being based at least in part on the mathematical moments of the representative martingale probability distribution.

5. The method of claim 4, wherein the one or more mathematical moments of the representative martingale probability distribution are computed using an Esscher transform of an empirical probability distribution.

6. The method of claim 1, wherein the one or more trading strategies are computed as orthogonal functions.

7. The method of claim 1, further comprising computing hedging coefficients or excess returns associated with one or more of the trading strategies as explicit functions of a price of the financial instrument.

8. The method of claim 1, wherein the trading strategies are computed without using option price data.

9. The method of claim 1, wherein the computing the one or more trading strategies is based on one or more mathematical moments of the representative martingale probability distribution, and not on any other use of the historical price data.

10. The method of claim 1, wherein the first trading strategy represents an investment position purely in a money market instrument, regardless of the price of the financial instrument, and wherein each successor trading strategy of the one or more trading strategies represents investment positions, either long or short, in the money market instrument and the financial instrument.

11. One or more non-transitory computer-readable media storing computer-executable instructions, which when executed by a computer cause the computer to perform a method, the method comprising:
   receiving historical price data, the historical price data indicating one or more historical prices for a financial instrument;
   receiving a time horizon, the time horizon being not less than a shortest period between successive prices in the historical price data;
   computing a time horizon probability distribution indicating probabilities of possible prices for the financial instrument at the time horizon, wherein the time horizon probability distribution is based at least in part on the historical price data and the time horizon;

computing one or more mathematical moments of the time horizon probability distribution;

computing one or more trading strategy coefficients, the one or more trading strategy coefficients being based at least in part on the one or more mathematical moments of the time horizon probability distribution; and computing a succession of trading strategies based at least in part on the one or more trading strategy coefficients, each of the trading strategies relating a value of the respective trading strategy to a price of the financial instrument, each of the trading strategies, excepting a last trading strategy, having a successor trading strategy, and each of the trading strategies, excepting a first trading strategy, having a set of one or more preceding trading strategies, wherein each successor trading strategy of the trading strategies is determined by a second order finite difference in selected preceding trading strategies, the coefficients of the second order finite difference being selected from the one or more trading strategy coefficients, wherein the computing the trading strategies is based on one or more mathematical moments of the time horizon probability distribution, and not on any other use of the historical price data, wherein the computing the trading strategies is performed using only algebraic manipulations without using stochastic computations or differential equation computations; and storing the one or more trading strategies.

12. The one or more non-transitory computer-readable media of claim 11, wherein the method further comprises, for each of the one or more trading strategies, computing an excess return, one or more hedging coefficients, or both an excess return and one or more hedging coefficients.

13. The one or more non-transitory computer-readable media of claim 11, wherein the one or more mathematical moments are computed using an orthogonal series method.

14. The one or more non-transitory computer-readable media of claim 11, wherein the time horizon is a first time horizon, and wherein the computing the one or more trading strategies comprises:

receiving a second time horizon, the second time horizon being different than the first time horizon;

receiving a forward price or discount factor for the financial instrument at the received second time horizon;

computing a representative martingale probability distribution using the forward price or the discount factor, the representative martingale probability distribution indicating probabilities of possible prices for the financial instrument at the second time horizon;

computing one or more mathematical moments of the representative martingale probability distribution; and computing one or more coefficients of the second order finite difference, the one or more coefficients being based at least in part on the mathematical moments of the representative martingale probability distribution.

15. The one or more non-transitory computer-readable media of claim 14, wherein the one or more mathematical moments of the representative martingale probability distribution are computed using an Esscher transform of an empirical probability distribution.

16. The one or more non-transitory computer-readable media of claim 11, wherein the one or more trading strategies are computed as orthogonal functions.

17. The one or more non-transitory computer-readable media of claim 11, wherein the method further comprises computing hedging coefficients or excess returns associated with one or more of the trading strategies as explicit functions of a price of the financial instrument.

18. The one or more non-transitory computer-readable media of claim 11, wherein the trading strategies are computed without using option price data.

19. The one or more non-transitory computer-readable media of claim 11, wherein the computing the one or more trading strategies is based on one or more mathematical moments of the representative martingale probability distribution, and not on any other use of the historical price data.

20. The one or more non-transitory computer-readable media of claim 11, wherein the first trading strategy represents an investment position purely in a money market instrument, regardless of the price of the financial instrument, and wherein each successor trading strategy of the one or more trading strategies represents investment positions, either long or short, in the money market instrument and the financial instrument.

* * * * *